United States Patent
Conger et al.

(10) Patent No.: US 11,602,122 B2
(45) Date of Patent: *Mar. 14, 2023

(54) METABOLIC CAGING

(71) Applicant: INNOVIVE, INC., San Diego, CA (US)

(72) Inventors: Dee Conger, Alpine, WY (US); Francesca McGuffie, San Diego, CA (US)

(73) Assignee: INNOVIVE, INC., San Diego, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/029,375

(22) Filed: Sep. 23, 2020

(65) Prior Publication Data

US 2021/0059211 A1 Mar. 4, 2021

Related U.S. Application Data

(63) Continuation of application No. 15/794,919, filed on Oct. 26, 2017, now Pat. No. 10,820,568.

(60) Provisional application No. 62/567,969, filed on Oct. 4, 2017, provisional application No. 62/414,611, filed on Oct. 28, 2016.

(51) Int. Cl.
| | | |
|---|---|---|
| *A01K 1/03* | (2006.01) | |
| *A01K 23/00* | (2006.01) | |
| *A01K 1/01* | (2006.01) | |
| *B01D 29/085* | (2006.01) | |

(52) U.S. Cl.
CPC ............... *A01K 1/031* (2013.01); *A01K 1/01* (2013.01); *A01K 23/00* (2013.01); *B01D 29/085* (2013.01)

(58) Field of Classification Search
CPC ...... A01K 1/011; A01K 1/031; A01K 23/005; A01K 29/005; A01K 1/0107; A01K 1/0356; A01K 5/0135
USPC ................................ 119/417, 418, 419, 455
See application file for complete search history.

(56) References Cited

U.S. PATENT DOCUMENTS

| | | |
|---|---|---|
| 513,557 A | 1/1894 | Cobb |
| 1,909,611 A | 5/1933 | Charavay |
| 2,554,086 A | 5/1951 | Block |
| 2,684,051 A | 7/1954 | Philippe et al. |

(Continued)

FOREIGN PATENT DOCUMENTS

| | | |
|---|---|---|
| EP | 0160336 A2 | 11/1985 |
| EP | 0233134 A1 | 8/1987 |

(Continued)

OTHER PUBLICATIONS

Guide for the Care and Use of Laboratory Animals, National Research Council, 1996, 140 pages.

(Continued)

*Primary Examiner* — Yvonne R Abbott-Lewis
(74) *Attorney, Agent, or Firm* — Manuel de la Cerra

(57) ABSTRACT

Provided herein are animal waste collecting animal containment cages for collecting and separating feces and urine from an animal or animals. Also provided herein are animal waste collecting animal containment cages that are disposable and are for single use. Also provided herein are animal waste collecting animal containment cages that are disposed within a rack. Also provided herein are methods of using and manufacturing an animal waste collecting animal containment cage.

20 Claims, 40 Drawing Sheets

(56) References Cited

U.S. PATENT DOCUMENTS

| | | | |
|---|---|---|---|
| 2,988,044 A | 6/1961 | Adelberg et al. | |
| 3,002,492 A | 10/1961 | Naturale | |
| 3,084,850 A | 4/1963 | Engalitcheff, Jr. | |
| 3,087,458 A | 4/1963 | Bennett, Jr. | |
| 3,096,933 A | 7/1963 | Bora | |
| 3,107,650 A * | 10/1963 | Juless | A01K 1/01 |
| | | | 119/417 |
| 3,122,127 A | 2/1964 | Shechmeister et al. | |
| 3,127,872 A | 4/1964 | Finkel | |
| 3,163,149 A | 12/1964 | Ivey | |
| 3,212,474 A | 10/1965 | Higgins et al. | |
| 3,225,738 A | 12/1965 | Palencia | |
| 3,302,615 A | 2/1967 | Tietje | |
| 3,334,614 A | 8/1967 | Gass et al. | |
| 3,397,676 A | 8/1968 | Barney | |
| 3,465,722 A | 9/1969 | Duff | |
| 3,500,831 A | 3/1970 | Schaar | |
| 3,518,971 A | 7/1970 | Gass et al. | |
| 3,524,431 A | 8/1970 | Graham et al. | |
| 3,537,428 A | 11/1970 | Montgomery | |
| 3,547,309 A | 12/1970 | Pusey et al. | |
| 3,649,464 A | 3/1972 | Freeman | |
| 3,662,713 A | 5/1972 | Sachs | |
| 3,698,360 A | 10/1972 | Rubricius | |
| 3,718,120 A | 2/1973 | Schwarz et al. | |
| 3,731,657 A | 5/1973 | Allessio | |
| 3,765,374 A | 10/1973 | Kolste | |
| 3,768,546 A | 10/1973 | Shipes | |
| 3,771,686 A | 11/1973 | Brison | |
| 3,776,195 A | 12/1973 | Willinger | |
| 3,791,346 A | 2/1974 | Willinger et al. | |
| 3,877,420 A | 4/1975 | Eagleson, Jr. | |
| 3,924,571 A | 12/1975 | Holman | |
| 3,958,534 A | 5/1976 | Perkins et al. | |
| 3,965,865 A | 6/1976 | Kundikoff | |
| 4,022,159 A | 5/1977 | Salvia | |
| 4,023,529 A | 5/1977 | Landy | |
| 4,043,256 A | 8/1977 | Van Huis | |
| 4,075,618 A | 2/1978 | Montean | |
| 4,154,196 A * | 5/1979 | Gass | A01K 1/031 |
| | | | 119/417 |
| 4,161,159 A | 7/1979 | Leong | |
| 4,177,761 A | 12/1979 | Bellocchi, Jr. | |
| 4,252,080 A | 2/1981 | Gioia et al. | |
| 4,343,261 A | 8/1982 | Thomas | |
| 4,365,590 A | 12/1982 | Ruggieri et al. | |
| 4,367,728 A | 1/1983 | Mutke | |
| 4,402,280 A | 9/1983 | Thomas | |
| 4,448,150 A | 5/1984 | Catsimpoolas | |
| 4,480,587 A | 11/1984 | Sedlacek | |
| 4,528,941 A | 7/1985 | Spengler | |
| 4,551,311 A | 11/1985 | Lorenz | |
| 4,593,650 A | 6/1986 | Lattuada | |
| 4,640,228 A | 2/1987 | Sedlacek et al. | |
| 4,690,100 A | 9/1987 | Thomas | |
| 4,699,088 A | 10/1987 | Murray et al. | |
| 4,699,188 A | 10/1987 | Baker et al. | |
| 4,728,006 A | 3/1988 | Drobish et al. | |
| 4,774,631 A | 9/1988 | Okuyama et al. | |
| 4,779,566 A | 10/1988 | Morris et al. | |
| 4,785,765 A * | 11/1988 | Campbell | A01K 1/031 |
| | | | 119/417 |
| 4,798,171 A | 1/1989 | Peters et al. | |
| 4,844,018 A | 7/1989 | Niki | |
| 4,892,209 A | 1/1990 | Dorfman et al. | |
| 4,907,536 A | 3/1990 | Chrisler | |
| 4,940,017 A | 7/1990 | Niki et al. | |
| 4,941,431 A | 7/1990 | Anderson et al. | |
| 4,976,219 A | 12/1990 | Goguen et al. | |
| 4,991,635 A | 2/1991 | Ulm | |
| 5,000,120 A | 3/1991 | Coiro, Sr. et al. | |
| 5,003,922 A | 4/1991 | Niki et al. | |
| 5,031,515 A | 7/1991 | Niemela et al. | |
| 5,044,316 A | 9/1991 | Thomas | |
| 5,048,459 A | 9/1991 | Niki et al. | |
| 5,081,955 A | 1/1992 | Yoneda et al. | |
| 5,148,766 A | 9/1992 | Coiro, Sr. et al. | |
| 5,163,380 A | 11/1992 | Duffy et al. | |
| 5,165,362 A | 11/1992 | Sheaffer et al. | |
| 5,213,059 A | 5/1993 | Krantz | |
| 5,287,414 A | 2/1994 | Foster | |
| 5,307,757 A | 5/1994 | Coiro, Sr. et al. | |
| 5,316,172 A | 5/1994 | Apps et al. | |
| 5,328,049 A | 7/1994 | Ritzow | |
| 5,331,920 A | 7/1994 | Coiro, Sr. et al. | |
| 5,349,923 A | 9/1994 | Sheaffer et al. | |
| 5,385,118 A | 1/1995 | Coiro, Sr. et al. | |
| 5,400,744 A | 3/1995 | Coiro, Sr. et al. | |
| 5,407,129 A | 4/1995 | Carey et al. | |
| 5,407,648 A | 4/1995 | Allen et al. | |
| 5,429,800 A | 7/1995 | Miraldi et al. | |
| 5,447,118 A | 9/1995 | Huff et al. | |
| 5,471,950 A | 12/1995 | White | |
| 5,474,024 A | 12/1995 | Hallock | |
| 5,513,596 A | 5/1996 | Coiro, Sr. et al. | |
| 5,567,364 A | 10/1996 | Philipps | |
| 5,572,403 A | 11/1996 | Mills | |
| 5,572,953 A | 11/1996 | Phelan et al. | |
| 5,605,240 A | 2/1997 | Guglielmini | |
| 5,608,209 A | 3/1997 | Matsuda | |
| 5,624,037 A | 4/1997 | Kozo | |
| 5,635,403 A | 6/1997 | Bailey | |
| 5,655,478 A | 8/1997 | Kiera | |
| 5,657,891 A | 8/1997 | Bilani et al. | |
| 5,664,704 A | 9/1997 | Meadows et al. | |
| 5,694,885 A | 12/1997 | Deitrich et al. | |
| 5,706,761 A | 1/1998 | Mayer | |
| 5,717,202 A | 2/1998 | Matsuda | |
| 5,745,041 A | 4/1998 | Moss | |
| 5,771,841 A | 6/1998 | Boor | |
| 5,780,130 A | 7/1998 | Hansen et al. | |
| 5,797,350 A | 8/1998 | Smith | |
| 5,823,144 A | 10/1998 | Edstrom, Sr. et al. | |
| 5,832,876 A | 11/1998 | Brown et al. | |
| 5,865,144 A | 2/1999 | Semenuk | |
| 5,893,338 A | 4/1999 | Campbell et al. | |
| 5,894,816 A | 4/1999 | Coiro, Sr. et al. | |
| 5,905,653 A | 5/1999 | Higham et al. | |
| 5,915,332 A | 6/1999 | Young et al. | |
| 5,924,384 A | 7/1999 | Deitrich et al. | |
| 5,954,013 A | 9/1999 | Gabriel et al. | |
| 5,954,237 A | 9/1999 | Lampe et al. | |
| 5,996,535 A | 12/1999 | Semenuk et al. | |
| 6,021,042 A | 2/2000 | Anderson et al. | |
| 6,029,604 A | 2/2000 | De Vosjoli et al. | |
| 6,092,487 A | 7/2000 | Niki et al. | |
| 6,112,701 A | 9/2000 | Faith et al. | |
| 6,138,610 A | 10/2000 | Niki | |
| 6,142,732 A | 11/2000 | Chou et al. | |
| 6,144,300 A | 11/2000 | Dames | |
| 6,158,387 A | 12/2000 | Gabriel et al. | |
| 6,164,311 A | 12/2000 | Momont et al. | |
| 6,217,437 B1 | 4/2001 | Murray et al. | |
| 6,227,146 B1 | 5/2001 | Gabriel et al. | |
| 6,237,800 B1 | 5/2001 | Barrett | |
| 6,257,171 B1 * | 7/2001 | Rivard | A01K 1/031 |
| | | | 119/419 |
| 6,293,227 B1 | 9/2001 | Ver Hage | |
| 6,295,826 B1 | 10/2001 | Lee | |
| 6,295,950 B1 | 10/2001 | Deitrich et al. | |
| 6,302,059 B1 | 10/2001 | Faith et al. | |
| 6,305,324 B1 | 10/2001 | Hallock et al. | |
| 6,308,660 B1 | 10/2001 | Coiro, Sr. et al. | |
| 6,311,644 B1 | 11/2001 | Pugh | |
| 6,336,427 B1 | 1/2002 | Gabriel et al. | |
| 6,341,581 B1 | 1/2002 | Gabriel et al. | |
| 6,357,393 B1 | 3/2002 | Coiro, Sr. et al. | |
| 6,361,962 B1 | 3/2002 | Lentini et al. | |
| 6,392,872 B1 | 5/2002 | Doustou, III et al. | |
| 6,394,032 B1 | 5/2002 | Coiro, Sr. et al. | |
| 6,396,688 B1 | 5/2002 | Davies et al. | |
| 6,407,918 B1 | 6/2002 | Edmunds et al. | |
| 6,408,794 B1 | 6/2002 | Coiro, Sr. et al. | |
| 6,423,118 B1 | 7/2002 | Becerra et al. | |

(56) References Cited

U.S. PATENT DOCUMENTS

| | | |
|---|---|---|
| 6,427,958 B1 | 8/2002 | Looney |
| 6,457,437 B1 | 10/2002 | Frasier et al. |
| 6,460,486 B1 | 10/2002 | Powers et al. |
| 6,463,397 B1 | 10/2002 | Cohen et al. |
| 6,517,428 B1 | 2/2003 | Murray et al. |
| 6,532,901 B2 | 3/2003 | Isley et al. |
| 6,543,387 B1 | 4/2003 | Stein |
| 6,553,939 B1 | 4/2003 | Austin et al. |
| 6,556,437 B1 | 4/2003 | Hardin |
| 6,561,129 B1 | 5/2003 | Cheng |
| 6,571,738 B2 | 6/2003 | Rivard |
| 6,572,819 B1 | 6/2003 | Wu et al. |
| 6,584,936 B2 | 7/2003 | Rivard |
| 6,588,373 B1 | 7/2003 | Strzempko et al. |
| 6,592,448 B1 | 7/2003 | Williams |
| 6,612,260 B1 | 9/2003 | Loyd et al. |
| 6,714,121 B1 | 3/2004 | Moore |
| 6,718,912 B2 | 4/2004 | Pappas |
| 6,729,266 B1 | 5/2004 | Gabriel et al. |
| 6,739,846 B2 | 5/2004 | Stoddard et al. |
| 6,810,833 B2 | 11/2004 | Bonner et al. |
| 6,813,152 B2 | 11/2004 | Perazzo |
| 6,853,946 B2 | 2/2005 | Cohen et al. |
| 6,878,874 B2 | 4/2005 | Osborn et al. |
| 6,998,980 B2 | 2/2006 | Ingley, III et al. |
| 7,031,157 B2 | 4/2006 | Horng et al. |
| 7,086,350 B2 | 8/2006 | Tecott et al. |
| 7,114,463 B2 | 10/2006 | Donohoe |
| 7,126,471 B2 | 10/2006 | Ahmed et al. |
| 7,131,398 B2 | 11/2006 | Cohen et al. |
| 7,146,931 B2 | 12/2006 | Gabriel et al. |
| 7,191,734 B2 | 3/2007 | Strzempko et al. |
| 7,237,509 B2 | 7/2007 | Bonner et al. |
| 7,320,294 B2 | 1/2008 | Irwin et al. |
| 7,389,744 B2 | 6/2008 | Zhang et al. |
| 7,487,744 B1 | 2/2009 | Goldberg et al. |
| 7,527,020 B2 | 5/2009 | Conger et al. |
| 7,665,419 B2 | 2/2010 | Conger et al. |
| 7,734,381 B2 | 6/2010 | Conger et al. |
| 7,739,984 B2 | 6/2010 | Conger et al. |
| 7,874,268 B2 | 1/2011 | Conger et al. |
| 7,887,146 B1 | 2/2011 | Louie et al. |
| 7,913,650 B2 | 3/2011 | Conger et al. |
| 7,954,455 B2 | 6/2011 | Conger et al. |
| 7,970,495 B2 | 6/2011 | Conger et al. |
| 7,970,496 B2 | 6/2011 | Koepf et al. |
| 8,082,885 B2 | 12/2011 | Conger et al. |
| 8,156,899 B2 | 4/2012 | Conger et al. |
| 8,171,887 B2 | 5/2012 | Conger et al. |
| 8,499,719 B2 | 8/2013 | Brocca et al. |
| 8,739,737 B2 | 6/2014 | Conger et al. |
| 10,292,369 B1 * | 5/2019 | Heath .................. A61B 5/0205 |
| 10,820,568 B2 | 11/2020 | Conger et al. |
| 2001/0054394 A1 | 12/2001 | Marchioro |
| 2002/0022991 A1 | 2/2002 | Sharood et al. |
| 2002/0094283 A1 | 7/2002 | Salmen et al. |
| 2002/0100429 A1 | 8/2002 | Wade |
| 2002/0180588 A1 | 12/2002 | Erickson et al. |
| 2002/0190845 A1 | 12/2002 | Moore |
| 2002/0195060 A1 | 12/2002 | Dollahan |
| 2003/0051676 A1 | 3/2003 | Rivard |
| 2003/0130809 A1 | 7/2003 | Cohen et al. |
| 2003/0131802 A1 | 7/2003 | Murray et al. |
| 2003/0170145 A1 | 9/2003 | Smith et al. |
| 2003/0200933 A1 | 10/2003 | Park |
| 2004/0018105 A1 | 1/2004 | Stoddard et al. |
| 2004/0185770 A1 | 9/2004 | Soeholm et al. |
| 2004/0191437 A1 | 9/2004 | Asayama et al. |
| 2004/0211745 A1 | 10/2004 | Murray |
| 2004/0261727 A1 | 12/2004 | Matsuo et al. |
| 2005/0024211 A1 | 2/2005 | Maloney |
| 2005/0066908 A1 | 3/2005 | Park |
| 2005/0076852 A1 | 4/2005 | Campiotti et al. |
| 2005/0145191 A1 | 7/2005 | Cohen et al. |
| 2005/0166860 A1 | 8/2005 | Austin et al. |
| 2005/0193957 A1 | 9/2005 | Oshima et al. |
| 2005/0241591 A1 | 11/2005 | Ingley, III et al. |
| 2005/0256591 A1 | 11/2005 | Rule et al. |
| 2006/0000422 A1 | 1/2006 | Cheng |
| 2006/0011143 A1 | 1/2006 | Drummond et al. |
| 2006/0071774 A1 | 4/2006 | Brown et al. |
| 2006/0111680 A1 | 5/2006 | Spada et al. |
| 2006/0124072 A1 | 6/2006 | Conger et al. |
| 2006/0185614 A1 | 8/2006 | Van Fleet, Jr. |
| 2006/0236951 A1 | 10/2006 | Gabriel et al. |
| 2006/0254528 A1 | 11/2006 | Malnati et al. |
| 2006/0278171 A1 | 12/2006 | Conger et al. |
| 2007/0011950 A1 | 1/2007 | Wood |
| 2007/0040682 A1 | 2/2007 | Zhu et al. |
| 2007/0044799 A1 | 3/2007 | Hete et al. |
| 2007/0159040 A1 | 7/2007 | Fernandez et al. |
| 2007/0169714 A1 | 7/2007 | Conger et al. |
| 2007/0169715 A1 | 7/2007 | Conger et al. |
| 2007/0169716 A1 | 7/2007 | Conger et al. |
| 2007/0169717 A1 | 7/2007 | Conger et al. |
| 2007/0169718 A1 | 7/2007 | Conger et al. |
| 2007/0175399 A1 | 8/2007 | Conger et al. |
| 2007/0175404 A1 | 8/2007 | Conger et al. |
| 2007/0181070 A1 | 8/2007 | Conger et al. |
| 2007/0181074 A1 | 8/2007 | Conger et al. |
| 2007/0181075 A1 | 8/2007 | Conger et al. |
| 2007/0193527 A1 | 8/2007 | Verhage et al. |
| 2007/0209653 A1 | 9/2007 | Beisheim et al. |
| 2007/0256643 A1 | 11/2007 | Coiro et al. |
| 2008/0066688 A1 | 3/2008 | Malnati et al. |
| 2008/0078332 A1 | 4/2008 | Conger et al. |
| 2008/0087231 A1 | 4/2008 | Gabriel et al. |
| 2008/0134984 A1 | 6/2008 | Conger et al. |
| 2008/0222565 A1 | 9/2008 | Taylor et al. |
| 2008/0236506 A1 | 10/2008 | Conger et al. |
| 2008/0236507 A1 | 10/2008 | Conger et al. |
| 2008/0282990 A1 | 11/2008 | Conger et al. |
| 2009/0002496 A1 | 1/2009 | Esmaeili |
| 2009/0293815 A1 | 12/2009 | Coiro, Sr. et al. |
| 2010/0006521 A1 | 1/2010 | Verhage et al. |
| 2010/0242852 A1 | 9/2010 | Conger et al. |
| 2010/0248611 A1 | 9/2010 | Conger et al. |
| 2011/0005465 A1 | 1/2011 | Tamborini et al. |
| 2011/0041773 A1 * | 2/2011 | Brielmeier ............ A01K 1/031 |
| | | 119/419 |
| 2011/0061600 A1 * | 3/2011 | Conger ................ A01K 1/0356 |
| | | 119/419 |
| 2011/0297098 A1 | 12/2011 | Conger et al. |
| 2011/0303158 A1 | 12/2011 | Conger et al. |
| 2011/0308475 A1 | 12/2011 | Conger et al. |
| 2012/0085291 A1 | 4/2012 | Conger et al. |
| 2012/0318207 A1 | 12/2012 | Conger et al. |
| 2013/0160716 A1 | 6/2013 | Conger et al. |
| 2013/0220229 A1 | 8/2013 | Conger et al. |
| 2013/0228134 A1 | 9/2013 | Conger et al. |
| 2013/0284109 A1 | 10/2013 | Conger et al. |
| 2014/0069340 A1 | 3/2014 | Lipscomb |
| 2014/0123906 A1 | 5/2014 | Conger et al. |
| 2014/0345536 A1 | 11/2014 | Usui et al. |
| 2015/0359189 A1 | 12/2015 | Bernardini et al. |
| 2016/0037744 A1 | 2/2016 | Rudin |
| 2016/0270365 A1 | 9/2016 | Conger et al. |
| 2016/0287366 A1 | 10/2016 | Scott |
| 2017/0202176 A1 | 7/2017 | Speter et al. |
| 2017/0339917 A1 | 11/2017 | Conger et al. |
| 2018/0116169 A1 | 5/2018 | Conger et al. |
| 2019/0014741 A1 * | 1/2019 | Shrestha ............... A01K 1/031 |

FOREIGN PATENT DOCUMENTS

| | | |
|---|---|---|
| EP | 0279076 A2 | 8/1988 |
| EP | 2499907 A1 | 9/2012 |
| FR | 2201829 A1 | 5/1974 |
| FR | 2696423 A1 | 4/1994 |
| FR | 2824703 A1 | 11/2002 |
| GB | 1174740 A | 12/1969 |
| JP | 563770 U | 1/1981 |
| JP | S5654772 Y2 | 12/1981 |
| JP | S5783233 U | 5/1982 |

(56) References Cited

FOREIGN PATENT DOCUMENTS

| JP | S627852 U | 1/1987 |
|---|---|---|
| JP | S6485026 A | 3/1989 |
| JP | H02-39658 U | 3/1990 |
| JP | H03244330 A | 10/1991 |
| JP | H049555 U | 1/1992 |
| JP | H0423929 U | 1/1992 |
| JP | H04267826 A | 9/1992 |
| JP | H055499 U | 1/1993 |
| JP | H0668430 U | 9/1994 |
| JP | 3022196 U | 3/1996 |
| JP | S09168346 A | 6/1997 |
| JP | H10215720 A | 8/1998 |
| JP | H10286037 A | 10/1998 |
| JP | H119126 A | 1/1999 |
| JP | 2000032862 A | 2/2000 |
| JP | 3070623 U | 8/2000 |
| JP | 2002065109 A | 3/2002 |
| JP | 2003018932 A | 1/2003 |
| JP | 2003088263 A | 3/2003 |
| JP | 2005095004 A | 4/2005 |
| JP | 2005185189 A | 7/2005 |
| JP | 2005328725 A | 12/2005 |
| JP | 2008527975 A | 7/2008 |
| JP | 2009529862 A | 8/2009 |
| JP | 2010523158 A | 7/2010 |
| WO | 9218084 A1 | 10/1992 |
| WO | 9314474 A1 | 7/1993 |
| WO | 0191543 A1 | 12/2001 |
| WO | 0211523 A1 | 2/2002 |
| WO | 03051106 A1 | 6/2003 |
| WO | 03059048 A1 | 7/2003 |
| WO | 2006065773 A2 | 6/2006 |
| WO | 2008127998 A1 | 10/2008 |
| WO | 2008135528 A2 | 11/2008 |
| WO | 2009098617 A1 | 8/2009 |
| WO | 2010054257 A2 | 5/2010 |
| WO | 2012051124 A2 | 4/2012 |
| WO | 2016014319 A2 | 1/2016 |
| WO | 2018081434 A1 | 5/2018 |

OTHER PUBLICATIONS

Guidelines On: Laboratory Animal Facilities—Characteristics, Design and Development, Canadian Council on Animal Care, 2003, 115 pages.
International Preliminary Report on Patentability dated Feb. 26, 2009 in International Patent Application No. PCT/US2007/018255, filed on Aug. 17, 2007, 8 pages.
International Preliminary Report on Patentability dated Feb. 9, 2017 in International Patent Application No. PCT/US2015/040647, filed on Jul. 15, 2015, 7 pages.
International Preliminary Report on Patentability dated Jan. 14, 2016 in International Application No. PCT/US2014/044668, filed on Jun. 27, 2014, 11 pages.
International Preliminary Report on Patentability dated Mar. 5, 2009 in International Patent Application No. PCT/US2005/044977, filed on Dec. 13, 2005, 8 pages.
International Preliminary Report on Patentability dated May 9, 2019 in International Patent Application No. PCT/US2017/058547, filed on Oct. 26, 2017, 12 pages.
International Preliminary Report on Patentability dated May 19, 2011 in International Application No. PCT/US2009/063638 filed on Nov. 6, 2009, 5 pages.
International Search Report and Written Opinion dated Apr. 5, 2016 in International Application No. PCT/US2015/040647, filed on Jul. 15, 2015, 8 pages.
International Search Report and Written Opinion dated Jan. 5, 2018 in International Patent Application No. PCT/US2017/058547, filed on Oct. 26, 2017, 15 pages.
International Search Report and Written Opinion dated Jun. 16, 2008 in International Patent Application No. PCT/US2007/018255, filed on Aug. 17, 2007, 8 pages.

International Search Report and Written Opinion dated May 28, 2008 in International Patent Application No. PCT/US2006/23038, filed on Jun. 13, 2006, 7 pages.
International Search report and Written Opinion dated May 28, 2010 in International Application No. PCT/US2009/063638 filed on Nov. 6, 2009, 6 pages.
International Search Report and Written Opinion dated Nov. 11, 2014 in International Patent Application No. PCT/US2014/044668, filed on Jun. 27, 2014, 13 pages.
International Search report and Written Opinion dated Sep. 25, 2008 in International Application No. PCT/US2008/063766 filed on May 15, 2008, 11 pages.
International Search report and Written Opinion dated Sep. 30, 2008 in International Application No. PCT/US2005/44977 filed on Dec. 13, 2005, 10 pages.
International Search report and Written Opinion dated Jul. 16, 2008 in International Application No. PCT/US2008/059953, filed on Apr. 10, 2008, 10 pages.
International Search Report and Written Opinion dated May 7, 2012 in International Application No. for PCT/US2011/055650 filed on Oct. 10, 2011, 14 pages.
Marketing Materials From Trade Show, Nov. 7, 2005, 8 pages.
Nalgene Animal Cage Cover, VWR Catalogue, http://www.vwrsp.com, Dec. 5, 2006, 1 page.
Office Action dated Apr. 1, 2009 in U.S. Appl. No. 11/695,082, filed Apr. 2, 2007 and published as US 2007-01755404 dated Aug. 2, 2007, 15 pages.
Office Action dated Apr. 2, 2010 in U.S. Appl. No. 11/695,079, filed Apr. 2, 2007 and published as US 2007-0169718 dated Jul. 26, 2007, 27 pages.
Office Action dated Apr. 7, 2011 in U.S. Appl. No. 12/794,654, filed Jun. 4, 2010 and published as US 2010-0248611 dated Sep. 30, 2010, 23 pages.
Office Action dated Apr. 20, 2015 in U.S. Appl. No. 12/101,046, filed Apr. 10, 2008 and published as US 2008-0282990 dated Nov. 20, 2008, 13 pages.
Office Action dated Apr. 22, 2009 in U.S. Appl. No. 11/695,085, filed Apr. 2, 2007 and published as US 2007-0169715 dated Jul. 26, 2007, 7 pages.
Office Action dated Aug. 1, 2008 in U.S. Appl. No. 11/300,664, filed Dec. 13, 2005 and published as US 2006-0124072 dated Jun. 15, 2006, 11 pages.
Office Action dated Aug. 2, 2013 in U.S. Appl. No. 13/775,080, filed Feb. 22, 2013 and published as US 2013-0160716 dated Jun. 27, 2013, 5 pages.
Office Action dated Aug. 10, 2012 in U.S. Appl. No. 12/614,291, filed Nov. 6, 2009 and published as US 2010-0242852 dated Sep. 30, 2010, 5 pages.
Office Action dated Aug. 10, 2015 in U.S. Appl. No. 13/776,671, filed Feb. 25, 2013 and published as US 2014-0123906 dated May 8, 2014, 15 pages.
Office Action dated Aug. 21, 2017 in U.S. Appl. No. 13/776,671, filed Feb. 25, 2013 and published as US 2014-0123906 dated May 8, 2014, 16 pages.
Office Action dated Aug. 25, 2008 in U.S. Appl. No. 11/695,085, filed Apr. 2, 2007 and published as US 2007-0169715 dated Jul. 26, 2007, 16 pages.
Office Action dated Dec. 3, 2007 in U.S. Appl. No. 11/695,089, filed Apr. 2, 2007 and published as US 2007-0169716 dated Jul. 26, 2007, 8 pages.
Office Action dated Dec. 3, 2007 in U.S. Appl. No. 11/695,092, filed Apr. 4, 2007 and published as US 2007-0181070 dated Aug. 9, 2007, 6 pages.
Office Action dated Dec. 9, 2011 in U.S. Appl. No. 12/614,291, filed Nov. 6, 2009 and published as US 2010-0242852 dated Sep. 30, 2010, 11 pages.
Office Action dated Dec. 14, 2009 in U.S. Appl. No. 11/695,084, filed Apr. 2, 2007 and published as US 2008-0236506 dated Oct. 2, 2008, 23 pages.
Office Action dated Dec. 15, 2009 in U.S. Appl. No. 11/695,082, filed Apr. 2, 2007 and published as US 2007-01755404 dated Aug. 2, 2007, 15 pages.

(56) References Cited

OTHER PUBLICATIONS

Office Action dated Dec. 16, 2009 in U.S. Appl. No. 11/695,090, filed Apr. 2, 2007 and published as US 2008-0236507 dated Oct. 2, 2008, 8 pages.
Office Action dated Dec. 17, 2007 in U.S. Appl. No. 11/695,078, filed Apr. 4, 2007 and published as US 2007-0169714 dated Jul. 26, 2007, 10 pages.
Office Action dated Dec. 19, 2016 in U.S. Appl. No. 13/594,703, filed Aug. 24, 2012 and published as US 2012-0318207 dated Dec. 20, 2012, 10 pages.
Office Action dated Dec. 21, 2017 in U.S. Appl. No. 15/625,524, filed Jun. 16, 2017 and published as US 2017-0339917 dated Nov. 30, 2017, 5 pages.
Office Action dated Dec. 22, 2011 in U.S. Appl. No. 13/101,054, filed May 4, 2011 and published as US 2011-0297098 dated Dec. 8, 2011, 5 pages.
Office Action dated Dec. 22, 2011 in U.S. Appl. No. 13/218,190, filed Aug. 25, 2011 and published as US 2011-0308475 dated Dec. 22, 2011, 9 pages.
Office Action dated Dec. 22, 2011 in U.S. Appl. No. 13/218,227, filed Aug. 25, 2011 and published as US 2011-0303158 dated Dec. 15, 2011, 5 pages.
Office Action dated Dec. 23, 2014 in U.S. Appl. No. 13/776,671, filed Feb. 25, 2013 and published as US 2014-0123906 dated May 8, 2014, 14 pages.
Office Action dated Dec. 26, 2007 in U.S. Appl. No. 11/695,086, filed Apr. 2, 2007 and published as US 2007-0181075 dated Aug. 9, 2007, 6 pages.
Office Action dated Dec. 26, 2007 in U.S. Appl. No. 11/695,085, filed Apr. 2, 2007 and published as US 2007-0169715 dated Jul. 26, 2007, 6 pages.
Office Action dated Dec. 29, 2009 in U.S. Appl. No. 12/101,046, filed Apr. 10, 2008 and published as US 2008-0282990 dated Nov. 20, 2008, 8 pages.
Office Action dated Dec. 29, 2011 in U.S. Appl. No. 11/695,090, filed Apr. 2, 2007 and published as US 2008-0236507 dated Oct. 2, 2008, 6 pages.
Office Action dated Dec. 30, 2008 in U.S. Appl. No. 11/300,664, filed Dec. 13, 2005 and published as US 2006-0124072 dated Jun. 15, 2006, 7 pages.
Office Action dated Dec. 5, 2013 in U.S. Appl. No. 13/771,015, filed Feb. 19, 2013 and published as US 2013-0220229 dated Aug. 2, 2013, 8 pages.
Office Action dated Feb. 2, 2011 in U.S. Appl. No. 12/432,650, filed Apr. 29, 2009 and published as US 2009-0272329 dated Nov. 5, 2009, 4 pages.
Office Action dated Feb. 3, 2011 in U.S. Appl. No. 11/423,949, filed Jun. 13, 2006 and published as US 2006-02787171 dated Dec. 14, 2006, 8 pages.
Office Action dated Feb. 12, 2016 in U.S. Appl. No. 14/317,838, filed Jun. 27, 2014 and published as US 2015-0004679 dated Jan. 1, 2015, 9 pages.
Office Action dated Feb. 15, 2011 in U.S. Appl. No. 11/695,081, filed Apr. 2, 2007 and published as US 2007-0181074 dated Aug. 9, 2007, 13 pages.
Office Action dated Feb. 20, 2015 in U.S. Appl. No. 13/771,015, filed Feb. 19, 2013 and published as US 2013-0220229 dated Aug. 29, 2013, 7 pages.
Office Action dated Feb. 22, 2010 in U.S. Appl. No. 11/695,084, filed Apr. 2, 2007 and published as US 2008-0236506 dated Oct. 2, 2008, 28 pages.
Office Action dated Feb. 24, 2014 in U.S. Appl. No. 12/614,291, filed Nov. 6, 2009 and published as US 2010-0242852 dated Sep. 30, 2010, 7 pages.
Office Action dated Feb. 26, 2015 in U.S. Appl. No. 13/931,336, filed Jun. 28, 2013 and published as US 2013-0284109 dated Oct. 31, 2013, 11 pages.
Office Action dated Jan. 3, 2014 in U.S. Appl. No. 13/594,703, filed Aug. 24, 2012 and published as US 2012-0318207 dated Dec. 20, 2012, 11 pages.
Office Action dated Jan. 5, 2017 in U.S. Appl. No. 13/931,336, filed Jun. 28, 2013 and published as US 2013-0284109 dated Oct. 31, 2013, 10 pages.
Office Action dated Jan. 12, 2018 in U.S. Appl. No. 14/317,838, filed Jun. 27, 2014 and published as US 2015-0004679 dated Jan. 1, 2015, 11 pages.
Office Action dated Jan. 13, 2020 in U.S. Appl. No. 15/794,919, filed Oct. 26, 2017 and published as US 2018-0116169 dated May 3, 2018, 9 pages.
Office Action dated Jan. 15, 2015 in U.S. Appl. No. 13/775,080, filed Feb. 22, 2013 and published as US 2013-0160716 dated Jun. 27, 2013, 8 pages.
Office Action dated Jan. 16, 2013 in U.S. Appl. No. 12/614,291, filed Nov. 6, 2009 and published as US 2010-0242852 dated Sep. 30, 2010, 8 pages.
Office Action dated Jan. 19, 2010 in U.S. Appl. No. 11/695,085, filed Apr. 2, 2007 and published as US 2007-0169715 dated Jul. 26, 2007, 7 pages.
Office Action dated Jan. 25, 2016 in U.S. Appl. No. 13/270,165, filed Oct. 10, 2011 and published as US 2012-0085291 dated Apr. 12, 2012, 13 pages.
Office Action dated Jan. 25, 2016 in U.S. Appl. No. 13/776,645, filed Feb. 25, 2013 and published as US 2013-0228134 dated Sep. 5, 2013, 11 pages.
Office Action dated Jan. 26, 2009 in U.S. Appl. No. 11/300,664, filed Dec. 13, 2005 and published as US 2006-0124072 dated Jun. 15, 2006, 9 pages.
Office Action dated Jul. 1, 2020 in U.S. Appl. No. 15/794,919, filed Oct. 26, 2017 and published as US 2018-0116169 dated May 3, 2018, 5 pages.
Office Action dated Jul. 18, 2008 in U.S. Appl. No. 11/695,082, filed Apr. 2, 2007 and published as US 2007-01755404 dated Aug. 2, 2007, 17 pages.
Office Action dated Jul. 20, 2015 in U.S. Appl. No. 13/775,080, filed Feb. 22, 2013 and published as US 2013-0160716 dated Jun. 27, 2013, 6 pages.
Office Action dated Jul. 29, 2016 in U.S. Appl. No. 15/004,236, filed Jan. 22, 2016 and published as US 2016-0270365 dated Sep. 22, 2016, 5 pages.
Office Action dated Jun. 2, 2009 in U.S. Appl. No. 11/695,090, filed Apr. 2, 2007 and published as US 2008-0236507 dated Oct. 2, 2008, 17 pages.
Office Action dated Jun. 2, 2017 in U.S. Appl. No. 13/931,336, filed Jun. 28, 2013 and published as US 2013-0284109 dated Oct. 31, 2013, 10 pages.
Office Action dated Jun. 14, 2017 in U.S. Appl. No. 13/594,703, filed Aug. 24, 2012 and published as US 2012-0318207 dated Dec. 20, 2012, 11 pages.
Office Action dated Jun. 17, 2011 in U.S. Appl. No. 11/695,085, filed Apr. 2, 2007 and published as US 2007-0169715 dated Jul. 26, 2007, 27 pages.
Office Action dated Jun. 17, 2011 in U.S. Appl. No. 11/695,090, filed Apr. 2, 2007 and published as US 2008-0236507 dated Oct. 2, 2008, 13 pages.
Office Action dated Jun. 18, 2013 in U.S. Appl. No. 12/101,046, filed Apr. 10, 2008 and published as US 2008-0282990 dated Nov. 20, 2008, 11 pages.
Office Action dated Jun. 18, 2014 in U.S. Appl. No. 13/771,015, filed Feb. 19, 2013 and published as US 2013-0220229 dated Aug. 2, 2013, 9 pages.
Office Action dated Jun. 19, 2014 in U.S. Appl. No. 13/594,703, filed Aug. 24, 2012 and published as US 2012-0318207 dated Dec. 20, 2012, 8 pages.
Office Action dated Jun. 20, 2014 in U.S. Appl. No. 13/776,645, filed Feb. 25, 2013 and published as US 2013-0228134 dated Sep. 5, 2013, 10 pages.
Office Action dated Jun. 22, 2009 in U.S. Appl. No. 11/695,084, filed Apr. 2, 2007 and published as US 2008-0236506 dated Oct. 2, 2008, 8 pages.
Office Action dated Jun. 25, 2009 in U.S. Appl. No. 11/868,877, filed Oct. 8, 2007 and published as US 2008-0134984 dated Jun. 12, 2008, 11 pages.

(56) References Cited

OTHER PUBLICATIONS

Office Action dated Jun. 26, 2013 in U.S. Appl. No. 13/771,015, filed Feb. 19, 2013 and published as US 2013-0220229 dated Aug. 29, 2013, 8 pages.
Office Action dated Jun. 26, 2017 in U.S. Appl. No. 14/317,838, filed Jun. 27, 2014 and published as US 2015-0004679 dated Jan. 1, 2015, 10 pages.
Office Action dated Jun. 6, 2014 in U.S. Appl. No. 12/377,591, filed Nov. 23, 2010 and published as US 2011-0061600 dated Mar. 17, 2011, 11 pages.
Office Action dated Mar. 2, 2010 in U.S. Appl. No. 11/423,949, filed Jun. 13, 2006 and published as US 2006-02787171 dated Dec. 14, 2006, 9 pages.
Office Action dated Mar. 3, 2010 in U.S. Appl. No. 12/432,650, filed Apr. 29, 2009 and published as US 2009-0272329 dated Nov. 5, 2009, 9 pages.
Office Action dated Mar. 6, 2014 in U.S. Appl. No. 12/101,046, filed Apr. 10, 2008 and published as US 2008-0282990 dated Nov. 20, 2008, 10 pages.
Office Action dated Mar. 11, 2008 in U.S. Appl. No. 11/300,664, filed Dec. 13, 2005 and published as US 2006-0124072 dated Jun. 15, 2006, 25 pages.
Office Action dated Mar. 11, 2009 in U.S. Appl. No. 11/300,664, filed Dec. 13, 2005 and published as US 2006-0124072 dated Jun. 15, 2006, 7 pages.
Office Action dated Mar. 16, 2016 in U.S. Appl. No. 13/931,336, filed Jun. 28, 2013 and published as US 2013-0284109 dated Oct. 31, 2013, 11 pages.
Office Action dated Mar. 17, 2010 in U.S. Appl. No. 12/101,046, filed Apr. 10, 2008 and published as US 2008-0282990 dated Nov. 20, 2008, 15 pages.
Office Action dated Mar. 18, 2016 in U.S. Appl. No. 13/776,671, filed Feb. 25, 2013 and published as US 2014-0123906 dated May 8, 2014, 13 pages.
Office Action dated Mar. 19, 2008 in U.S. Appl. No. 11/695,077, filed Apr. 2, 2007 and published as US 2007-0175399 dated Aug. 2, 2007, 7 pages.
Office Action dated Mar. 19, 2012 in U.S. Appl. No. 13/218,227, filed Aug. 25, 2011 and published as US 2011-0303158 dated Dec. 15, 2011, 5 pages.
Office Action dated Mar. 20, 2015 in U.S. Appl. No. 12/377,591, filed Feb. 13, 2009 and published as US 2011-0061600 dated Mar. 17, 2011, 16 pages.
Office Action dated Mar. 22, 2017 in U.S. Appl. No. 13/776,671, filed Feb. 25, 2013 and published as US 2014-0123906 dated May 8, 2014, 16 pages.
Office Action dated Mar. 23, 2017 in U.S. Appl. No. 15/004,236, filed Jan. 22, 2016 and published as US 2016-0270365 dated Sep. 22, 2016, 5 pages.
Office Action dated Mar. 26, 2010 in U.S. Appl. No. 11/695,081, filed Apr. 2, 2007 and published as US 2007-0181074 dated Aug. 9, 2007, 13 pages.
Office Action dated Mar. 28, 2012 in U.S. Appl. No. 11/695,085, filed Apr. 2, 2007 and published as US 2007-0169715 dated Jul. 26, 2007, 7 pages.
Office Action dated Mar. 30, 2009 in U.S. Appl. No. 11/695,089, filed Apr. 2, 2007 and published as US 2007-0169716 dated Jul. 26, 2007, 11 pages.
Office Action dated May 6, 2014 in U.S. Appl. No. 13/270,165, filed Oct. 10, 2011 and published as US 2012-0085291 dated Apr. 12, 2012, 10 pages.
Office Action dated May 11, 2010 in U.S. Appl. No. 11/695,087, filed Apr. 2, 2007 and published as US 2008-0078332 dated Apr. 3, 2008, 12 pages.
Office Action dated May 13, 2009 in U.S. Appl. No. 11/423,949, filed Jun. 13, 2006 and published as US 2006-02787171 dated Dec. 14, 2006, 9 pages.
Office Action dated May 18, 2007 in U.S. Appl. No. 11/300,664, filed Dec. 13, 2005 and published as US 2006-0124072 dated Jun. 15, 2006, 16 pages.
Office Action dated May 18, 2016 in U.S. Appl. No. 13/594,703, filed Aug. 24, 2012 and published as US 2012-0318207 dated Dec. 20, 2012, 10 pages.
Office Action dated May 20, 2015 in U.S. Appl. No. 13/594,703, filed Aug. 24, 2012 and published as US 2012-0318207 dated Dec. 20, 2012, 12 pages.
Office Action dated May 23, 2011 in U.S. Appl. No. 12/101,046, filed Apr. 10, 2008 and published as US 2008-0282990 dated Nov. 20, 2008, 15 pages.
Office Action dated May 23, 2013 in U.S. Appl. No. 12/377,591, filed Feb. 13, 2009 and published as US 2011-0061600 dated Mar. 17, 2011, 10 pages.
Office Action dated May 24, 2013 in U.S. Appl. No. 13/594,703, filed Aug. 24, 2012 and published as US 2011-0318207 dated Dec. 20, 2012, 9 pages.
Office Action dated May 26, 2009 in U.S. Appl. No. 11/695,075, filed Apr. 2, 2007 and published as US 2007-0169717 dated Jul. 26, 2007, 17 pages.
Office Action dated May 26, 2015 in U.S. Appl. No. 13/776,645, filed Feb. 25, 2013 and published as US 2013-0228134 dated Sep. 5, 2013, 11 pages.
Office Action dated May 28, 2015 in U.S. Appl. No. 13/270,165, filed Oct. 10, 2011 and published as US 2012-0085291 dated Apr. 12, 2012, 13 pages.
Office Action dated Nov. 3, 2017 in U.S. Appl. No. 13/594,703, filed Aug. 24, 2012 and published as US 2012-0318207 dated Dec. 20, 2012, 10 pages.
Office Action dated Nov. 7, 2012 in U.S. Appl. No. 13/101,054, filed May 4, 2011 and published as US 2011-0297098 dated Dec. 8, 2011, 7 pages.
Office Action dated Nov. 9, 2007 in U.S. Appl. No. 11/695,082, filed Apr. 2, 2007 and published as US 2007-01755404 dated Aug. 2, 2007, 6 pages.
Office Action dated Nov. 9, 2010 in U.S. Appl. No. 12/432,650, filed Apr. 29, 2009 and published as US 2009-0272329 dated Nov. 5, 2009 4 pages.
Office Action dated Nov. 13, 2014 in U.S. Appl. No. 13/776,645, filed Feb. 25, 2013 and published as US 2013-0228134 dated Sep. 5, 2013, 10 pages.
Office Action dated Nov. 20, 2012 in U.S. Appl. No. 13/218,190, filed Aug. 25, 2011 and published as US 2011-0308475 dated Dec. 22, 2011, 12 pages.
Office Action dated Nov. 26, 2013 in U.S. Appl. No. 12/377,591, filed Nov. 23, 2010 and published as US 2011-0061600 dated Mar. 17, 2011, 14 pages.
Office Action dated Nov. 27, 2007 in U.S. Appl. No. 11/695,075, filed Apr. 2, 2007 and published as US 2007-0169717 dated Jul. 26, 2007, 15 pages.
Office Action dated Oct. 5, 2009 in U.S. Appl. No. 11/695,087, filed Apr. 2, 2007 and published as US 2008-0078332 dated Apr. 3, 2008, 5 pages.
Office Action dated Oct. 6, 2009 in U.S. Appl. No. 11/695,075, filed Apr. 2, 2007 and published as US 2007-0169717 dated Jul. 26, 2007, 7 pages.
Office Action dated Oct. 6, 2009 in U.S. Appl. No. 11/695,089, filed Apr. 2, 2007 and published as US 2007-0169716 dated Jul. 26, 2007, 6 pages.
Office Action dated Oct. 6, 2017 in U.S. Appl. No. 15/625,524, filed Jun. 16, 2017 and published as US 2017-0339917 dated Nov. 30, 2017, 5 pages.
Office Action dated Oct. 12, 2010 in U.S. Appl. No. 11/423,949, filed Jun. 13, 2006 and published as US 2006-02787171 dated Dec. 14, 2006, 8 pages.
Office Action dated Oct. 12, 2011 in U.S. Appl. No. 12/101,046, filed Apr. 10, 2008 and published as US 2008-0282990 dated Nov. 20, 2008, 9 pages.
Office Action dated Oct. 13, 2009 in U.S. Appl. No. 11/695,079, filed Apr. 2, 2007 and published as US 2007-0169718 dated Jul. 26, 2007, 7 pages.
Office Action dated Oct. 13, 2010 in U.S. Appl. No. 11/695,081, filed Apr. 2, 2007 and published as US 2007-0181074 dated Aug. 9, 2007, 11 pages.

(56) References Cited

OTHER PUBLICATIONS

Office Action dated Oct. 15, 2012 in U.S. Appl. No. 13/218,190, filed Aug. 25, 2011 and published as US 2011-0308475 dated Dec. 22, 2011, 13 pages.

Office Action dated Oct. 15, 2015 in U.S. Appl. No. 13/775,080, filed Feb. 22, 2013 and published as US 2013-0160716 dated Jun. 27, 2013, 6 pages.

Office Action dated Oct. 18, 2013 in U.S. Appl. No. 13/270,165, filed Oct. 10, 2011 and published as US 2012-0085291 dated Apr. 12, 2012, 12 pages.

Office Action dated Oct. 18, 2013 in U.S. Appl. No. 13/776,645, filed Feb. 25, 2013 and published as US 2013-0228134 dated Sep. 5, 2013, 15 pages.

Office Action dated Oct. 25, 2010 in U.S. Appl. No. 12/101,046, filed Apr. 10, 2008 and published as US 2008-0282990 dated Nov. 20, 2008, 12 pages.

Office Action dated Oct. 26, 2016 in U.S. Appl. No. 13/776,671, filed Feb. 25, 2013 and published as US 2014-0123906 dated May 8, 2014, 15 pages.

Office Action dated Oct. 27, 2015 in U.S. Appl. No. 13/931,336, filed Jun. 28, 2013 and published as US 2013-0284109 dated Oct. 31, 2013, 8 pages.

Office Action dated Oct. 31, 2014 in U.S. Appl. No. 13/270,165, filed Oct. 10, 2011 and published as US 2012-0085291 dated Apr. 12, 2012, 12 pages.

Office Action dated Sep. 1, 2011 in U.S. Appl. No. 11/695,087, filed Apr. 2, 2007 and published as US 2008-0078332 dated Apr. 3, 2008, 8 pages.

Office Action dated Sep. 3, 2008 in U.S. Appl. No. 11/695,089, filed Apr. 2, 2007 and published as US 2007-0169716 dated Jul. 26, 2007, 11 pages.

Office Action dated Sep. 11, 2008 in U.S. Appl. No. 11/695,075, filed Apr. 2, 2007 and published as US 2007-0169717 dated Jul. 26, 2007, 19 pages.

Office Action dated Sep. 15, 2017 in U.S. Appl. No. 13/931,336, filed Jun. 28, 2013 and published as US 2013-0284109 dated Oct. 31, 2013, 10 pages.

Office Action dated Sep. 16, 2010 in U.S. Appl. No. 11/695,082, filed Apr. 2, 2007 and published as US 2007-01755404 dated Aug. 2, 2007, 4 pages.

Office Action dated Sep. 18, 2013 in U.S. Appl. No. 13/775,080, filed Feb. 22, 2013 and published as US 2013-0160716 dated Jun. 27, 2013, 6 pages.

Office Action dated Sep. 19, 2013 in U.S. Appl. No. 12/614,291, filed Nov. 6, 2009 and published as US 2010-0242852 dated Sep. 30, 2010, 8 pages.

Office Action dated Sep. 21, 2016 in U.S. Appl. No. 13/931,336, filed Jun. 28, 2013 and published as US 2013-0284109 dated Oct. 31, 2013, 9 pages.

Office Action dated Sep. 21, 2017 in U.S. Appl. No. 15/625,524, filed Jun. 16, 2017 and published as US 2017-0339917 dated Nov. 30, 2017, 8 pages.

Pulse Width Modulation, Wikipedia, http://en.wikipedia.org/wiki/Pulsewidth_modulation, Dec. 5, 2009, 8 pages.

Ancare Catalog, "Systems and Supplies for Animal Care", ancare.com, Sep. 2006, 20 pages.

* cited by examiner

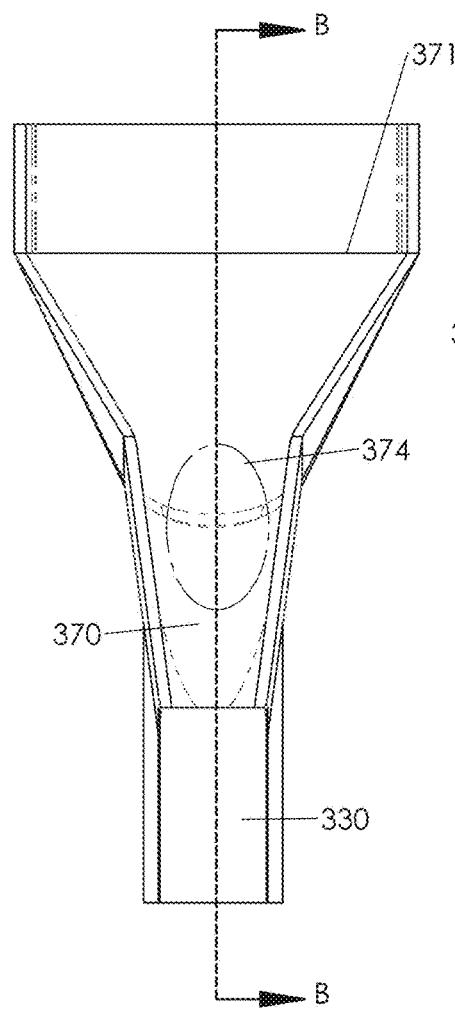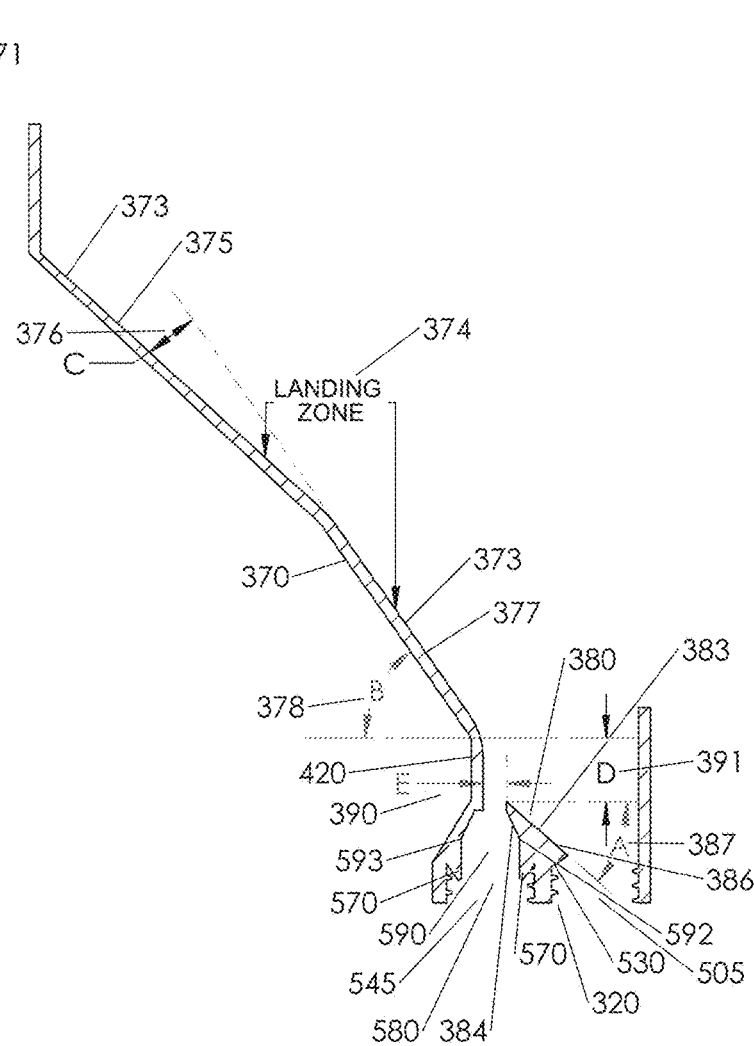
FIG. 13A
FIG. 13B

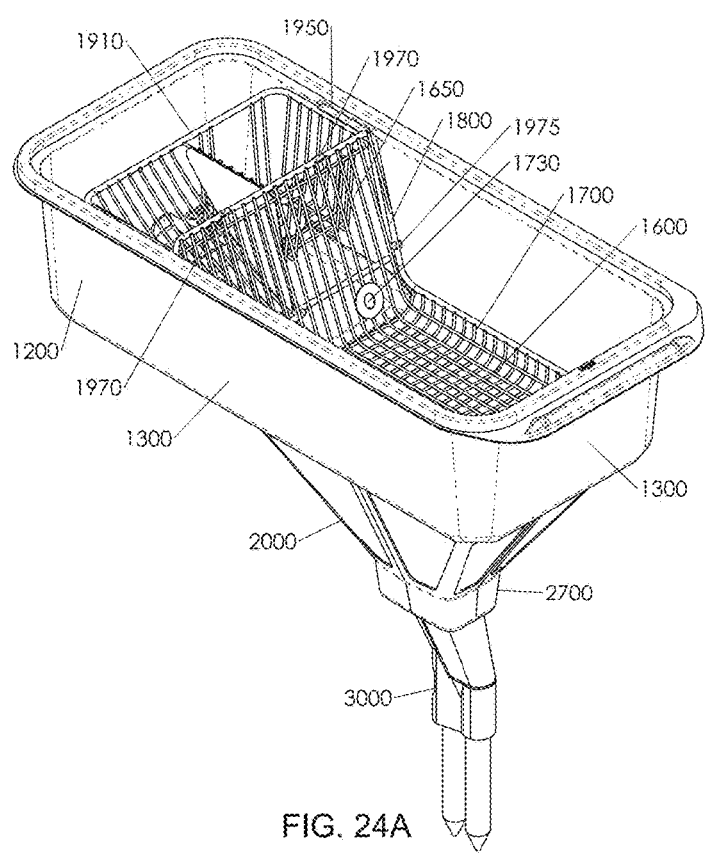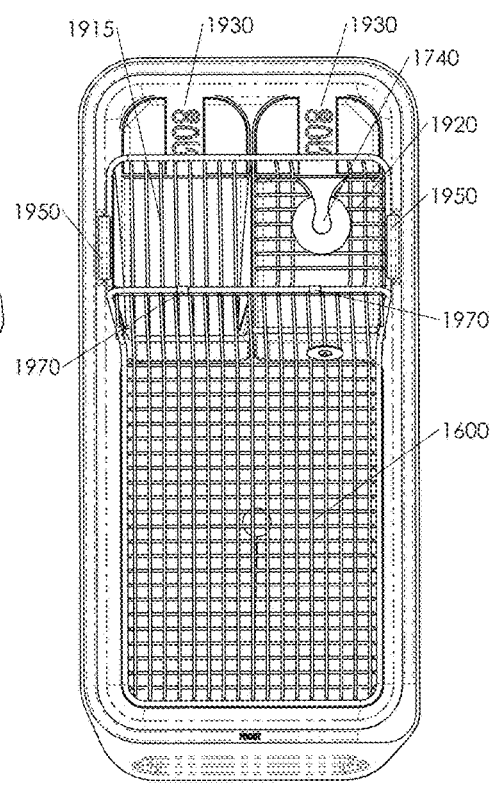
FIG. 24A
FIG. 24B

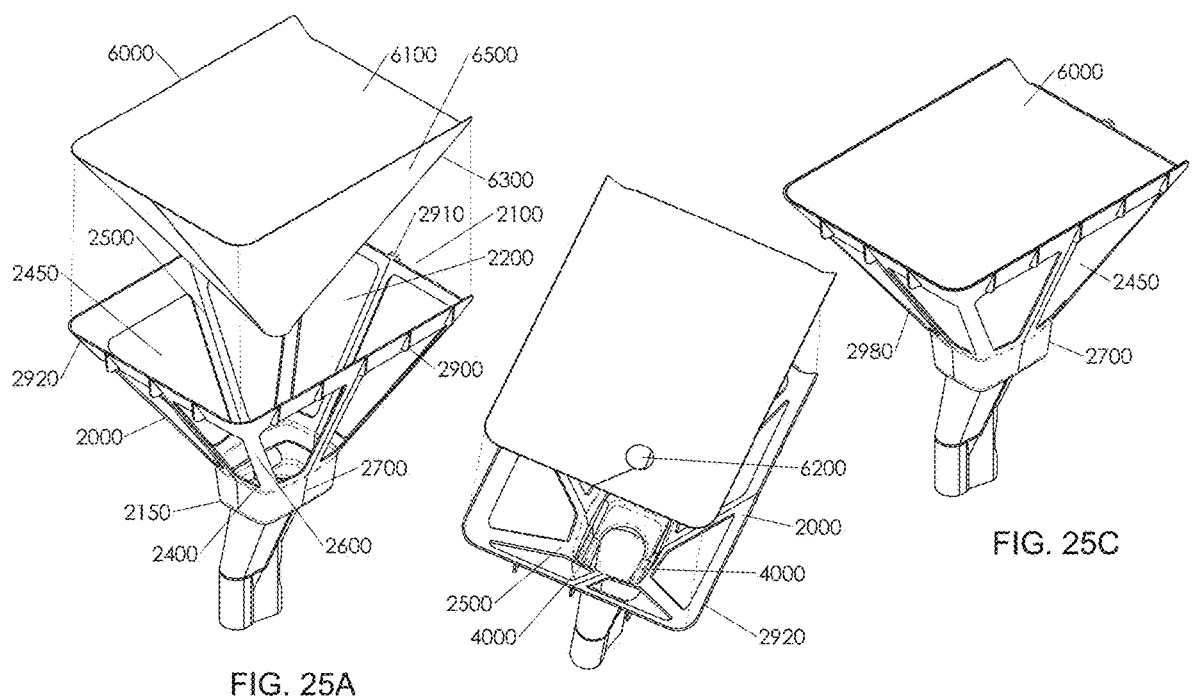

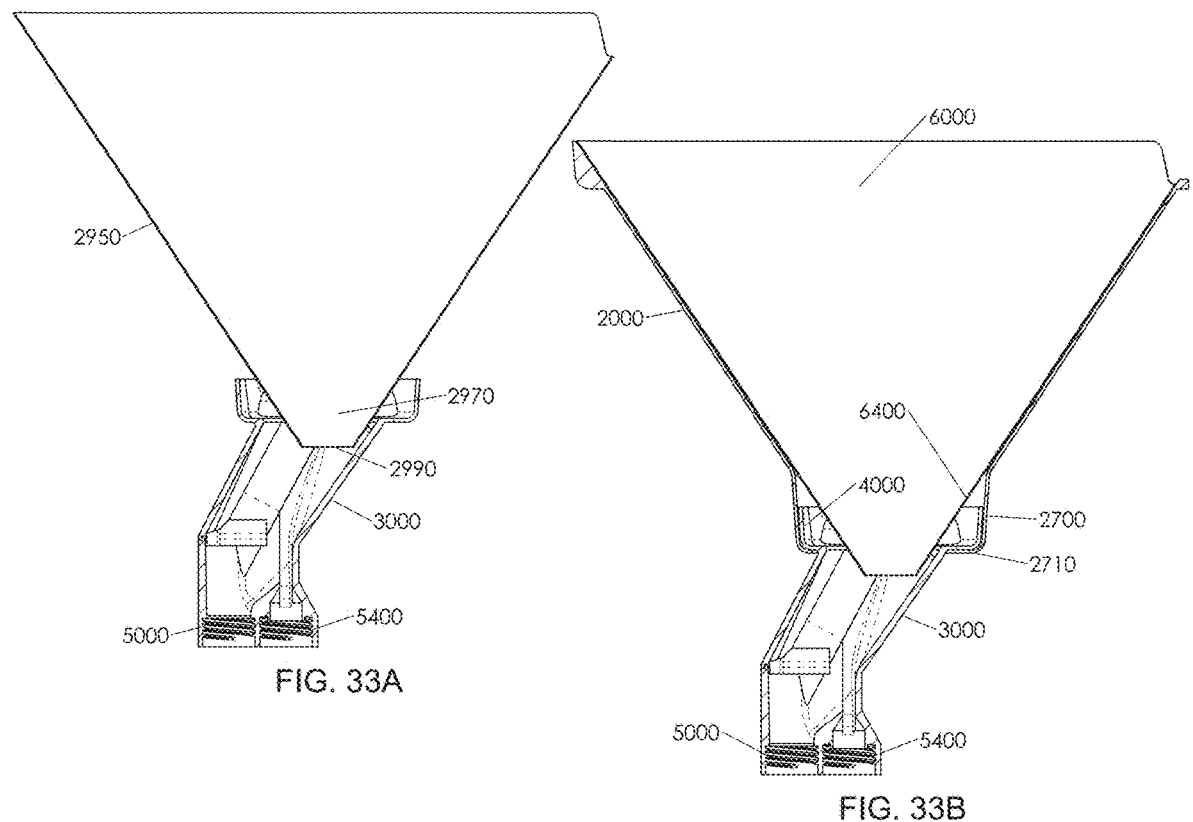

METABOLIC CAGING

RELATED PATENT APPLICATION(S)

This patent application is a continuation of U.S. patent application Ser. No. 15/794,919, filed on Oct. 26, 2017, entitled METABOLIC CAGING, naming Dee Conger and Francesca McGuffie as inventors, which claims the benefit of U.S. Provisional Patent Application No. 62/567,969 filed Oct. 4, 2017, entitled METABOLIC CAGING, naming Dee Conger and Francesca McGuffie as inventors. This patent application also claims the benefit of U.S. Provisional Application No. 62/414,611 filed Oct. 28 2016, entitled METABOLIC CAGING, naming Dee Conger and Francesca McGuffie as inventors. The foregoing patent applications are incorporated herein by reference in their entirety.

FIELD

The technology relates in part to animal husbandry, and relates in part to equipment for collecting and separating feces and urine excreted by laboratory animals.

BACKGROUND

Many scientific studies require the collection and separation of metabolic waste from laboratory animals. Typically individual animals are placed in a chamber attached to a means to collect and separate feces and urine excreted by the animal (the chamber, collection and separation means are often referred to as a "metabolic cage"). Metabolic cages are useful for a variety of studies including the effect of drug therapies, renal function studies, urinary protein excretion, daily food and water intake, urinary excretion volume and the evaluation of standard or intervened metabolic function.

SUMMARY

Provided in certain aspects is an animal waste collecting animal containment cage (metabolic cage) that includes a (i) cage lid, (ii) a cage base affixed to the cage lid, where the cage base comprises one or more sides, a cage base bottom connected to the one or more sides, and a grating, the cage base bottom comprises an opening, and the grating comprises a member disposed over the cage base bottom opening, (iii) an animal waste collector member connected to the cage, where the collector member comprises a proximal end, a distal end, a proximal opening, a distal opening, and one or more sidewalls comprising an interior surface and an exterior surface, at least a portion of, and at least one of, which one or more sidewalls tapers from the proximal opening to the distal opening of the collector member, and the proximal opening of the collector member is aligned with the cage base bottom opening, (iv) an animal waste separator member connected to the collector member which separator member separates urine from feces, comprising a proximal opening, a distal opening, a front, sides, a back, a bottom, a proximal chute member connected to the sides, a distal chute member connected to the sides, a first container connector connected to the bottom, and a second container connector connected to the bottom, the proximal chute member comprises a proximal terminus, a distal terminus in association with the back of the separator member, and an anterior surface; the distal chute member comprises a proximal terminus, a distal terminus, an anterior surface, and a posterior surface, the distal chute member is not connected to the proximal chute member and is not connected to the back, the proximal terminus of the distal chute member is offset vertically and offset horizontally from the distal terminus of the proximal chute member, the first container connector is in effective connection with the distal chute member and comprises a first bore surface terminating at the bottom of the separator member, the second container connector is in effective connection with the proximal chute member and comprises a second bore surface terminating at the bottom of the separator member, and the first container connector is anterior to the second container connector.

Provided also in certain aspects is an animal waste collecting animal containment cage that includes an insert member in contact with the collector member.

Provided also in some aspects is an animal waste collecting animal containment cage that includes a conical collector member without an insert member.

Also provided in certain aspects is an animal waste collecting animal containment cage that includes a first container for the collection of feces and a second container for the collection of urine.

Provided in certain aspects, is an animal waste collecting animal containment cage that is disposable.

Provided also in certain aspects is an animal waste collecting animal containment cage that is disposed within a rack.

Provided also in certain aspects is an animal waste collecting animal containment cage that is not disposed within a rack.

Also provided in certain aspects, is a method of using an animal waste collecting animal containment cage to collect and separate urine and feces.

Provided also in certain aspects, is a method of assembling an animal waste collecting animal containment cage.

Also provided in certain aspects, is a method of nesting components of an animal waste collecting animal containment cage.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments. Tangent lines appear as broken lines.

FIG. 3A is with a grid. FIG. 3B is without a grid.

FIG. 6A is a perspective view. FIG. 6B is top view.

FIG. 7A is an exploded top/side oriented perspective view showing a collector member, insert member and separator member. FIG. 7B is a top perspective exploded view of an insert member, a collector member and a separator member. FIG.

7C is a top/side perspective view showing a collector member, insert member in the collector member, together with a separator member.

Figure 8:
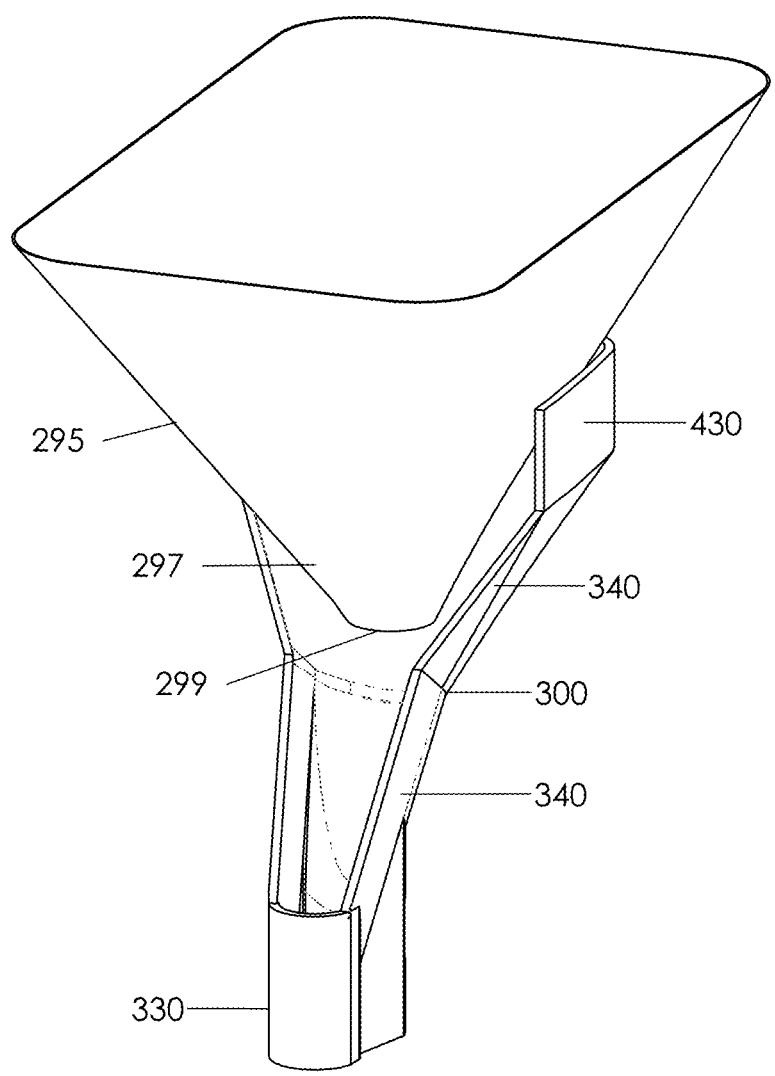

FIG. 8 is a view of a conical collector member and separator member.

Figure 9A:
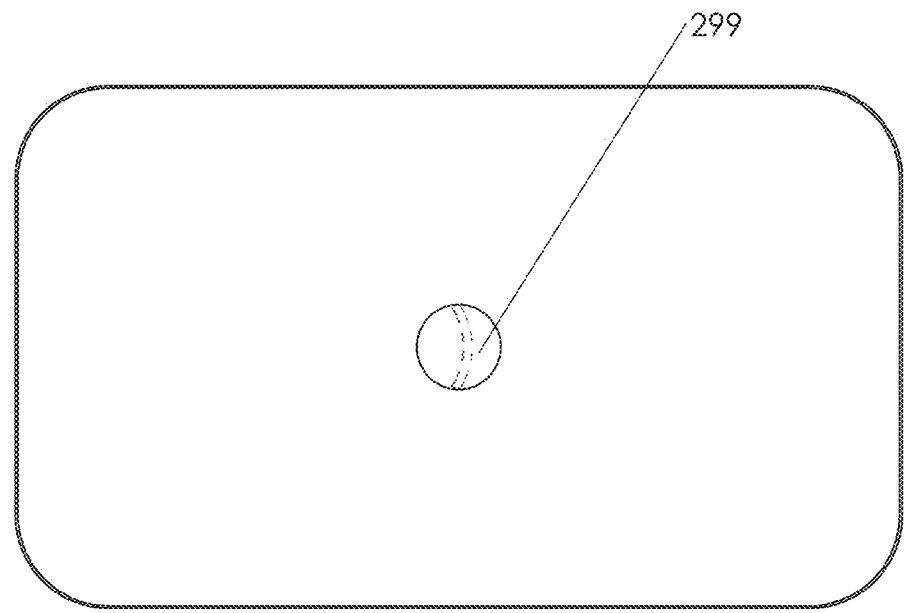
Figure 9B:
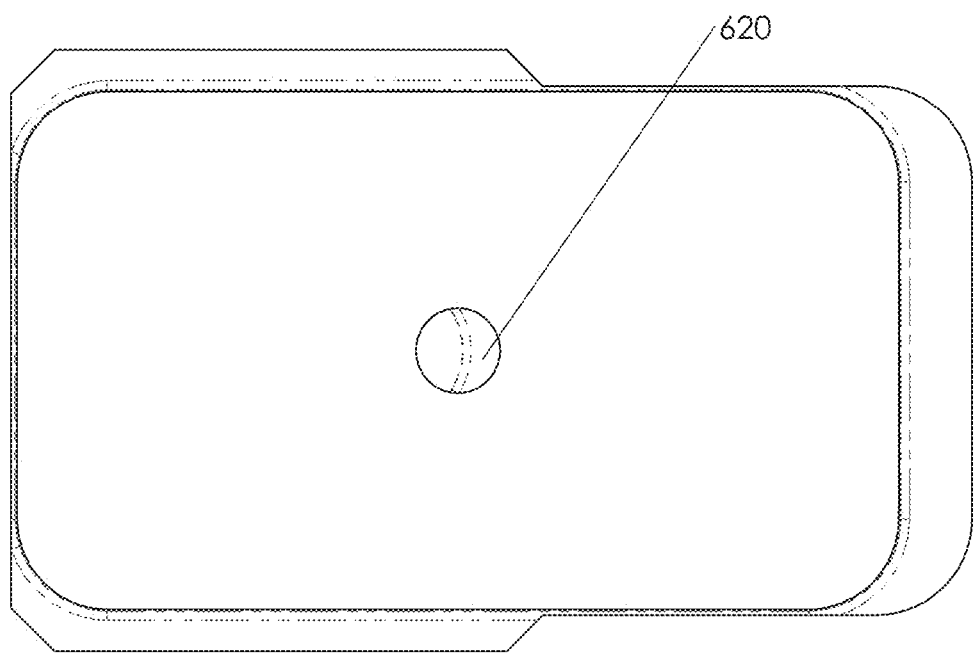

FIGS. 9A and 9B are top views of collector member assemblies. FIG. 9A is a view of a conical collector member and corresponds to the structure shown in FIG. 8. The conical collector may be integrated in the cage base or separate and attached to the cage base. FIG. 9B is a view of a collector member with an insert member and corresponds to the structures shown in FIGS. 7A-C.

Figure 10A:
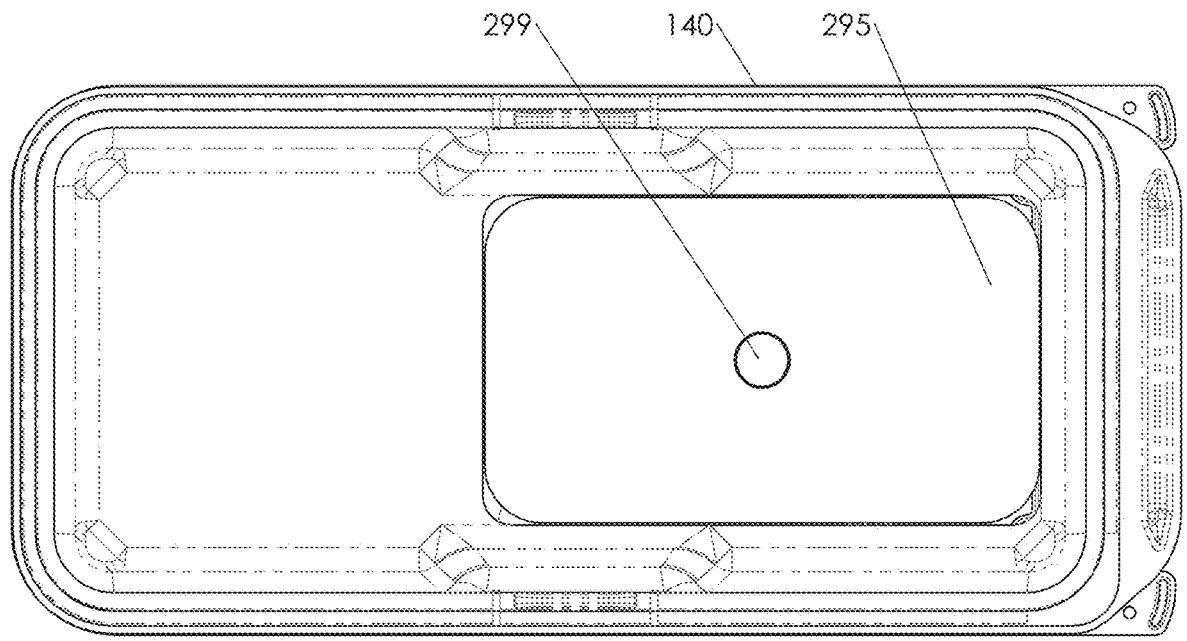
Figure 10B:
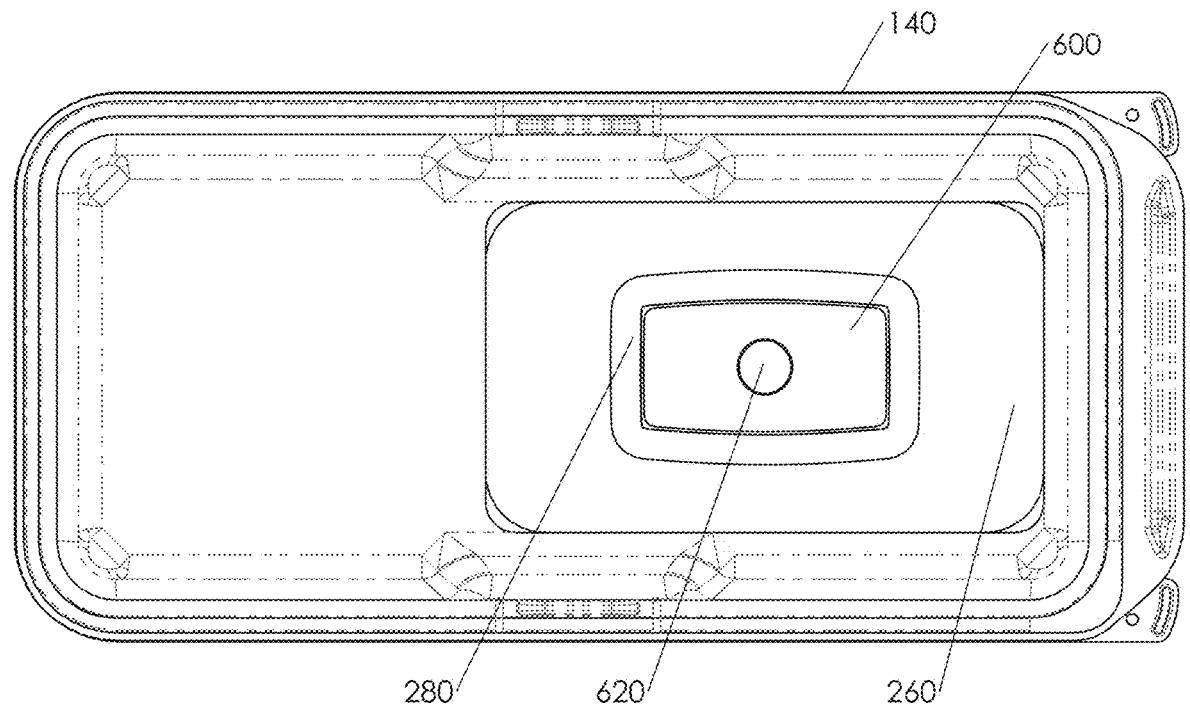

FIGS. 10A and 10B are bottom views of collector member assemblies. FIG. 10A shows a conical collector member integrated with a cage bottom. FIG. 10B is a collector member and insert member attached to a cage bottom.

Figure 11D:
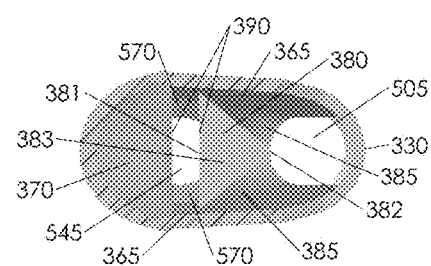
Figure 11A:
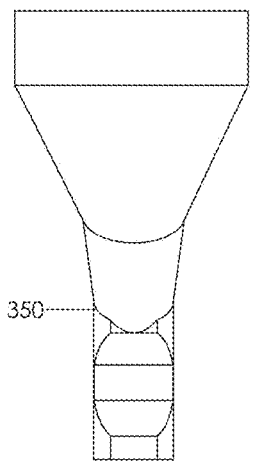
Figure 11B:
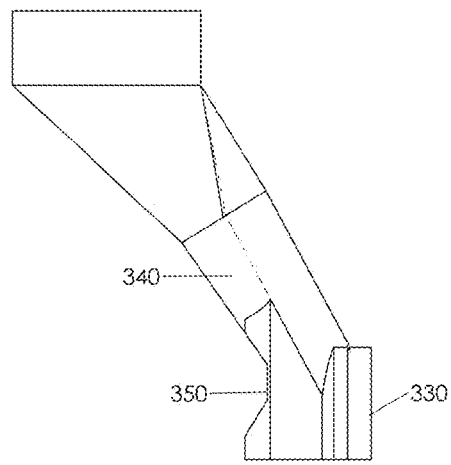
Figure 11C:
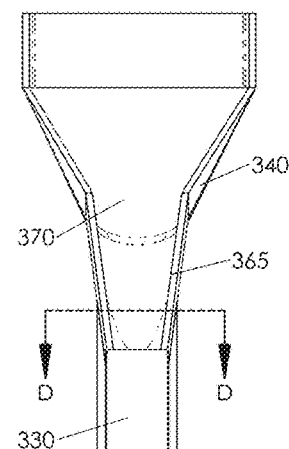

FIGS. 11A-D are views of a separator member. FIG. 11A is a back view. FIG. 11B is a side view. FIG. 11C is a front view. FIG. 11D is a sectional view of D-D of FIG. 11C.

Figure 12A:
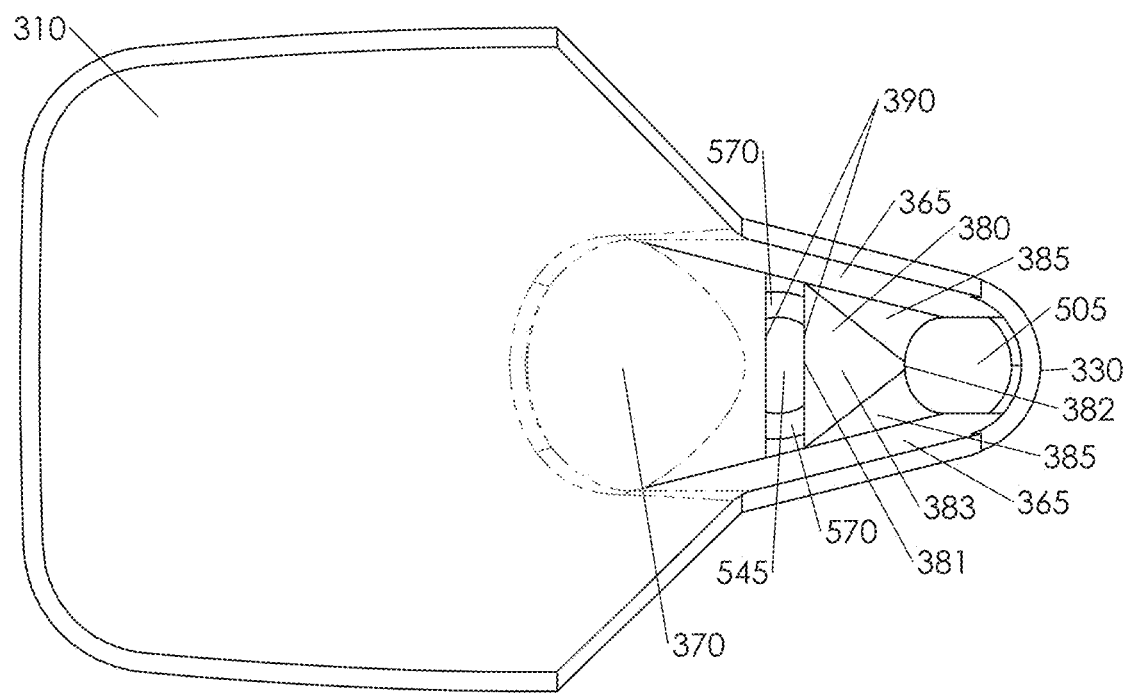
Figure 12B:
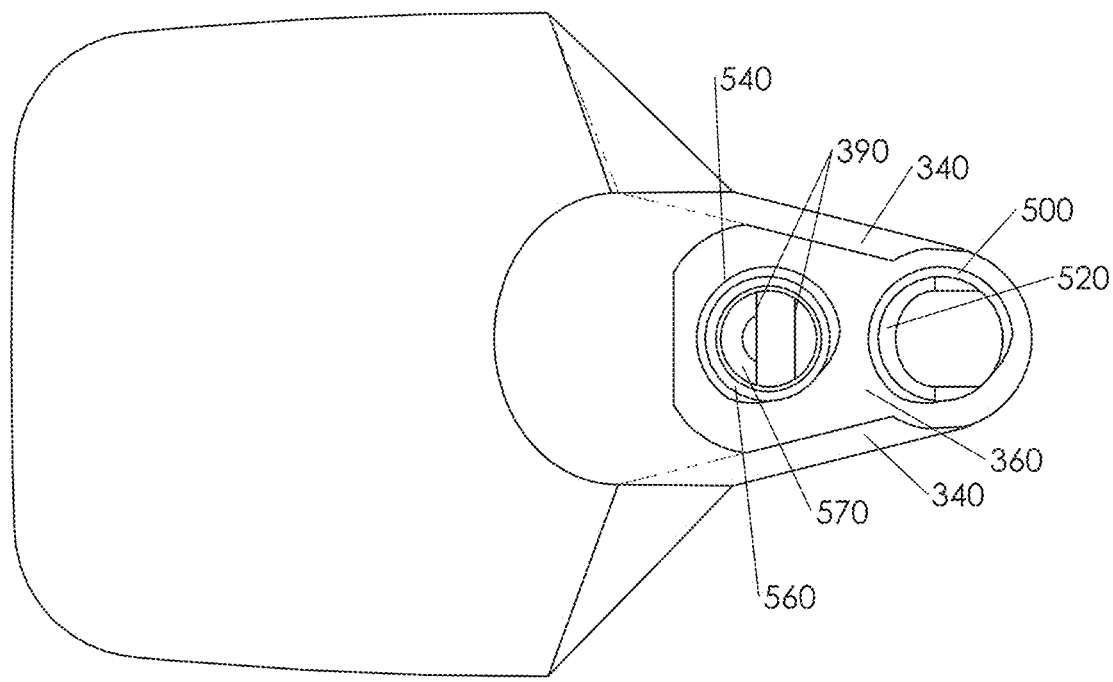

FIGS. 12A and 12B are views of a separator member. FIG. 12A is a top view. FIG. 12B is a bottom view.

FIGS. 13A and 13B are views of a separator member. FIG. 13A is a front view. FIG. 13B is a sectional view of B-B of FIG. 13A.

Figure 14A:
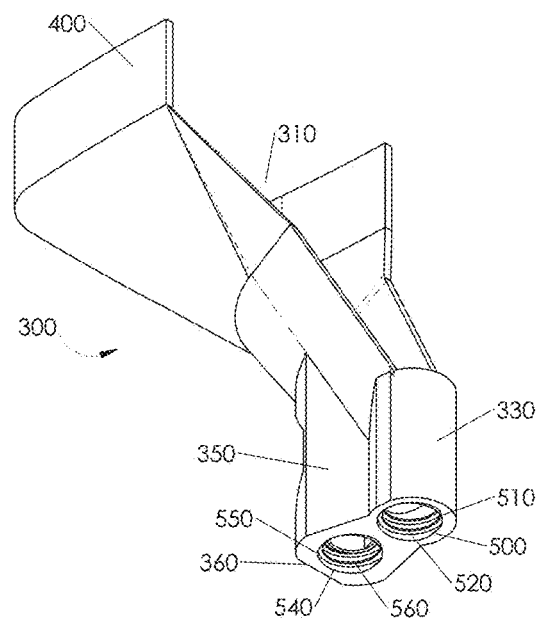
Figure 14B:
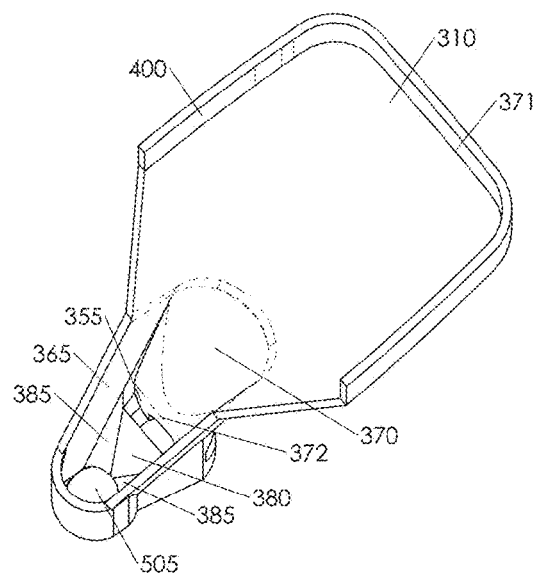

FIGS. 14A and 14B are views of a separator member. FIG. 14A is a bottom perspective view. FIG. 14B is a top perspective view.

Figure 15A:
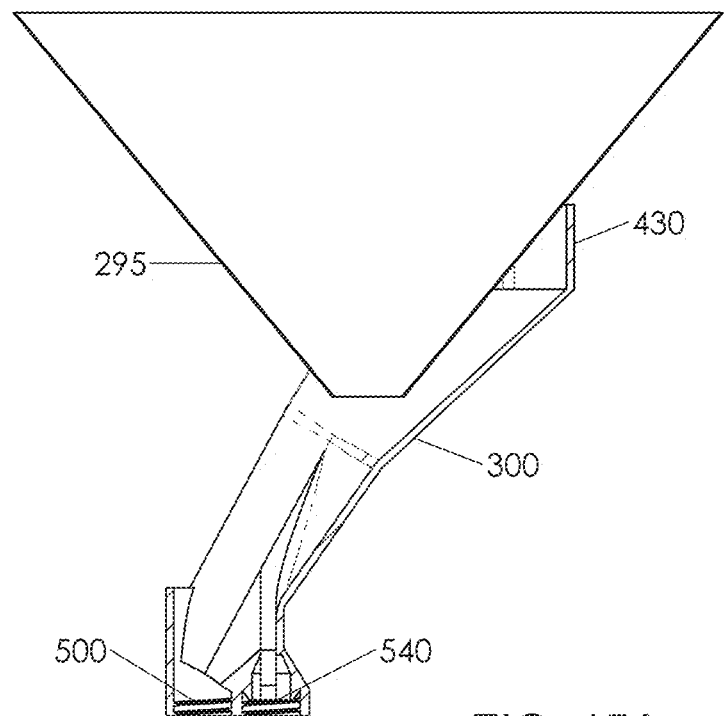
Figure 15B:
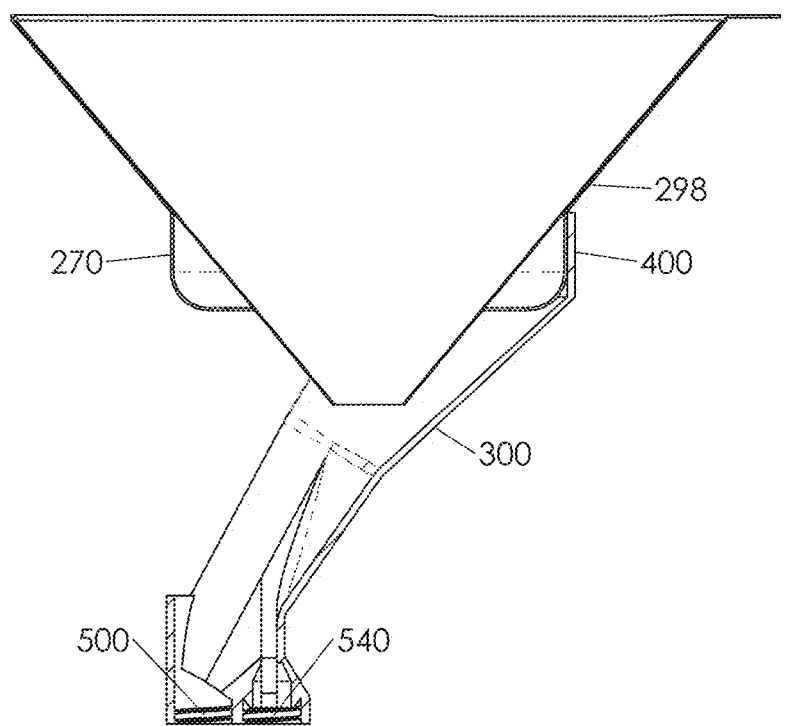

FIGS. 15A and 15B are sectional views with an axial orientation through the center of the separator member showing the separator member attached to collector member assemblies. FIG. 15A is a view of a separator member attached to a conical collector member. FIG. 15B is a view of a separator member attached to a collector member with an insert member.

Figure 16:
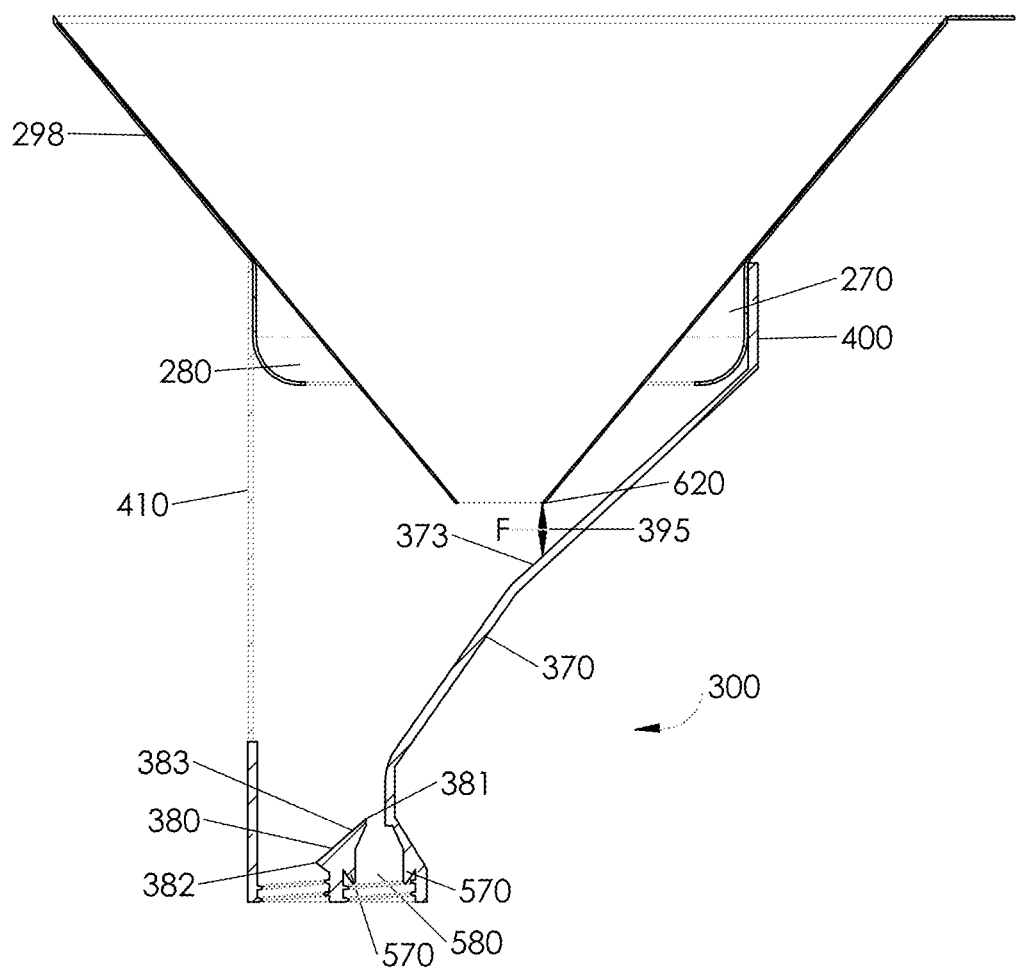

FIG. 16 is a sectional view with an axial orientation through the center of the separator showing a closed configuration.

Figure 17:
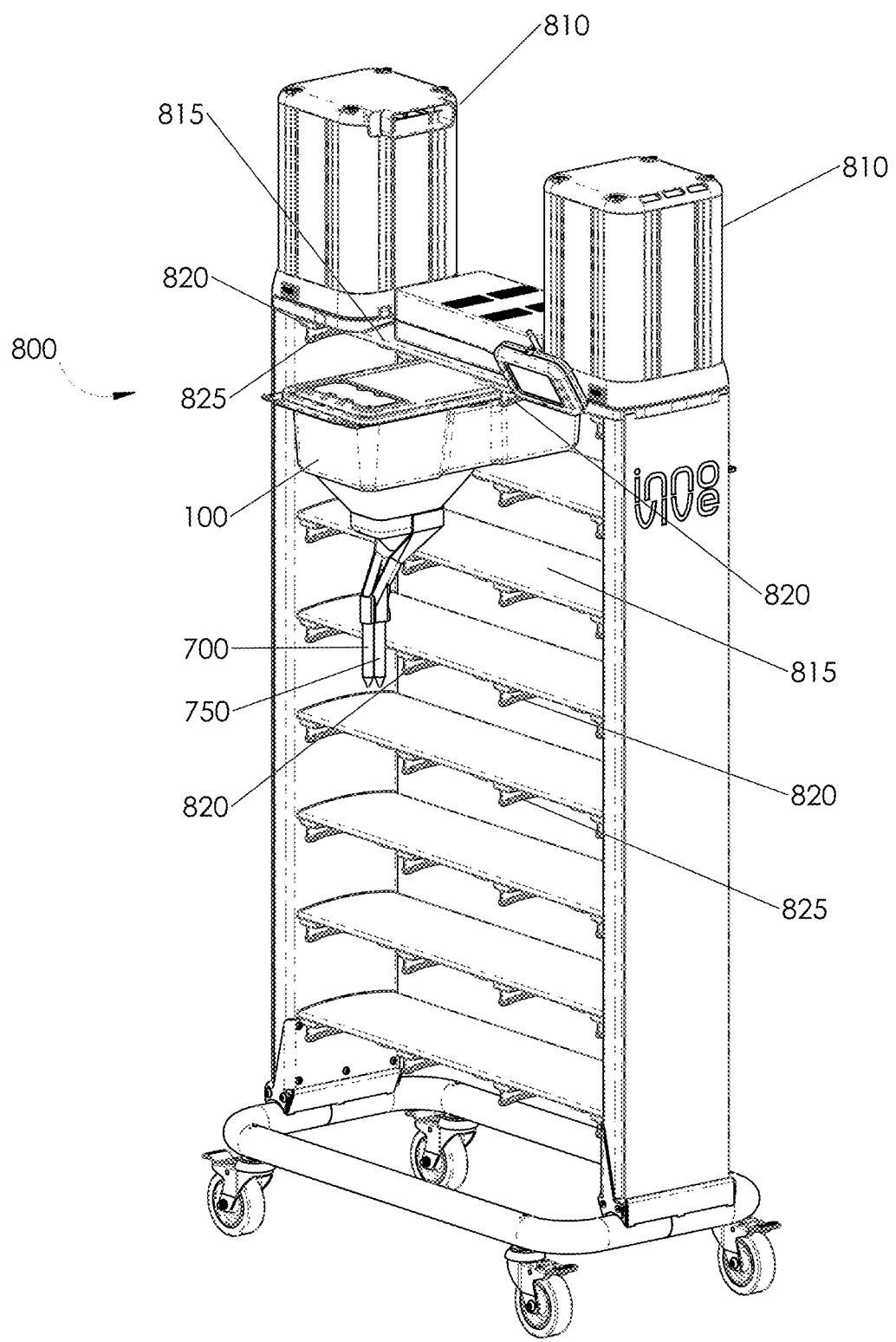

FIG. 17 is a view of an animal waste collecting animal containment cage engaged with a rack.

Figure 18:
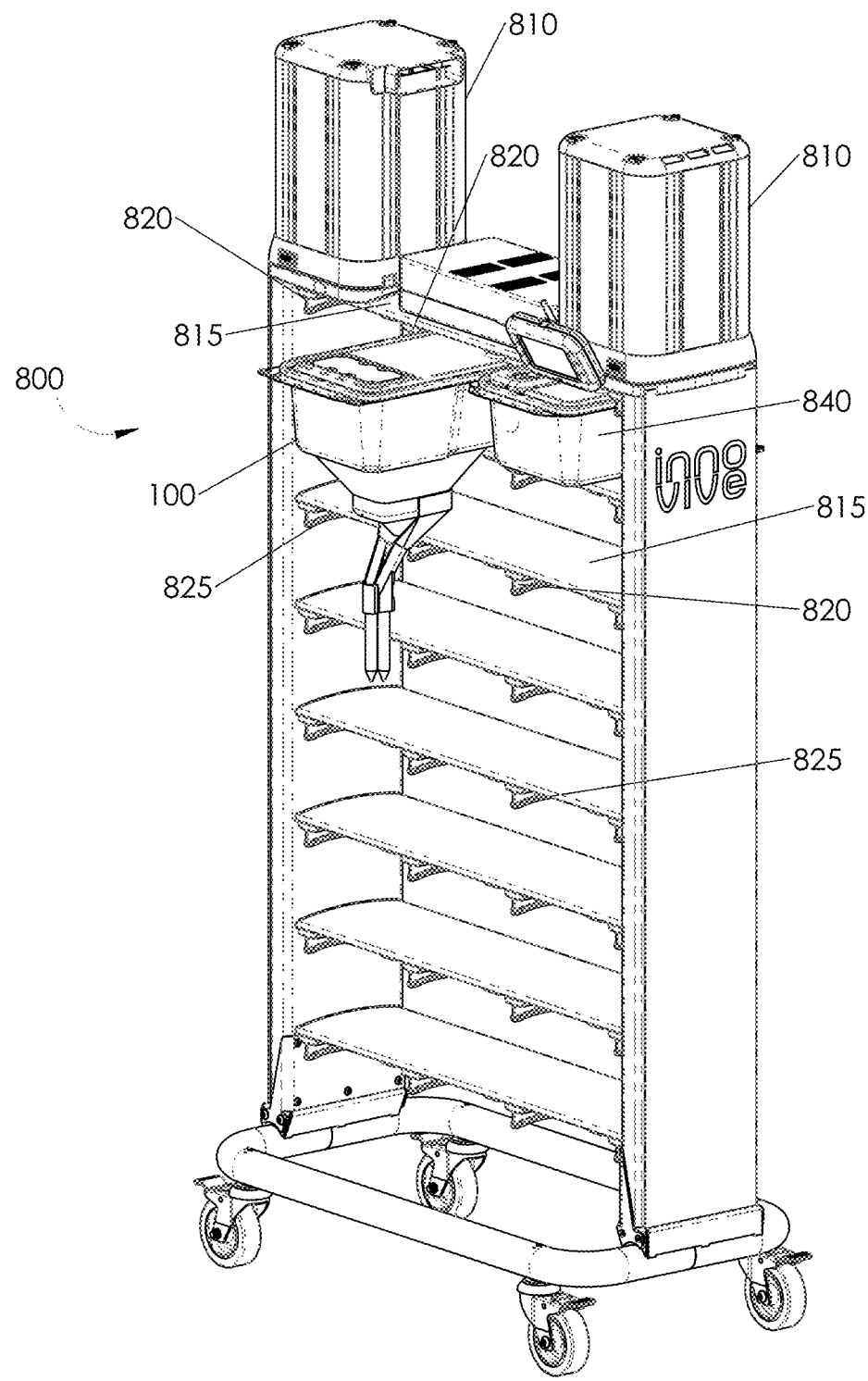

FIG. 18 is a view of an animal waste collecting animal containment cage and a standard cage engaged with a rack.

Figure 19:
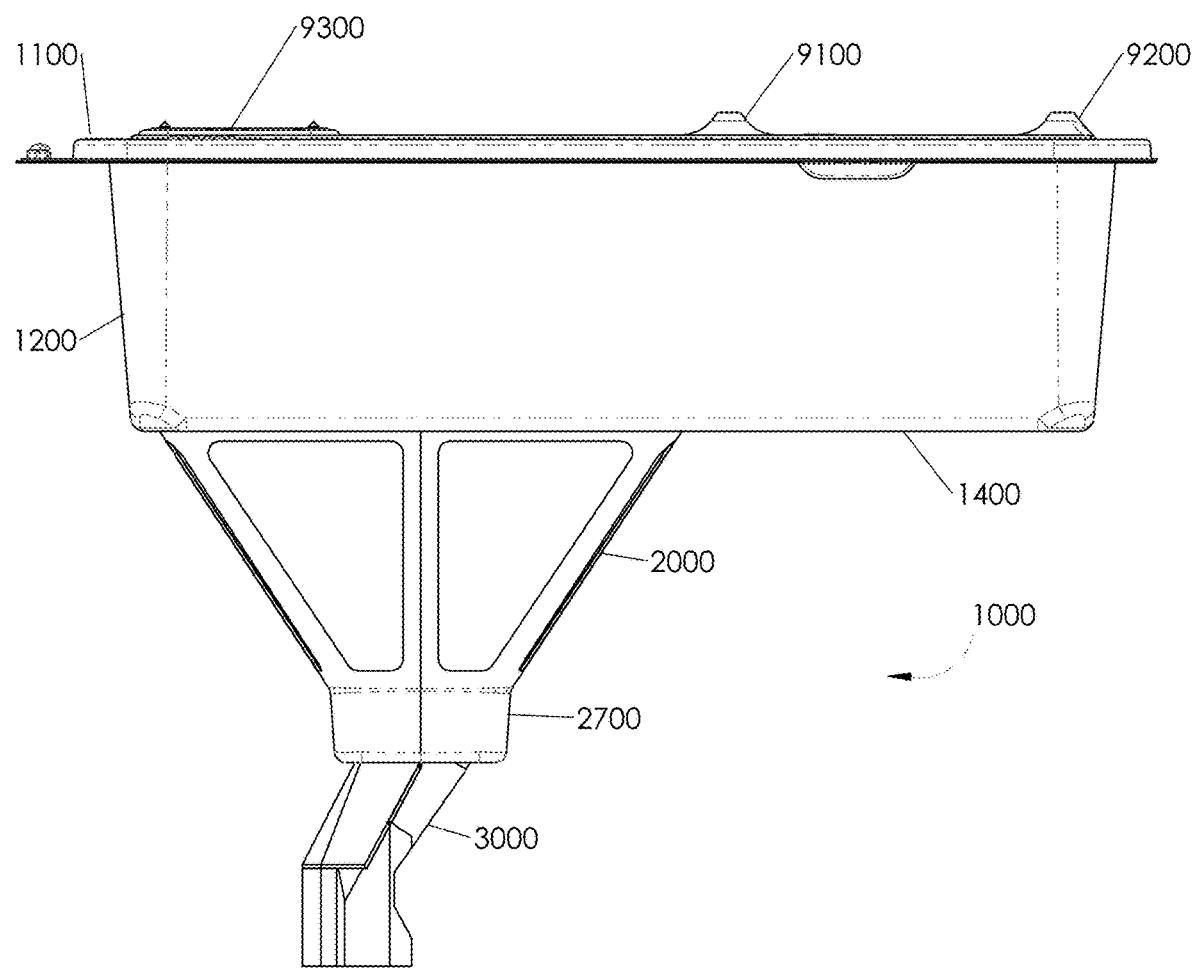

FIG. 19 is a side view of an alternative embodiment 1000 of an animal waste collecting animal containment cage.

Figure 20:
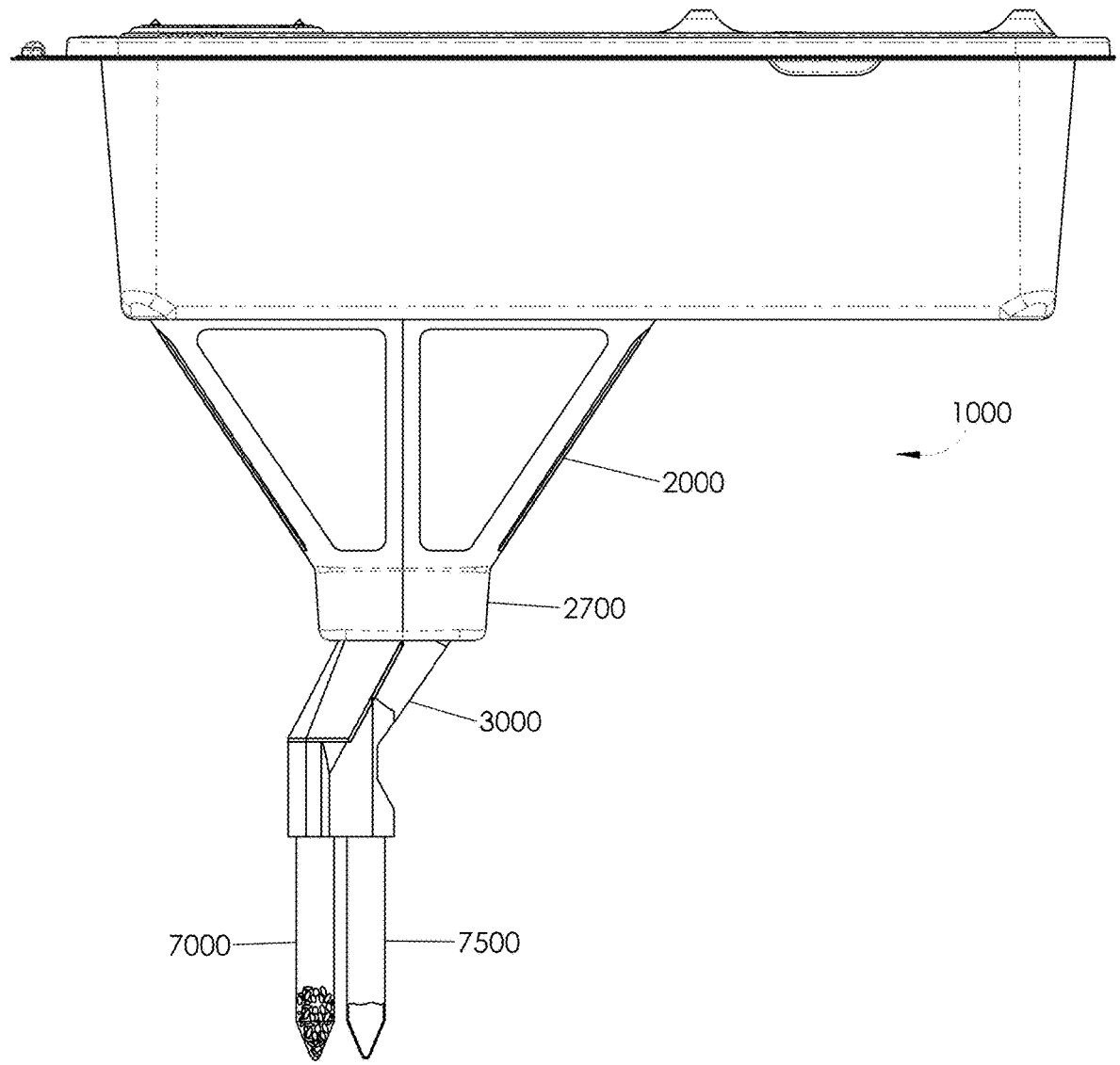

FIG. 20 is a side view of an alternative embodiment 1000 of an animal waste collecting animal containment cage with collection tubes attached.

Figure 21A:
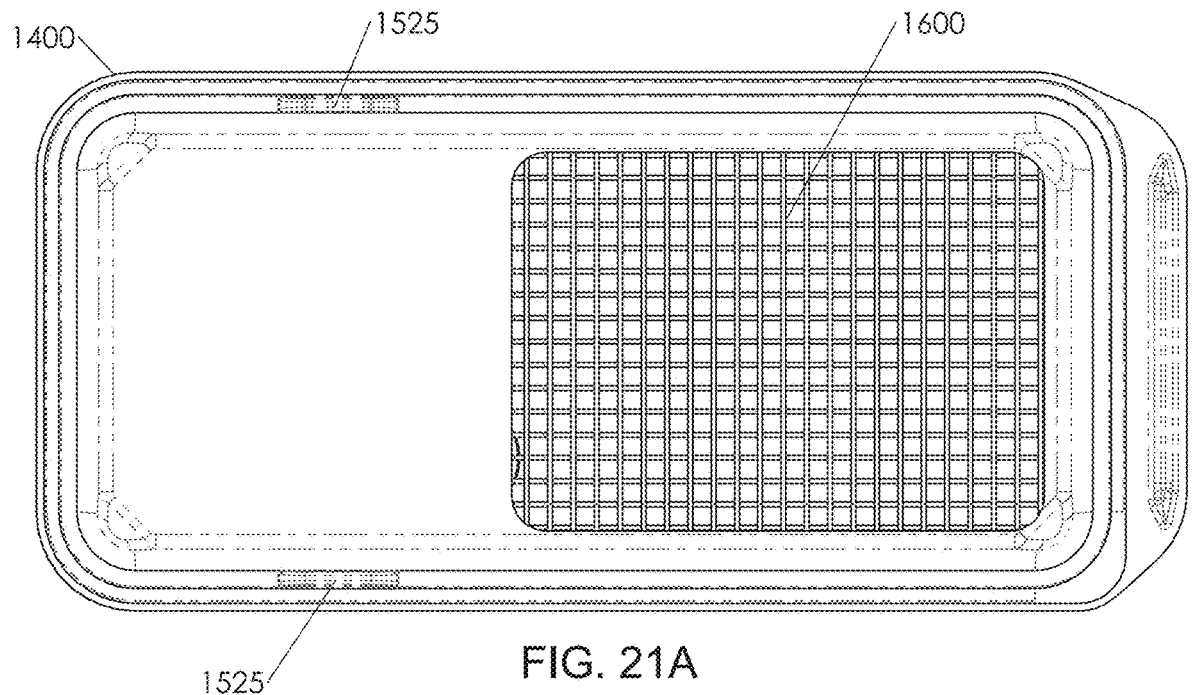
Figure 21B:
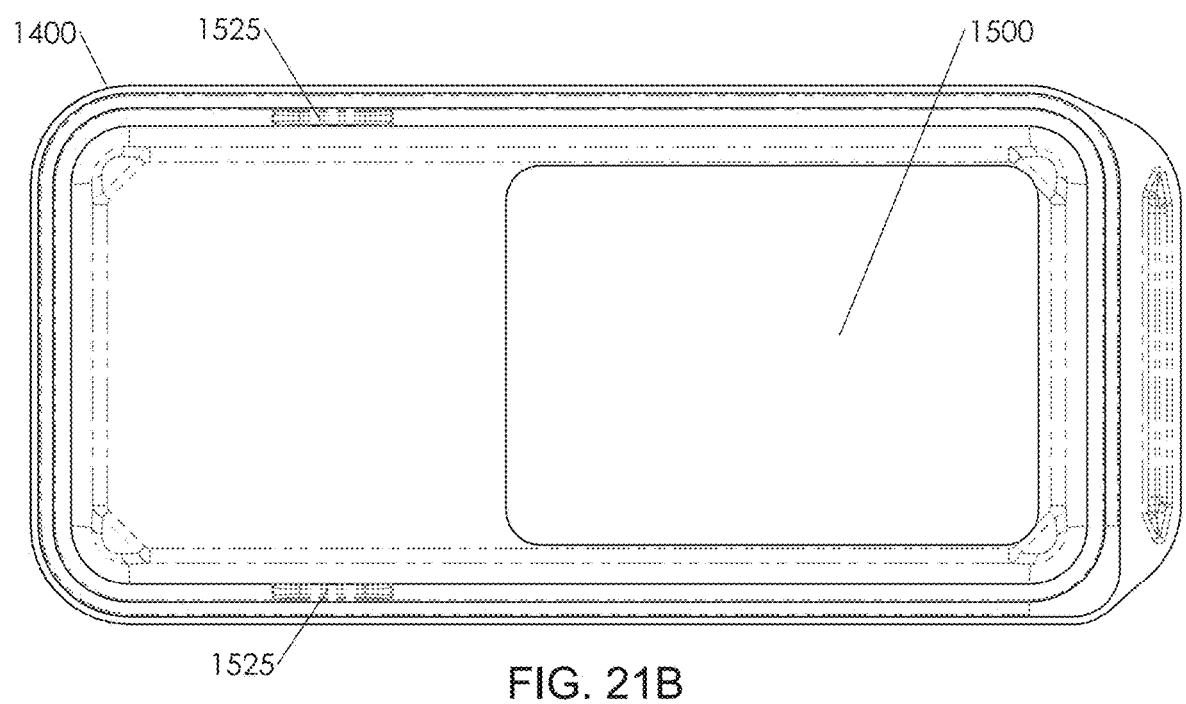

FIGS. 21A and 21B are bottom views of a cage bottom. FIG. 21A is with a grid. FIG. 21B is without a floor grating member.

Figure 22:
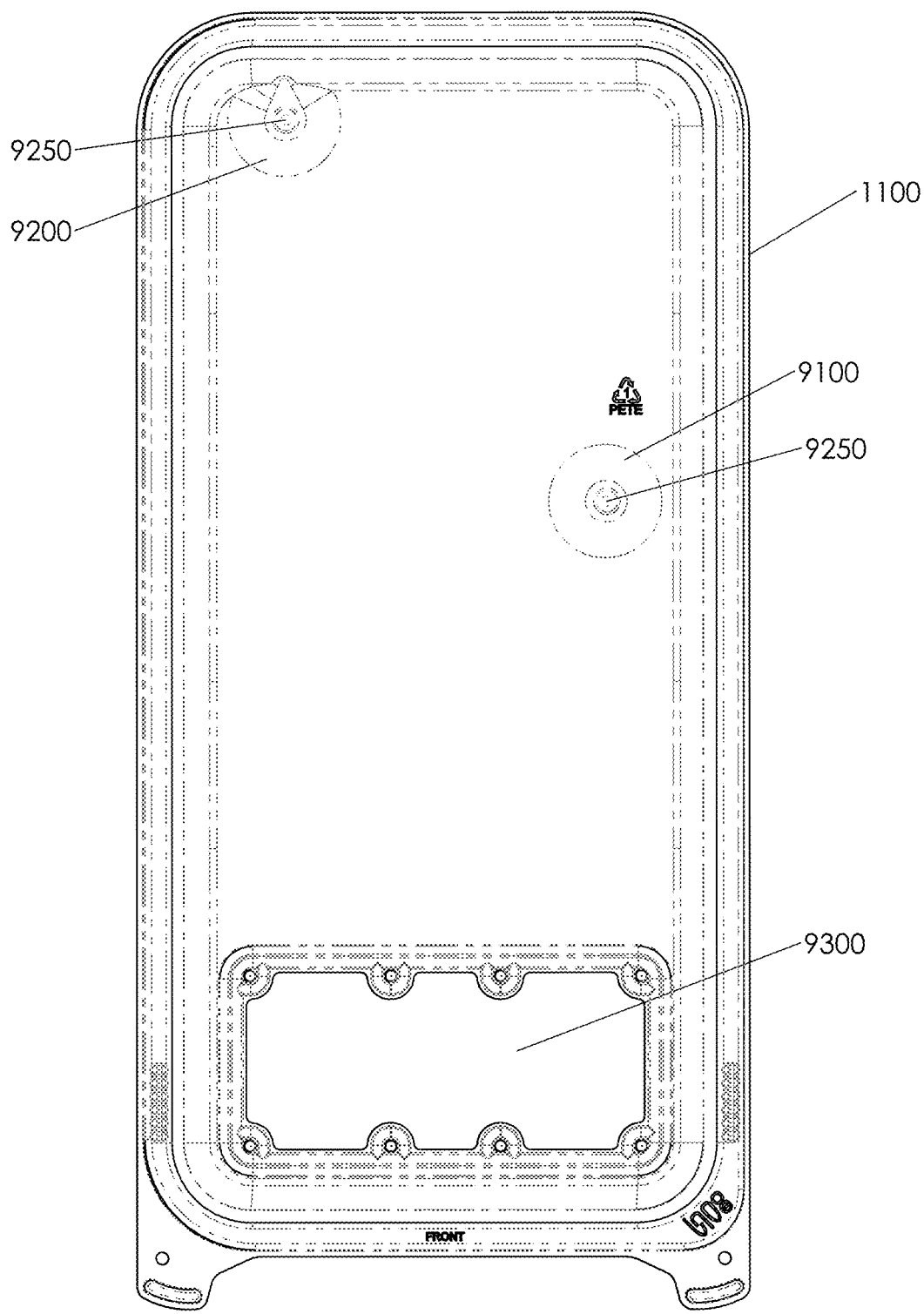

FIG. 22 is a top view of a cage lid.

Figure 23:
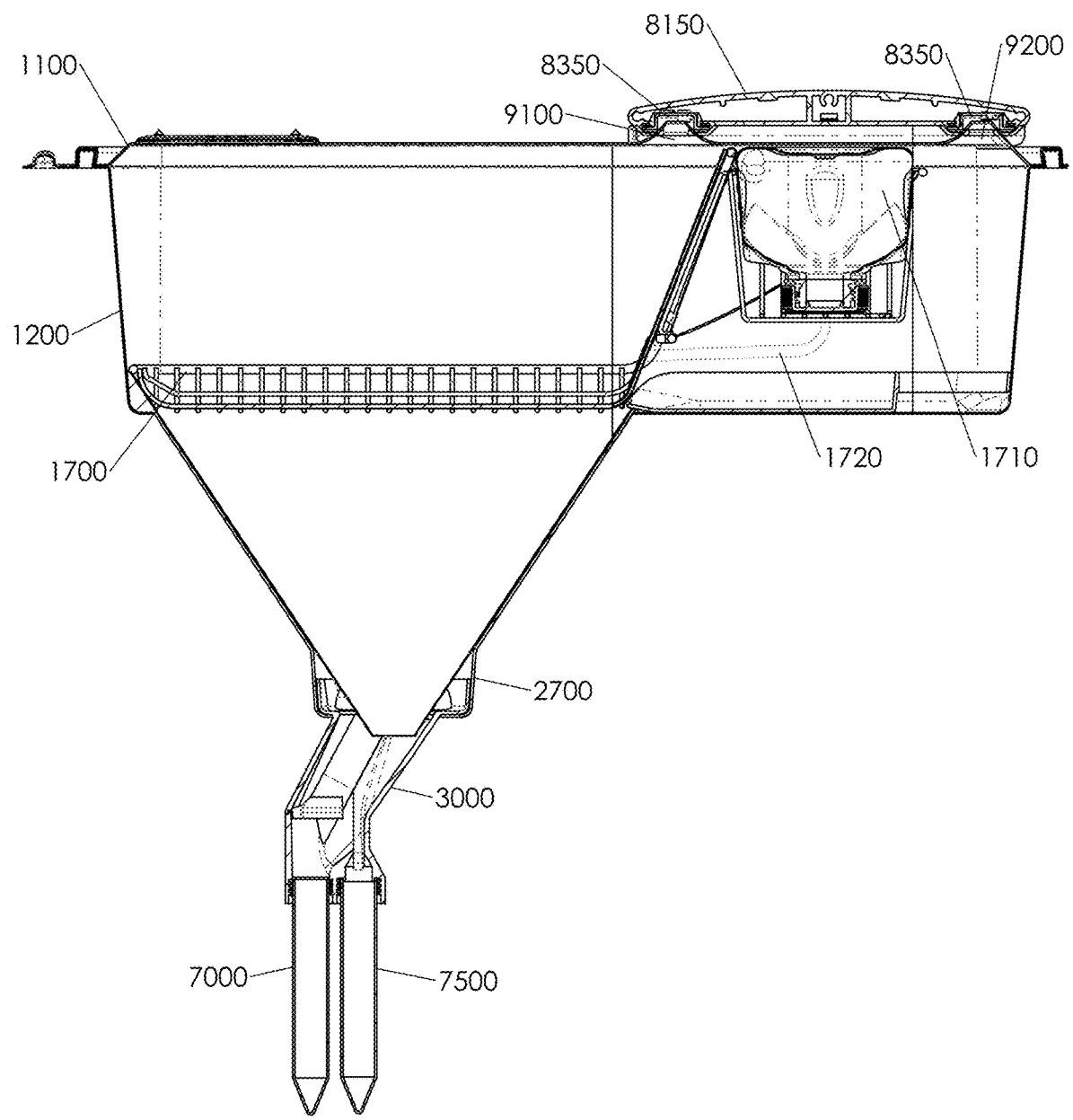

FIG. 23 is a sectional view with an axial orientation through the center of the separator showing an alternative embodiment 1000 of an animal waste collecting animal containment cage engaged with a rack.

FIGS. 24A and 24B are views of an animal waste collecting animal containment cage without a lid. FIG. 24A is a perspective view. FIG. 24B is top view.

FIGS. 25A, 25B and 25C are views of a collector member, insert member and separator member. FIG. 25A is an exploded top/side oriented perspective view showing a collector member, insert member and separator member. FIG. 25B is a top perspective exploded view of a collector member, insert member and separator member. FIG. 25C is a top/side perspective view showing a collector member, insert member in the collector member, together with a separator member.

Figure 26:
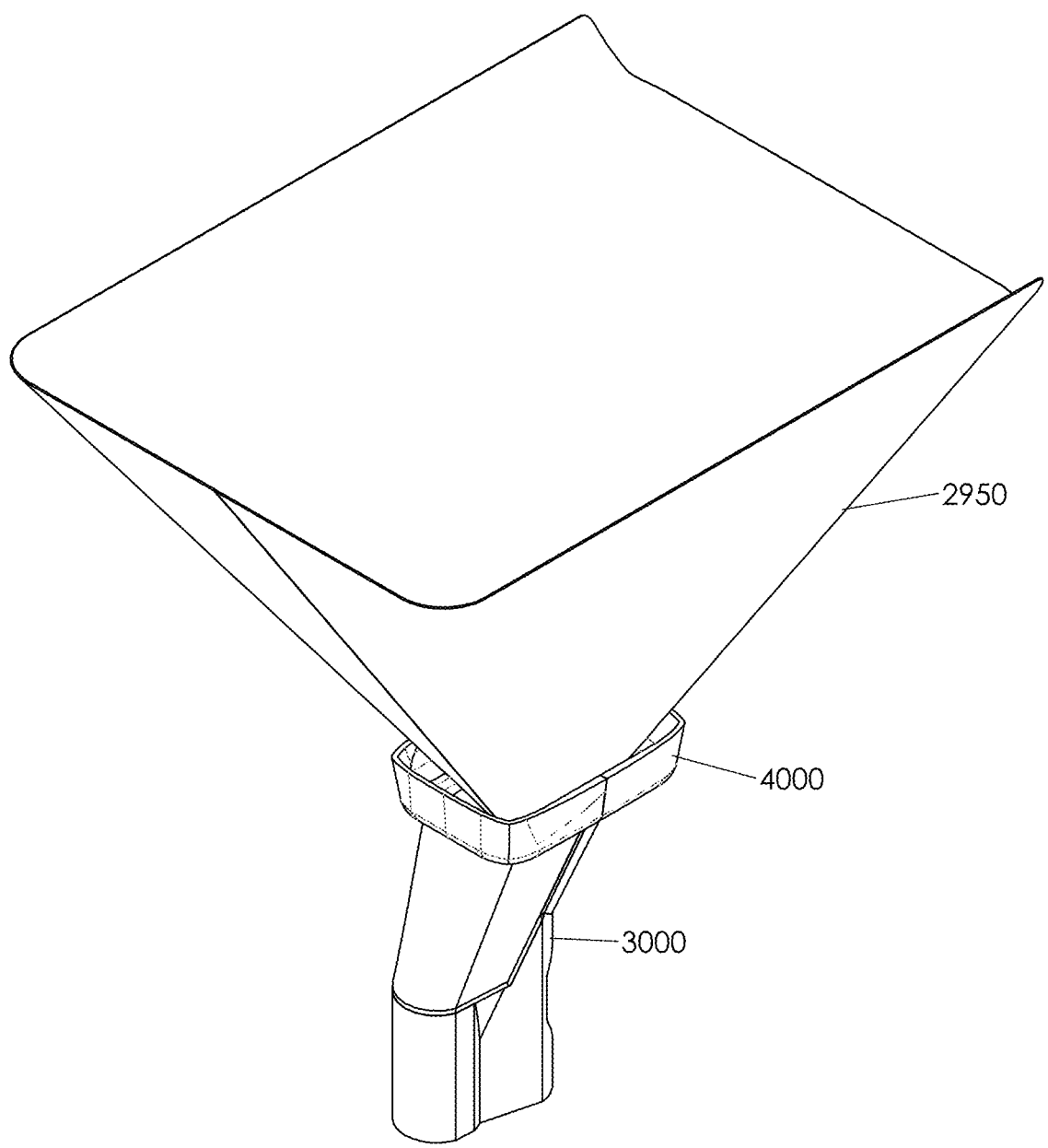

FIG. 26 is a view of a conical collector member and separator member.

Figure 27A:
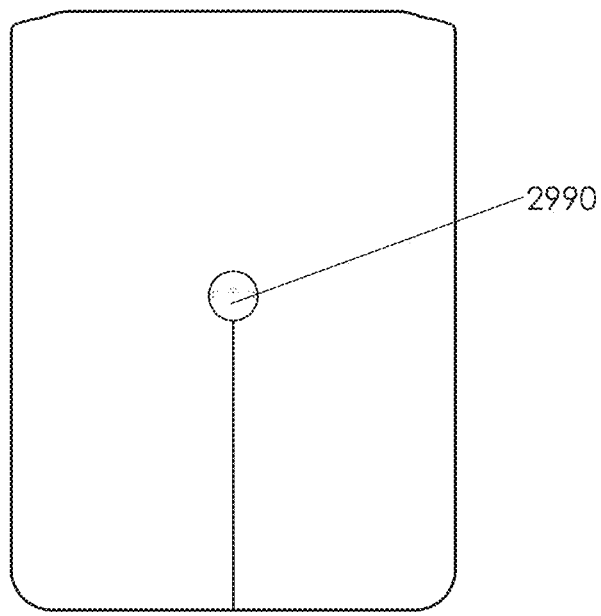
Figure 27B:
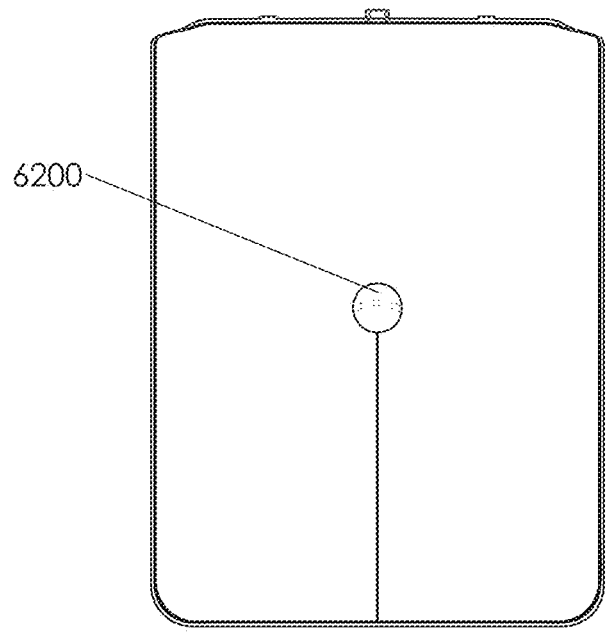

FIGS. 27A and 27B are top views of collector member assemblies. FIG. 27A is a view of a conical collector member and corresponds structure shown in FIG. 26. FIG. 27B is a view of a collector member with an insert member and corresponds to the structures shown in FIGS. 25A-C.

Figure 28A:
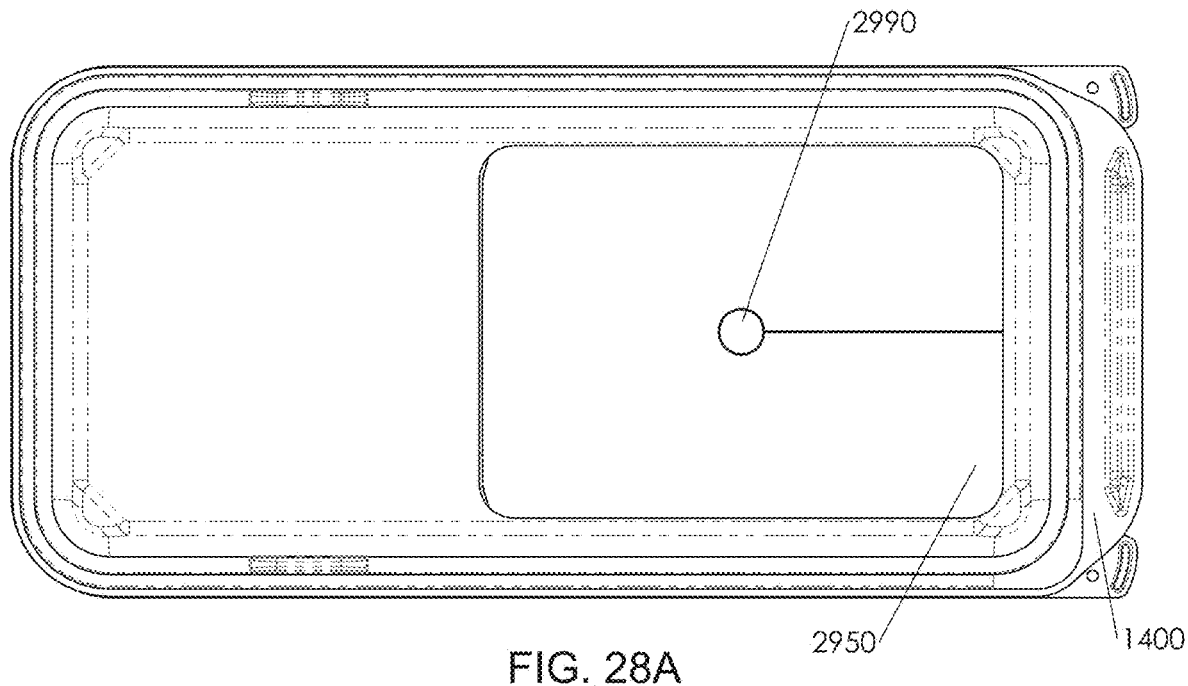
Figure 28B:
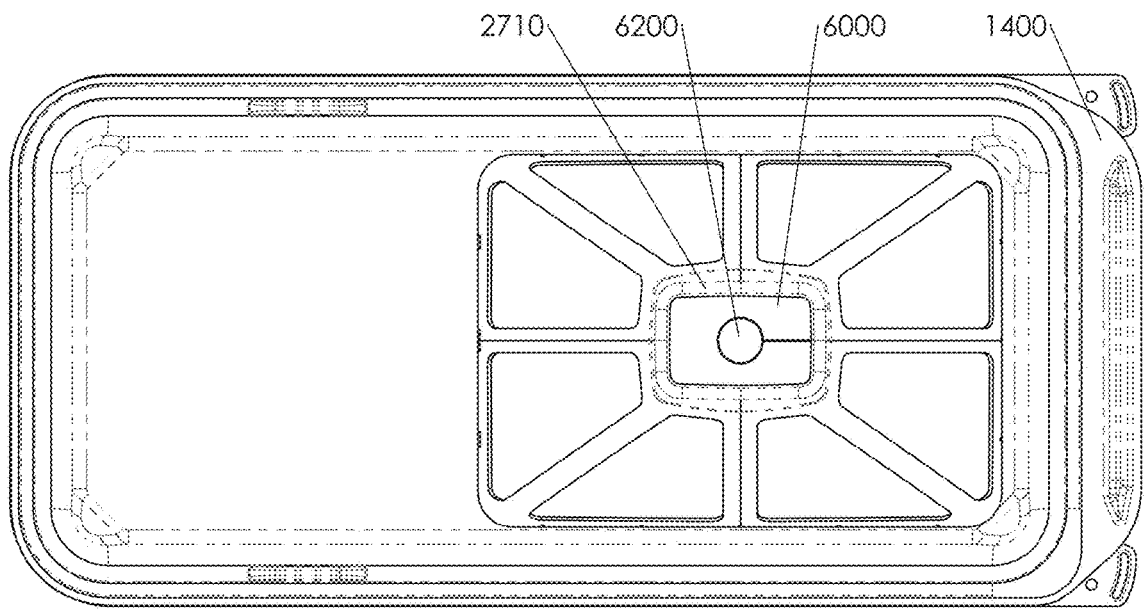

FIGS. 28A and 28B are bottom views of collector member assemblies. FIG. 28A shows a conical collector member attached to a cage bottom. FIG. 28B is a collector member with insert member attached to a cage bottom.

Figure 29D:
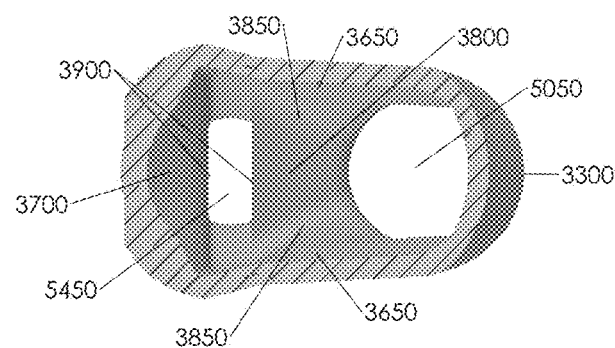
Figure 29A:
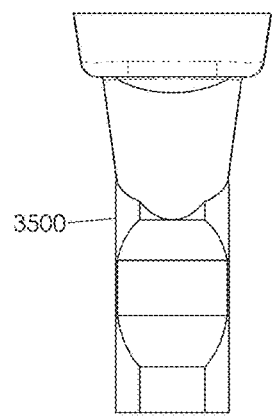
Figure 29B:
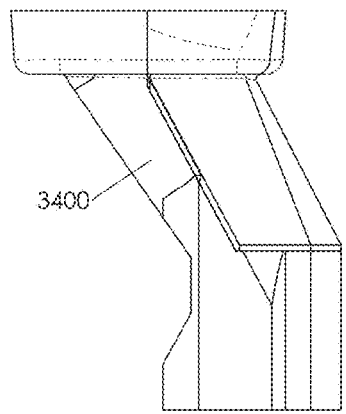
Figure 29C:
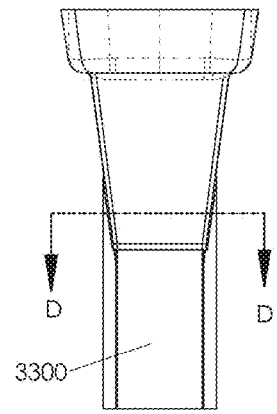

FIGS. 29A-D are views of a separator member. FIG. 29A is a back view. FIG. 29B is a side view. FIG. 29C is a front view. FIG. 29D is a sectional view of D-D of FIG. 29C.

Figure 30A:
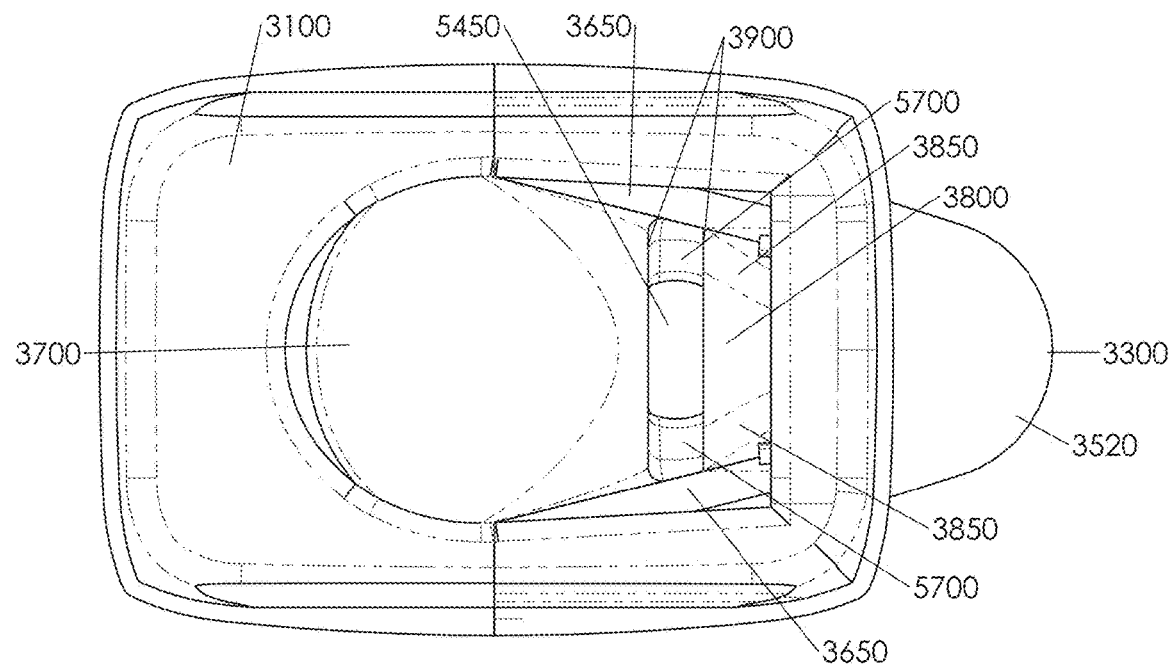
Figure 30B:
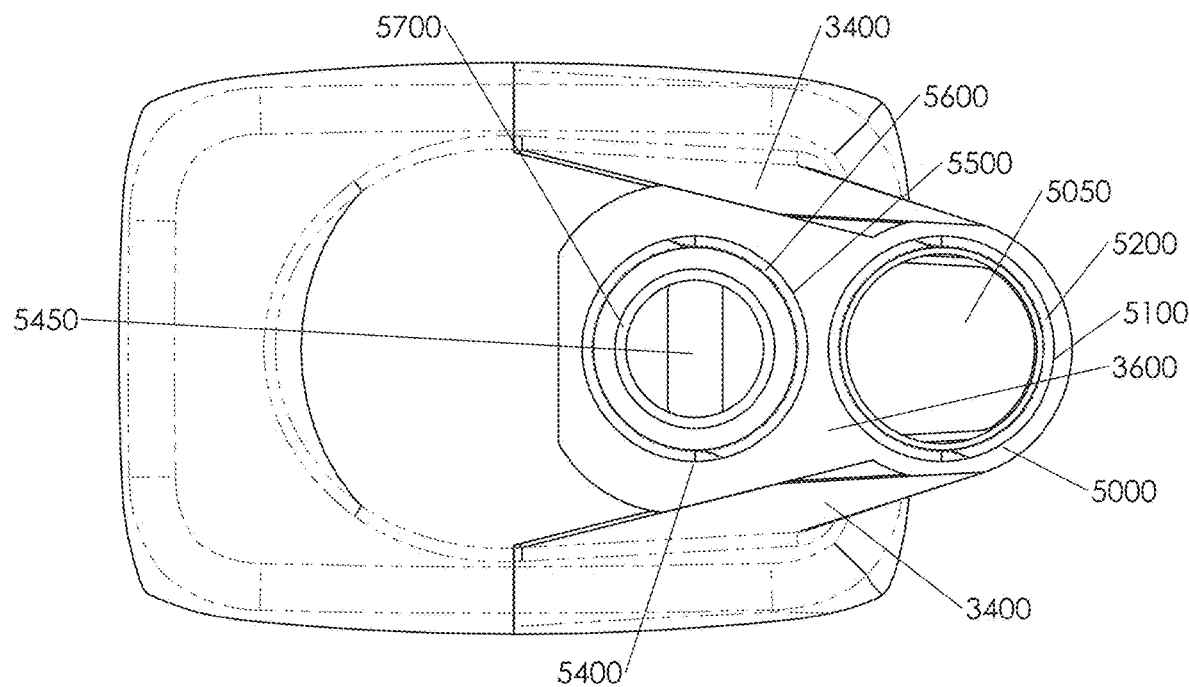

FIGS. 30A and 30B are views of a separator member. FIG. 30A is a top view. FIG. 30B is a bottom view.

Figure 31A:
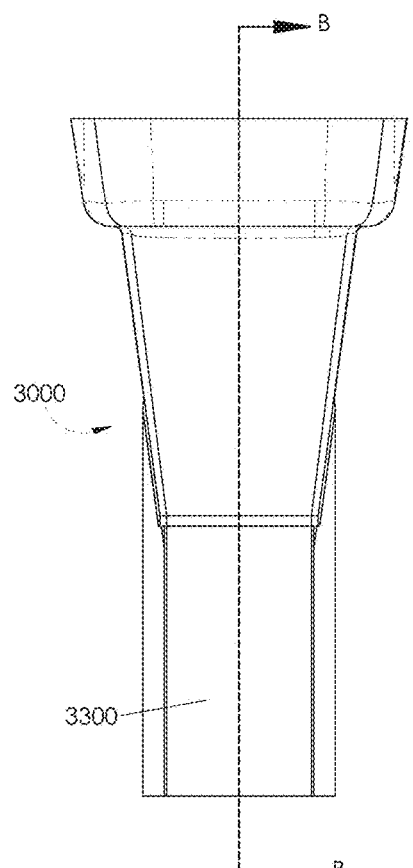
Figure 31B:
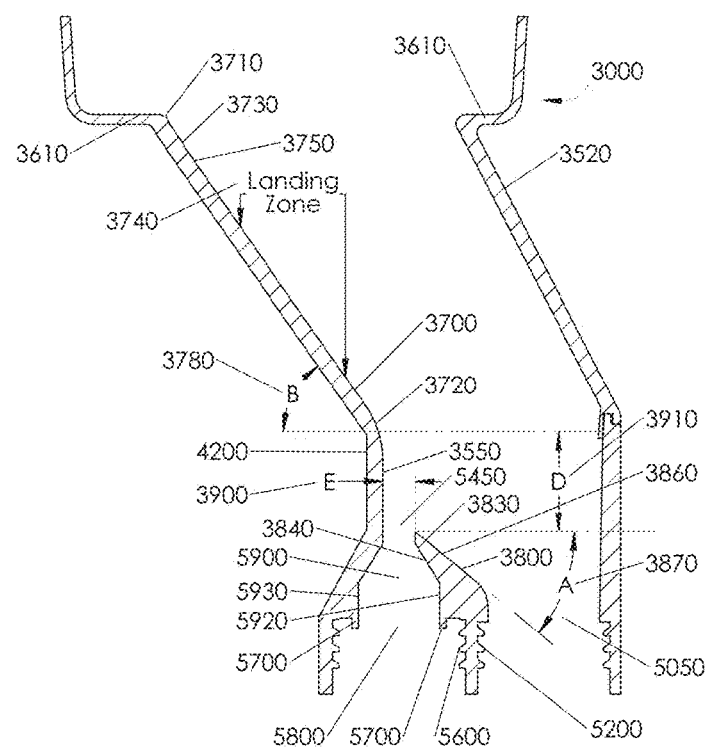

FIGS. 31A and 31B are views of a separator member. FIG. 31A is a front view. FIG. 31B is a sectional view of B-B of FIG. 31A.

Figures 32A, 32B:
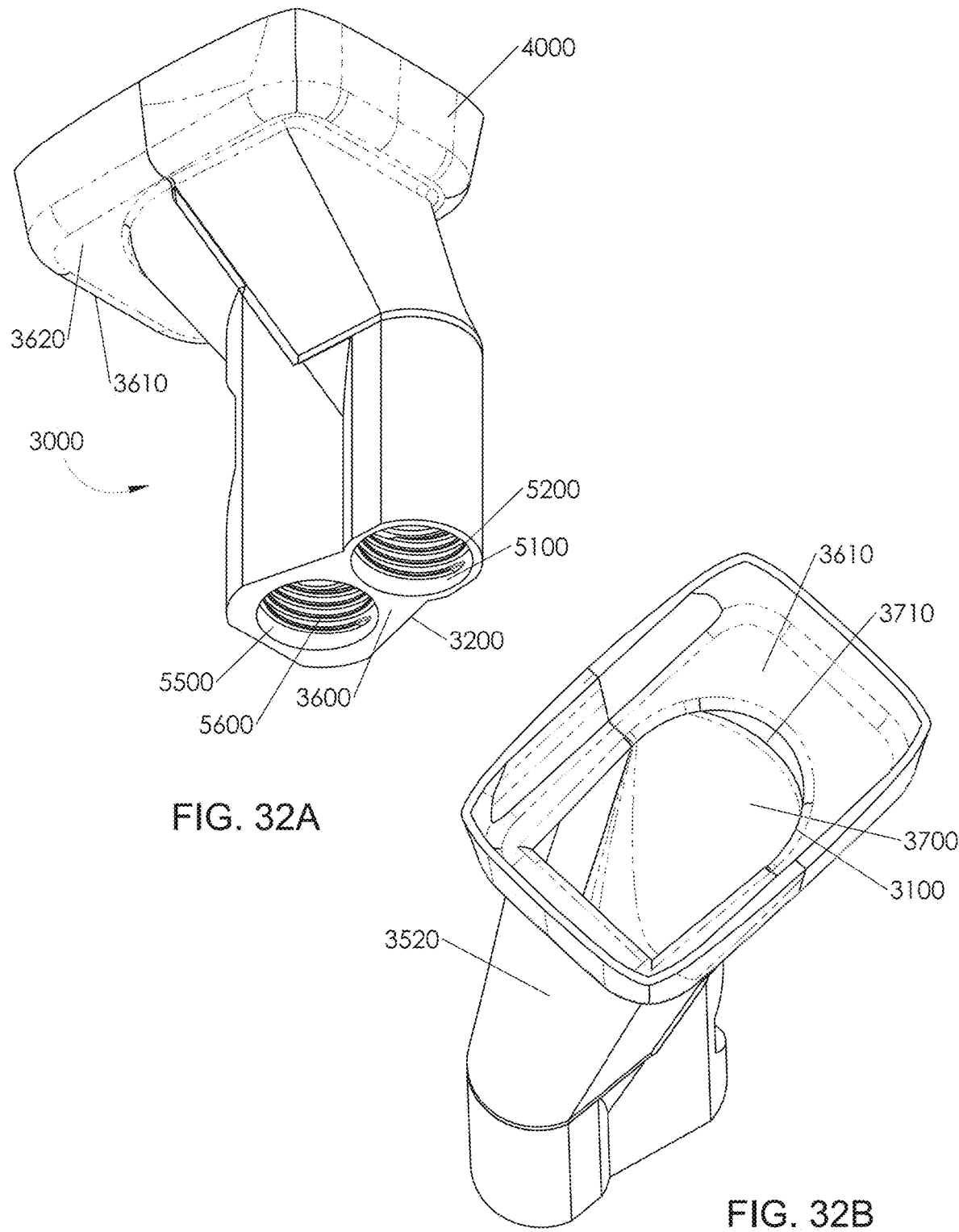

FIGS. 32A and 32B are views of a separator member. FIG. 32A is a bottom perspective view. FIG. 32B is a top perspective view.

FIGS. 33A and 33B are sectional views with an axial orientation through the center of the separator member showing the separator member attached to collector member assemblies. FIG. 33A is a view of a separator member attached to a conical collector member. FIG. 33B is a view of a separator member attached to a collector member with an insert member.

Figure 34:
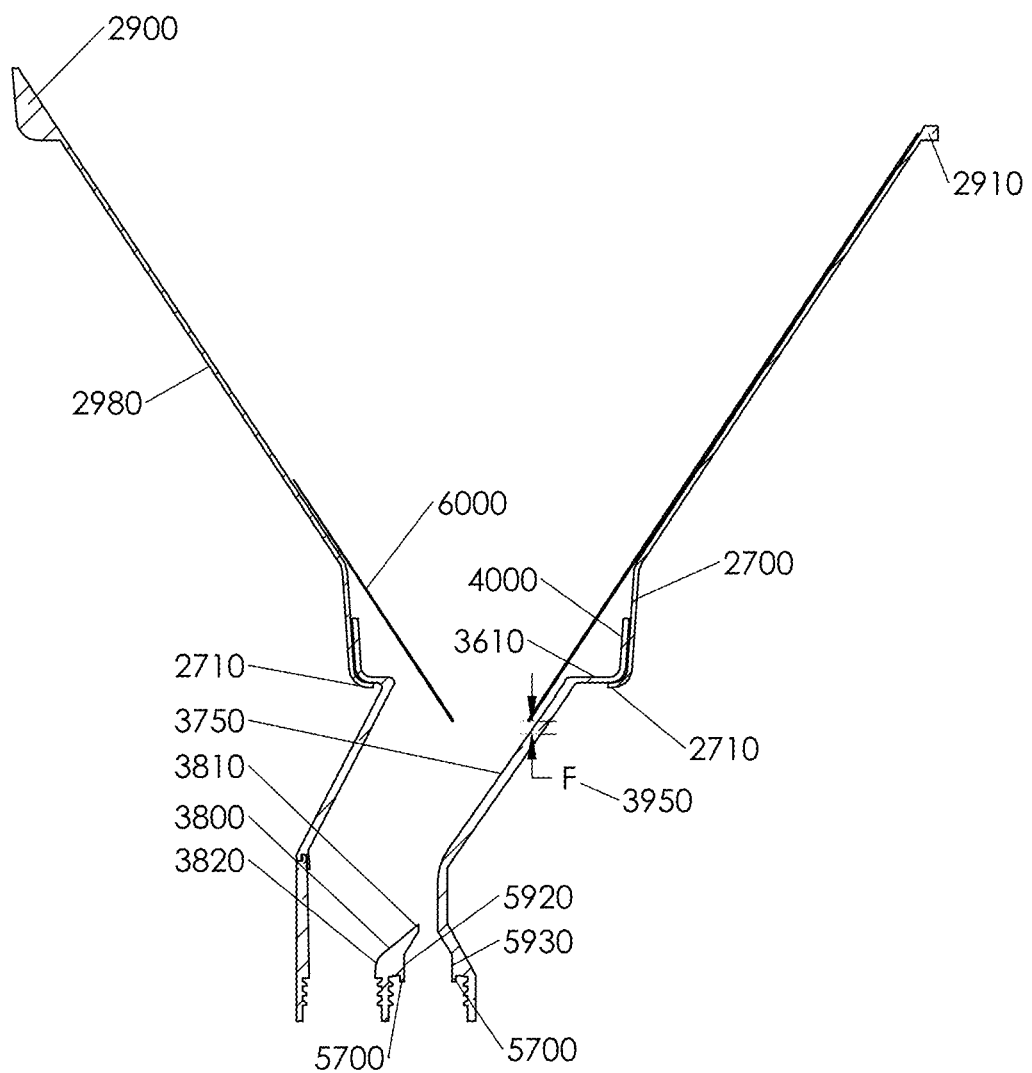

FIG. 34 is a sectional view with an axial orientation through the center of a separator member attached to a collector member with an insert member.

Figure 35A:
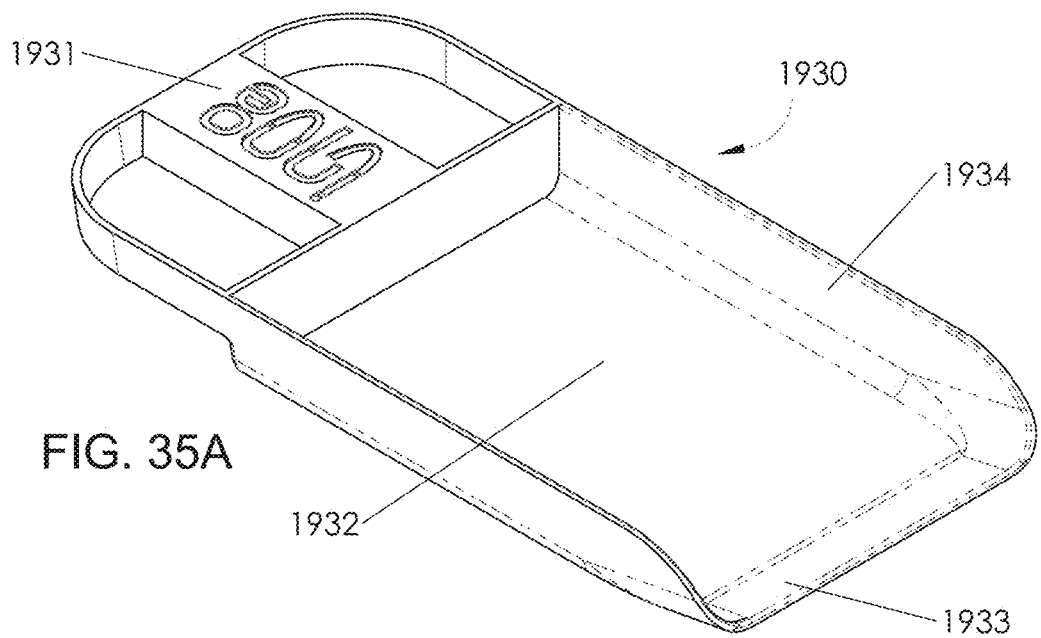
Figure 35B:
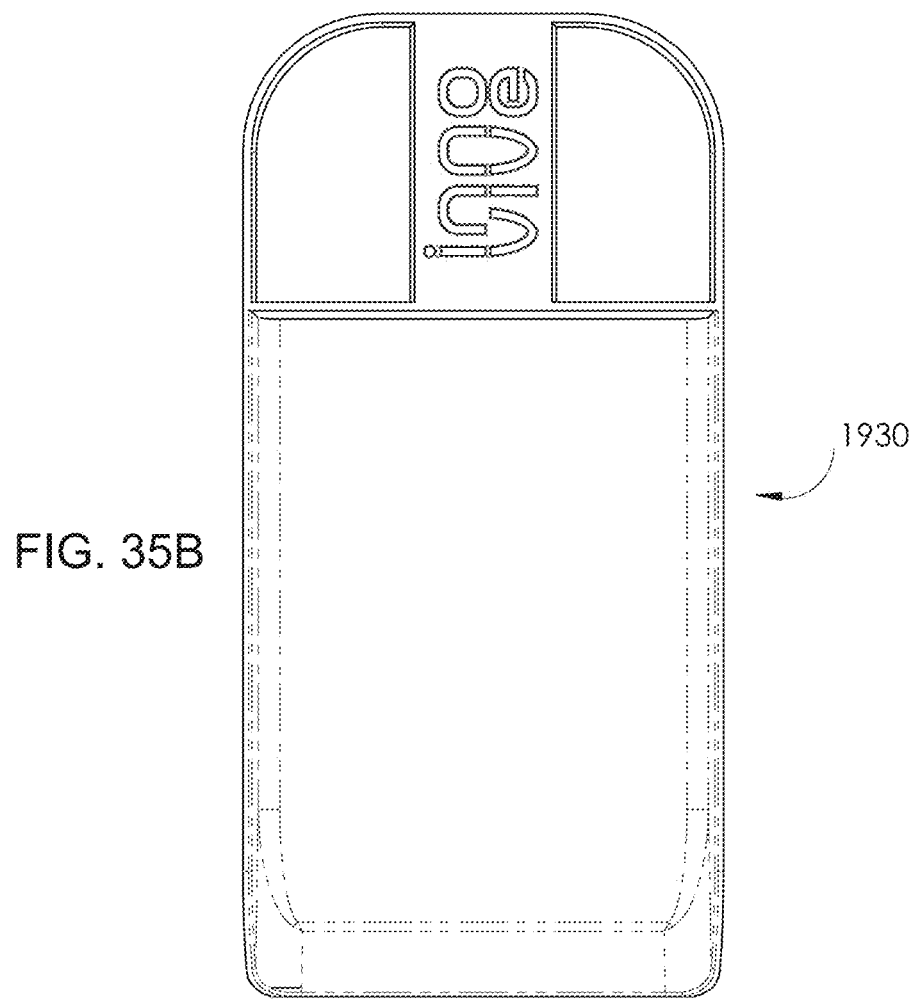

FIGS. 35A and 35B are views of a food and water overflow receptacle. FIG. 35A is a top perspective view. FIG. 35B is a top view.

Figure 36A:
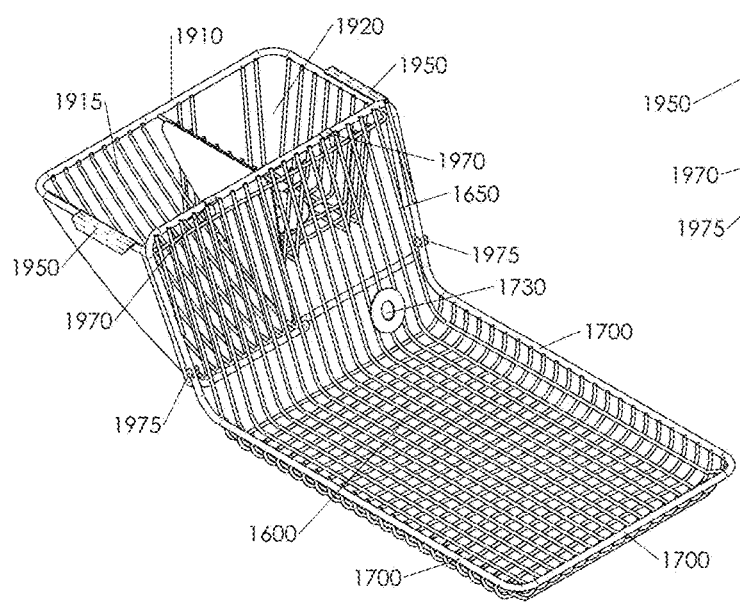
Figure 36B:
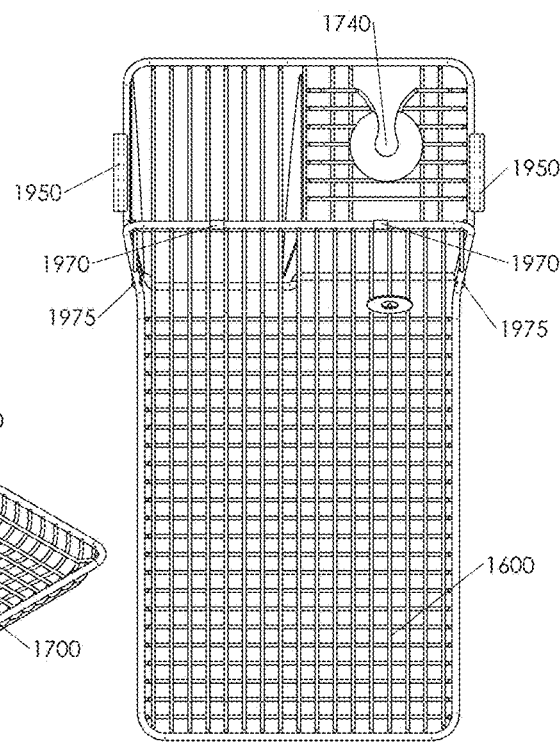

FIGS. 36A and 36B are views of an animal confinement member and food and water holder. FIG. 36A is a top perspective view. FIG. 36B is a top view.

Figure 37A:
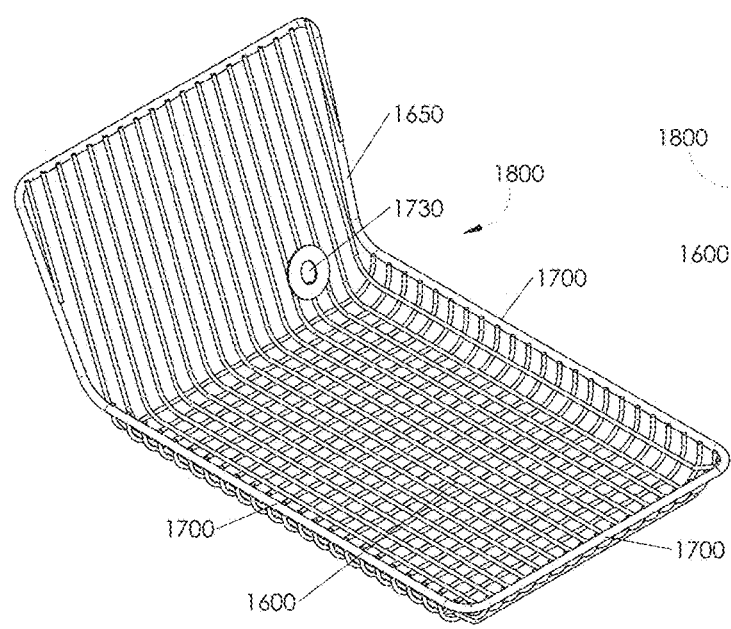
Figure 37B:
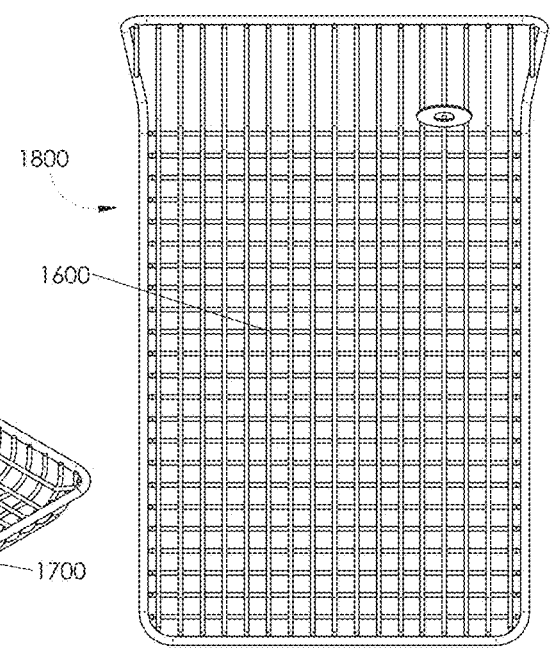

FIGS. 37A and 37B are views of an animal confinement member. FIG. 37A is a top perspective view. FIG. 37B is a top view.

Figure 38A:
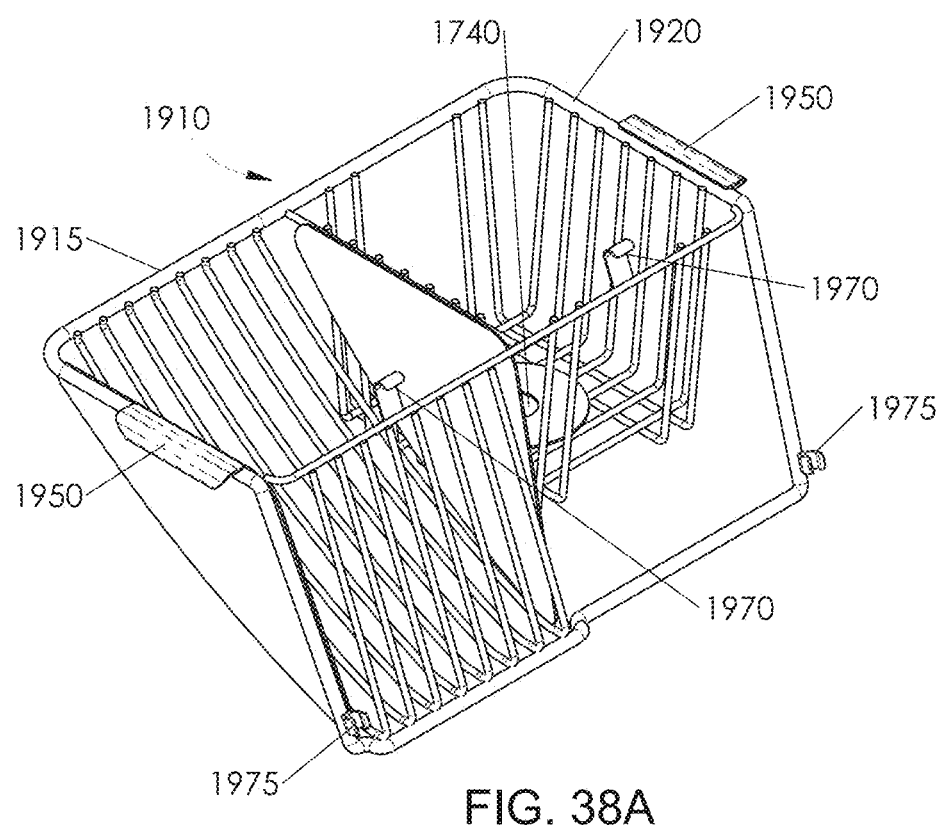
Figure 38B:
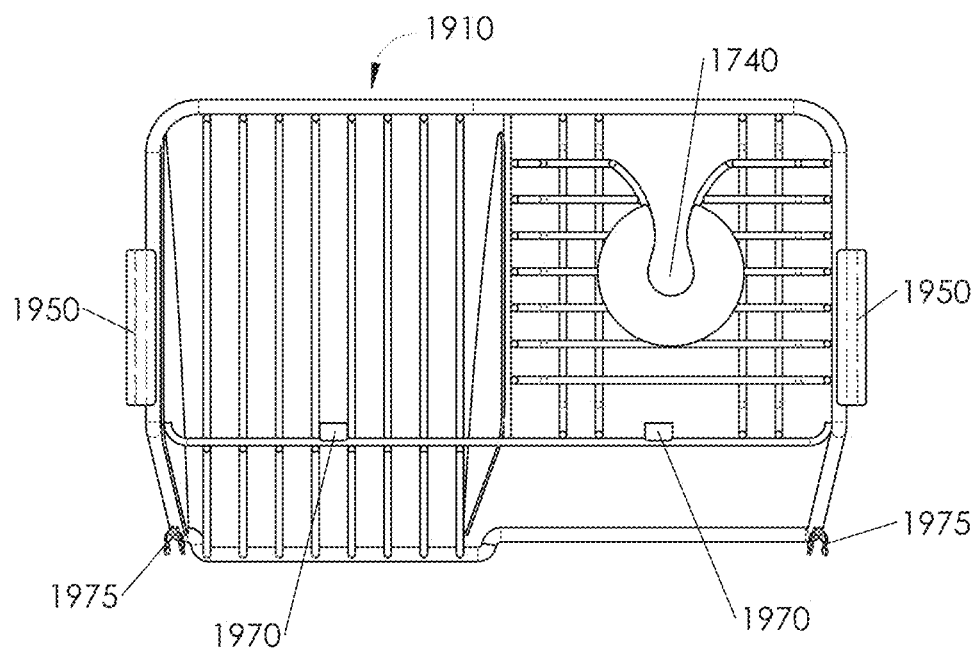

FIGS. 38A and 38B are views of a food and water holder. FIG. 38A is a top perspective view. FIG. 38B is a top view.

Figure 39A:
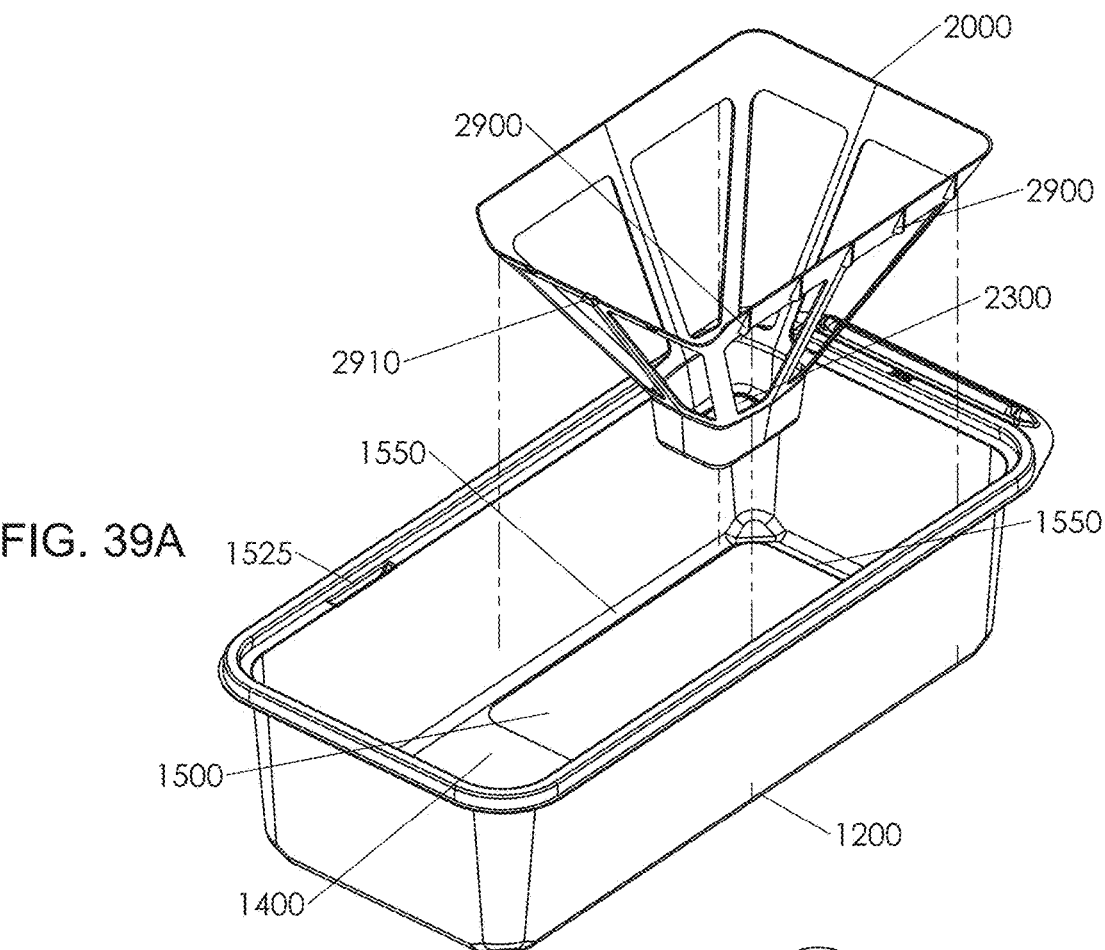
Figure 39B:
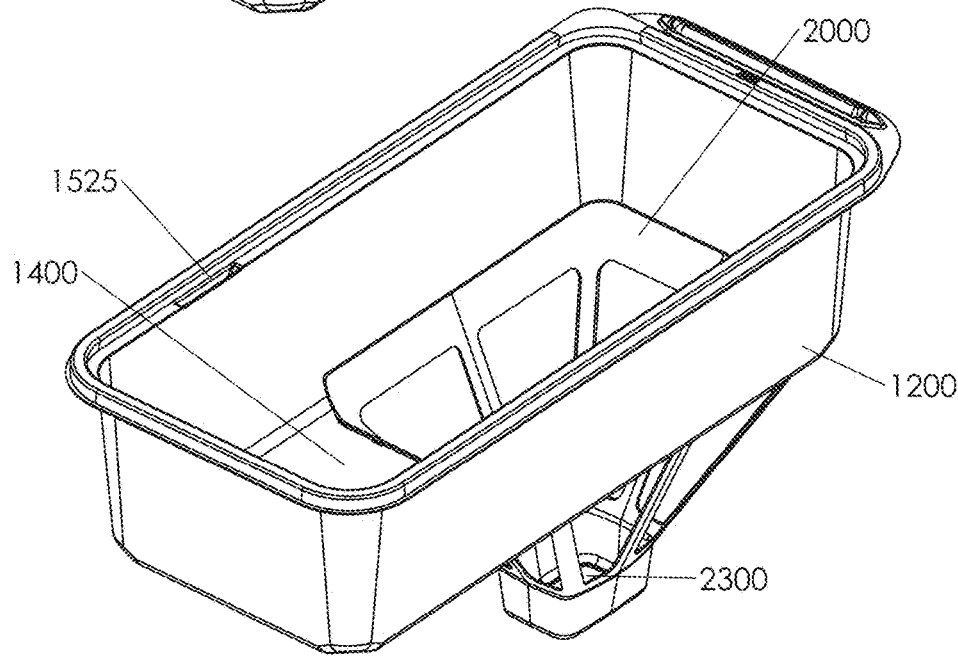

FIGS. 39A and 39B are views of a collector member and cage base. FIG. 39A is an exploded top/side oriented perspective view showing a collector member and cage base. FIG. 39B is a top/side perspective view showing a collector member and cage base together.

Figure 40:
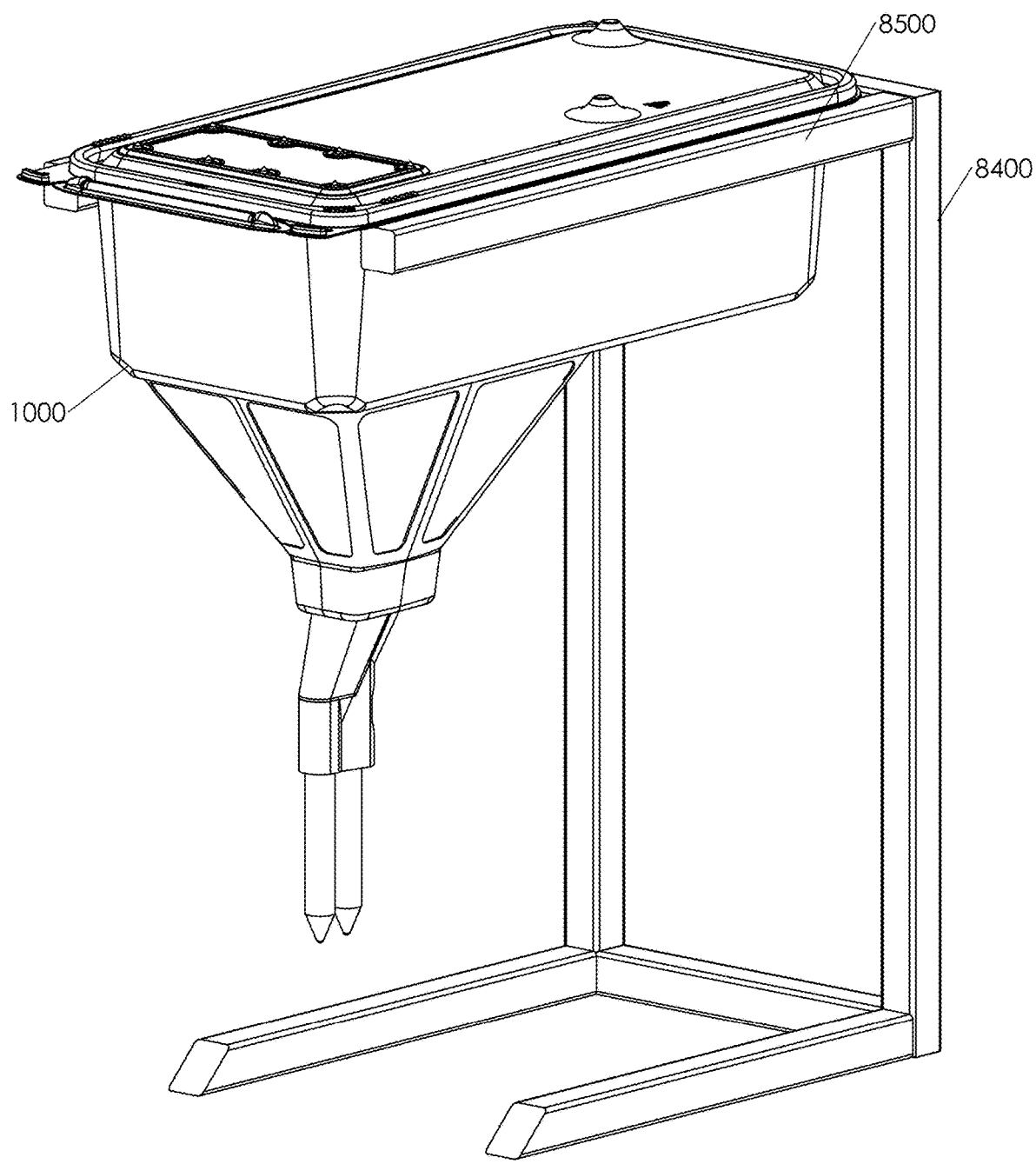

FIG. 40 is a perspective view of an animal waste collecting animal containment cage stand and cage.

A listing of certain elements called out in the drawings is provided for reference in the following table.

| Callout | Feature |
| --- | --- |
| 100 | animal waste collecting animal containment cage (metabolic cage) |
| 110 | cage lid |
| 120 | cage base |
| 130 | sides |
| 140 | cage base bottom |
| 150 | bottom opening |
| 160 | grating member |
| 170 | grating side member |
| 180 | animal confinement member |
| 190 | additional wire bar members |
| 200 | animal waste collector member |
| 210 | proximal end |

-continued

| Callout | Feature |
|---|---|
| 215 | distal end |
| 220 | proximal opening |
| 230 | distal opening |
| 240 | sidewalls |
| 250 | interior surface |
| 260 | exterior surface |
| 270 | collector extension member |
| 280 | extension transition |
| 290 | side flanges |
| 295 | conical collector member |
| 297 | conical collector member distal end |
| 298 | collector member with insert member |
| 299 | conical collector distal opening |
| 300 | animal waste separator member |
| 310 | proximal opening |
| 320 | distal opening |
| 330 | front |
| 340 | sides |
| 350 | back |
| 355 | interior back wall surface |
| 360 | bottom |
| 365 | interior sidewalls |
| 370 | proximal chute member |
| 371 | proximal terminus |
| 372 | distal terminus |
| 373 | anterior surface proximal chute |
| 374 | landing zone |
| 375 | proximal chute first sloped surface |
| 376 | proximal chute first sloped surface angle C |
| 377 | proximal chute second sloped surface |
| 378 | proximal chute second sloped surface angle B |
| 380 | distal chute member |
| 381 | proximal terminus |
| 382 | distal terminus |
| 383 | anterior surface distal chute |
| 384 | posterior surface distal chute |
| 385 | distal chute transition walls |
| 386 | distal chute member third sloped surface |
| 387 | distal chute member third sloped surface angle A |
| 390 | horizontal offset (gap) E |
| 391 | vertical offset D |
| 395 | proximal chute anterior surface distance F |
| 400 | first separator connector |
| 410 | additional wall member for separator |
| 420 | separator back wall between chutes |
| 430 | second separator connector |
| 500 | first container connector |
| 505 | first bore |
| 510 | first bore surface |
| 520 | first connection member |
| 530 | under hang |
| 540 | second container connector |
| 545 | second bore |
| 550 | second bore surface |
| 560 | second connection member |
| 570 | funnel flange |
| 580 | funnel aperture |
| 590 | chamber |
| 592 | anterior wall |
| 593 | posterior wall |
| 600 | insert member |
| 610 | proximal opening |
| 620 | distal opening |
| 630 | sidewalls |
| 640 | interior surface |
| 650 | exterior surface |
| 700 | first container |
| 750 | second container |
| 800 | rack |
| 810 | blowers |
| 815 | cage support |
| 820 | cage mount assembly |
| 825 | rail guide |
| 830 | cage connection assembly |
| 835 | cage protrusion connector component |
| 840 | standard cage |
| 910 | cage protrusion air intake |

-continued

| Callout | Feature |
|---|---|
| 920 | cage protrusion air exhaust |
| 930 | filter member |
| 1000 | animal waste collecting animal containment cage (metabolic cage) |
| 1100 | cage lid |
| 1200 | cage base |
| 1300 | side |
| 1400 | cage base bottom |
| 1500 | bottom opening |
| 1525 | recess for wire bar hook |
| 1550 | floor ledge or shelf |
| 1600 | floor grating member |
| 1650 | back grating member |
| 1700 | side grating member |
| 1710 | water bottle |
| 1720 | sipper tube |
| 1730 | sipper tube aperture |
| 1740 | water bottle aperture |
| 1800 | animal confinement member |
| 1910 | combined food and water holder |
| 1915 | food section |
| 1920 | water section |
| 1930 | food and water overflow receptacle |
| 1931 | grip |
| 1932 | overflow receptacle bottom surface |
| 1933 | overflow receptacle lip |
| 1934 | overflow receptacle side |
| 1950 | wire bar hook for base |
| 1970 | wire bar hook for animal containment member |
| 1975 | wire bar snap for animal containment member |
| 2000 | animal waste collector member |
| 2100 | proximal end |
| 2150 | distal end |
| 2200 | proximal opening |
| 2300 | distal opening |
| 2400 | side support |
| 2450 | side open panel |
| 2500 | interior surface |
| 2600 | exterior surface |
| 2700 | collector extension member |
| 2710 | support flange for separator |
| 2900 | rib |
| 2910 | support tab |
| 2920 | rim of collector member |
| 2950 | conical collector member |
| 2970 | conical collector member distal end |
| 2980 | collector member with insert member |
| 2990 | conical collector member distal opening |
| 3000 | animal waste separator member |
| 3100 | proximal opening |
| 3200 | distal opening |
| 3300 | front |
| 3400 | side |
| 3500 | back |
| 3520 | separator cap |
| 3550 | interior backwall surface between chutes |
| 3600 | bottom |
| 3610 | attachment flange |
| 3620 | attachment flange bottom contact surface |
| 3650 | interior sidewall |
| 3700 | proximal chute member |
| 3710 | proximal terminus proximal chute |
| 3720 | distal terminus proximal chute |
| 3730 | anterior surface proximal chute |
| 3740 | landing zone |
| 3750 | proximal chute sloped surface |
| 3780 | proximal chute sloped surface angle B |
| 3800 | distal chute member |
| 3810 | proximal terminus distal chute |
| 3820 | distal terminus distal chute |
| 3830 | anterior surface distal chute |
| 3840 | posterior surface distal chute |
| 3850 | distal chute transition wall |
| 3860 | distal chute member sloped surface |
| 3870 | distal chute member sloped surface angle A |
| 3900 | horizontal offset (gap) E |
| 3910 | vertical offset D |

-continued

| Callout | Feature |
|---|---|
| 3950 | proximal chute anterior surface distance F |
| 4000 | separator extension member |
| 4200 | separator back wall between chutes |
| 5000 | first container connector |
| 5050 | first bore |
| 5100 | first bore surface |
| 5200 | threaded first bore surface |
| 5400 | second container connector |
| 5450 | second bore |
| 5500 | second bore surface |
| 5600 | threaded second bore surface |
| 5700 | funnel flange |
| 5800 | funnel aperture |
| 5900 | chamber |
| 5920 | anterior wall |
| 5930 | posterior wall |
| 6000 | insert member |
| 6100 | proximal opening |
| 6200 | distal opening |
| 6300 | sidewall |
| 6400 | interior surface |
| 6500 | exterior surface |
| 7000 | first container |
| 7500 | second container |
| 8150 | cage support |
| 8350 | cage protrusion connector component |
| 8400 | animal waste collecting animal containment cage stand |
| 8500 | cage support member |
| 9100 | cage protrusion air intake |
| 9200 | cage protrusion air exhaust |
| 9250 | location of orifice |
| 9300 | filter member |

DETAILED DESCRIPTION

Figure 1:
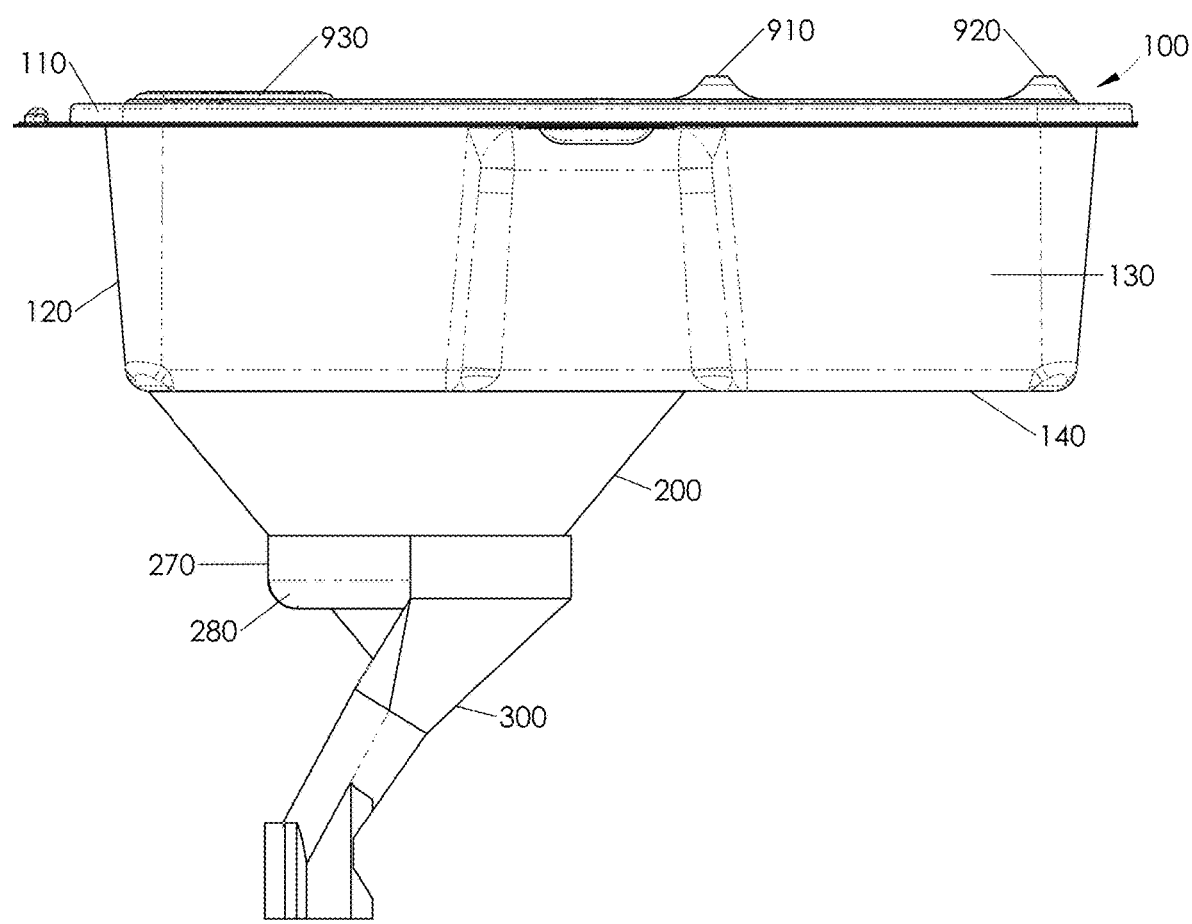
FIG. 1 is a side view of an animal waste collecting animal containment cage.
Figure 2:
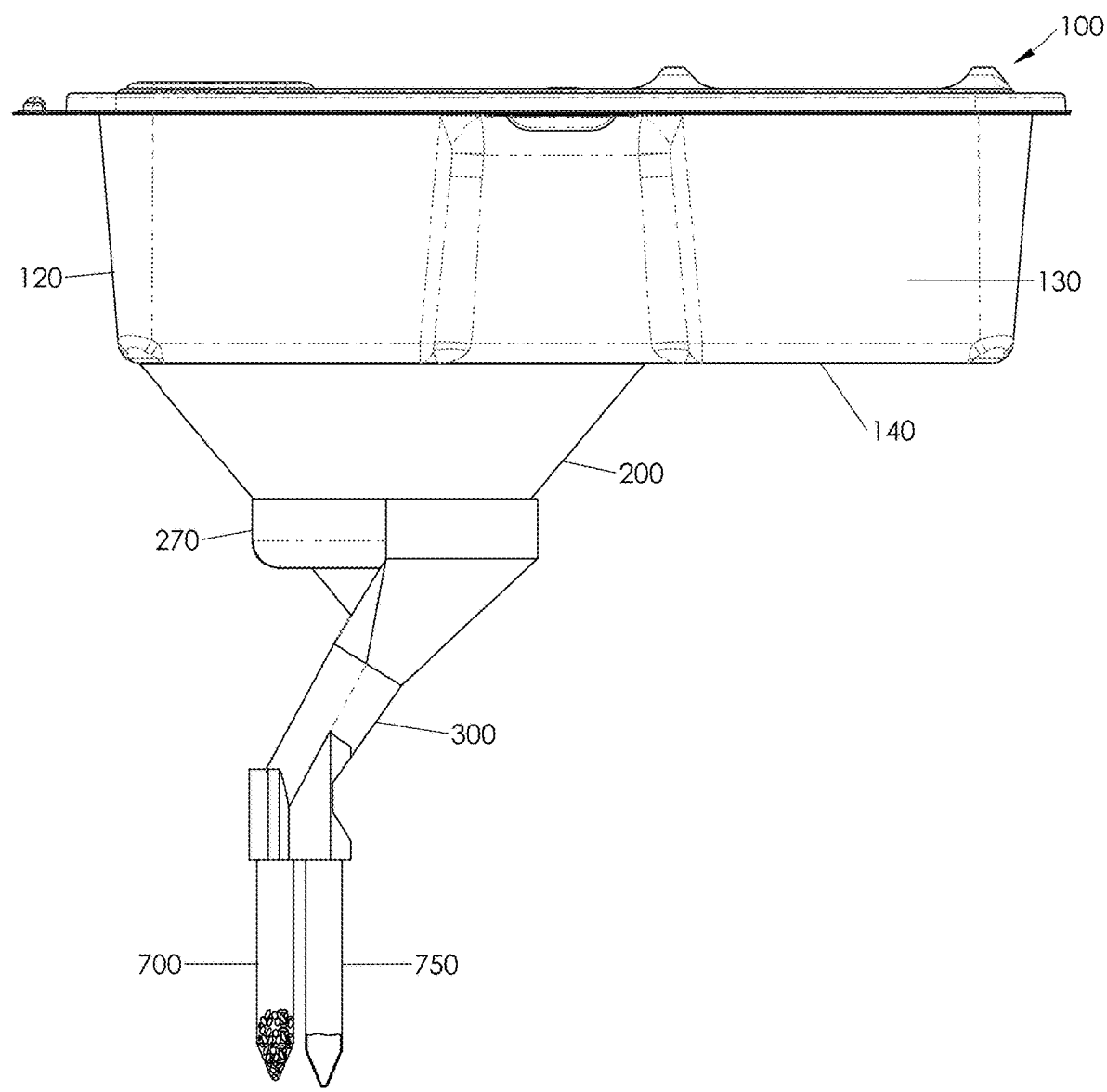
FIG. 2 is a side view of animal waste collecting animal containment cage with collection tubes attached.

Provided are animal waste collecting animal containment cages (e.g., 100 in FIG. 1). In certain embodiments the cages comprise a cage lid (e.g., 110), a cage base (e.g., 120), an animal waste collector member (e.g., 200) and an animal waste separator member (e.g., 300). FIG. 1 to FIG. 18 illustrate embodiment 100 of an animal waste collecting animal containment cage.

Also provided are animal waste collecting animal containment cages (e.g., 1000 in FIG. 19). In certain embodiments the cages comprise a cage lid (e.g., 1100), a cage base (e.g., 1200), an animal waste collector member (e.g., 2000) and an animal waste separator member (e.g., 3000). FIG. 19 to FIG. 39B illustrate a non-limiting example of an alternative embodiment 1000 of an animal waste collecting animal containment cage.

Features that are the same in embodiments 100 and 1000 are discussed in regard to embodiment 100, but apply as well to embodiment 1000, for example cage lid (e.g., 110, 1100), and cage base (e.g., 120, 1200).

In certain aspects, an animal waste collecting animal containment cage can contain a single animal. In certain aspects, an animal waste collecting animal containment cage can contain more than one animal.

Cage Base and Lid

In certain embodiments, a cage base (e.g., 120 in FIG. 1; 1200 in FIG. 19) comprises one or more sides (e.g., 130 in FIG. 1; 1300 in FIG. 24A) and a cage base bottom (e.g., 140 in FIG. 1; 1400 in FIG. 19) connected to one or more sides. A cage base often includes four walls (sides) and a bottom (e.g., substantially rectangular, substantially square, substantially pie-shaped). In certain embodiments, the walls and/or the bottom independently have a maximum thickness of about 0.01 inches to about 0.09 inches (e.g., a maximum thickness of about 0.01 inches to about 0.03 inches; a maximum thickness of about 0.01 inches to about 0.04 inches; a maximum thickness of about 0.01 inches to about 0.05 inches; a maximum thickness of about 0.01, 0.02, 0.03, 0.04, 0.05, 0.06, 0.07, 0.08, 0.09 inches).

A cage base sometimes is in combination with a cage lid (e.g., 110 FIG. 1; 1100 in FIG. 19). The lid often may be attached to the cage base and the lid may be readily detachable from the base. In some embodiments, components of a cage lid have a maximum thickness of about 0.01 inches to about 0.09 inches (e.g., a maximum thickness of about 0.01 inches to about 0.03 inches; a maximum thickness of about 0.01 inches to about 0.04 inches; a maximum thickness of about 0.01 inches to about 0.05 inches; a maximum thickness of about 0.01, 0.02, 0.03, 0.04, 0.05, 0.06, 0.07, 0.08, 0.09 inches). In some embodiments a cage lid comprises a cage protrusion for air intake (e.g., 910 in FIG. 1; 9100 in FIG. 19) and a cage protrusion for air exhaust (e.g., 920 in FIG. 1; 9200 in FIG. 19). In some embodiments, a cage lid comprises a filter member (e.g., 930 in FIGS. 1 and 4; 9300 in FIGS. 19 and 22).

In certain embodiments, the cage protrusions do not have orifices for air intake and/or air exhaust and the cage protrusions are utilized only for attachment of an animal waste collecting animal containment cage to a rack. In certain embodiments, the cage protrusions have orifices for air intake and/or air exhaust (e.g., 9250 in FIG. 22) and the cage protrusions are utilized for both integration of an animal waste collecting animal containment cage with a rack ventilation system and for attachment of an animal waste collecting animal containment cage to a rack.

In certain embodiments, an animal waste collecting animal containment cage can have a longer length than a standard size cage that can be engaged with a cage rack but which is not designed for the collection and separation of feces and urine.

In certain embodiments, two parallel sides of a base of an animal waste collecting animal containment cage have a greater length than two comparable parallel sides of a base of a standard cage. In certain embodiments, two parallel sides of a lid of an animal waste collecting animal containment cage have a greater length than two comparable parallel sides of a lid of a standard cage.

In certain embodiments, a cage includes an animal whose feces and urine is to be collected and separated for subsequent study. A cage can include any animal that can be contained in a cage, and an animal sometimes is a laboratory animal or animal contained in a vivarium. An animal contained sometimes is transgenic, immunodeficient, inbred, contains one or more xenografts and/or lacks one or more functional genes (knock-out animal). An animal sometimes is chosen from a rodent, mouse (e.g., nude mouse or a severe combined immune deficiency (SCID) mouse), rat, hamster, gerbil, guinea pig, chinchilla or rabbit, for example. In some embodiments an animal is substantially healthy. In some embodiments an animal is diseased or infected (e.g., infected with a pathogen, e.g., a virus, parasite, fungus, bacteria) and in some embodiments an animal may be contagious (e.g., capable of infecting other animals in a containment cage rack or cage system). An animal may contain one or more experimental substances (e.g., a drug, a cell, bacteria, a virus, a chemicals, or a compound). An animal contained in a cage may be utilized in a variety of manners, including but not limited to breeding, production (e.g., antibody, hybridoma, tissue or cell production), and research (e.g., experimentation (e.g., cancer, disease, diabetes, toxicity and drug research).

Figure 3A:
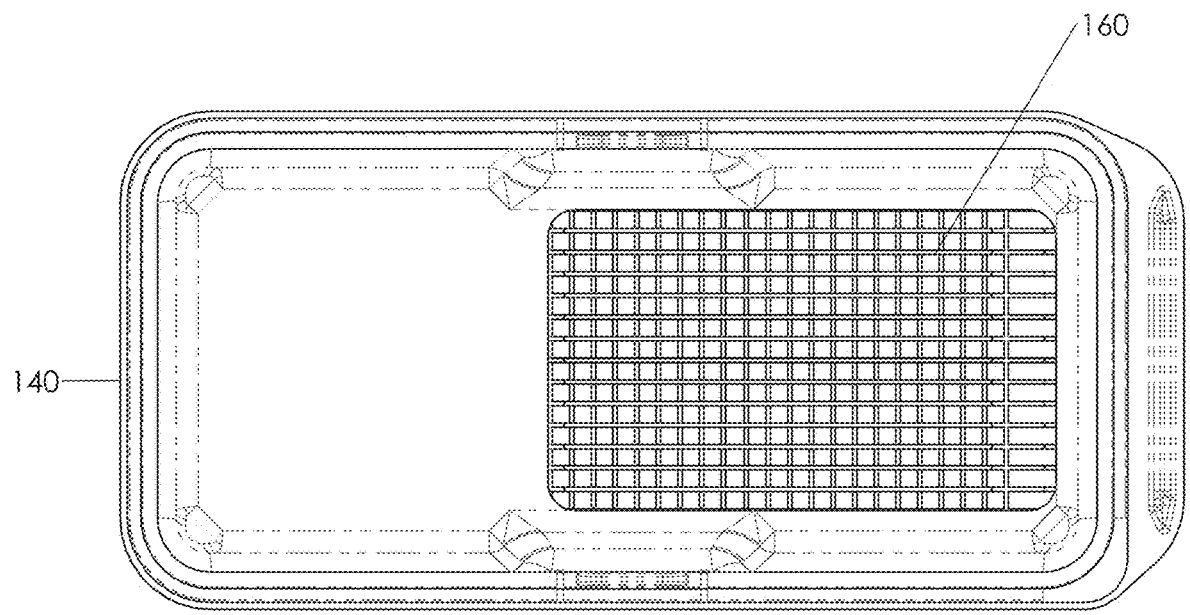
FIGS. 3A and 3B are bottom views of a cage bottom.
Figure 3B:
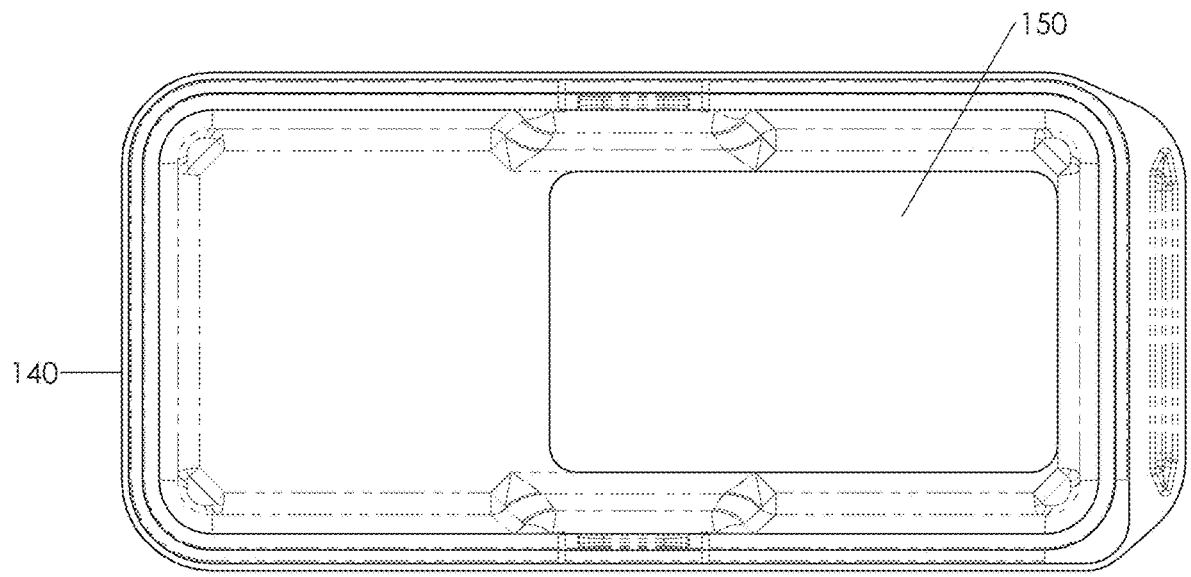
Figure 4:
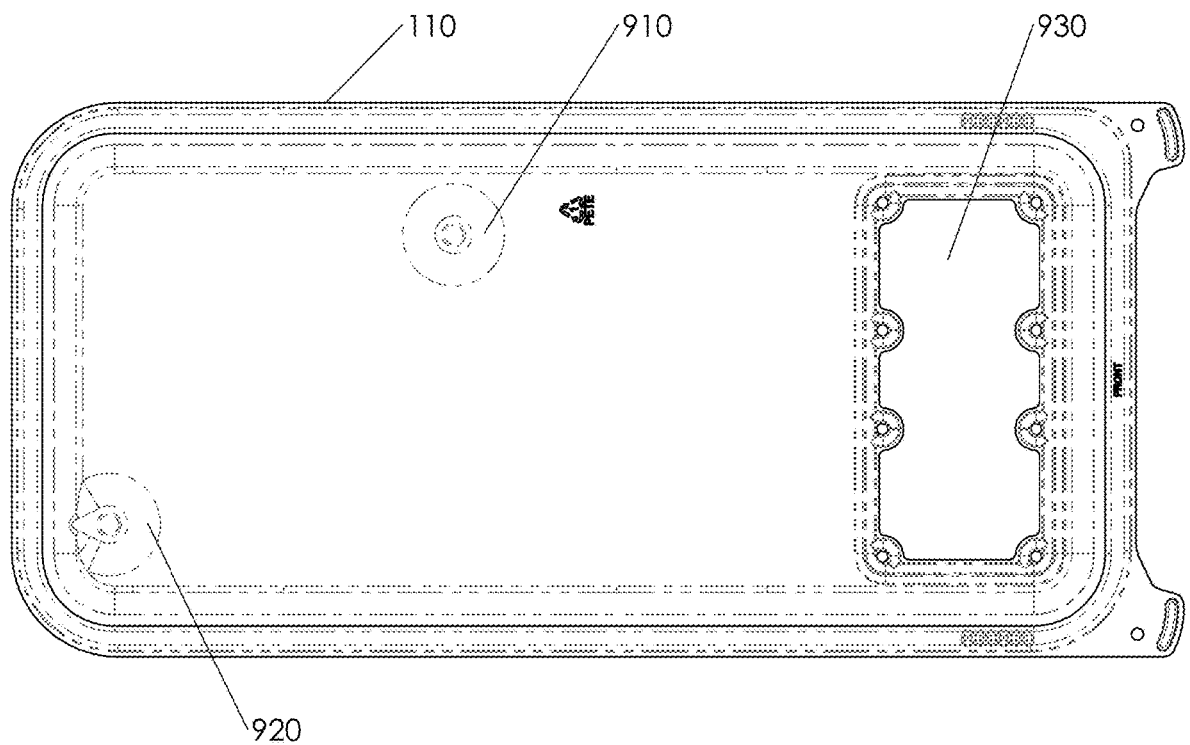
FIG. 4 is a top view of a cage lid.
Figure 5:
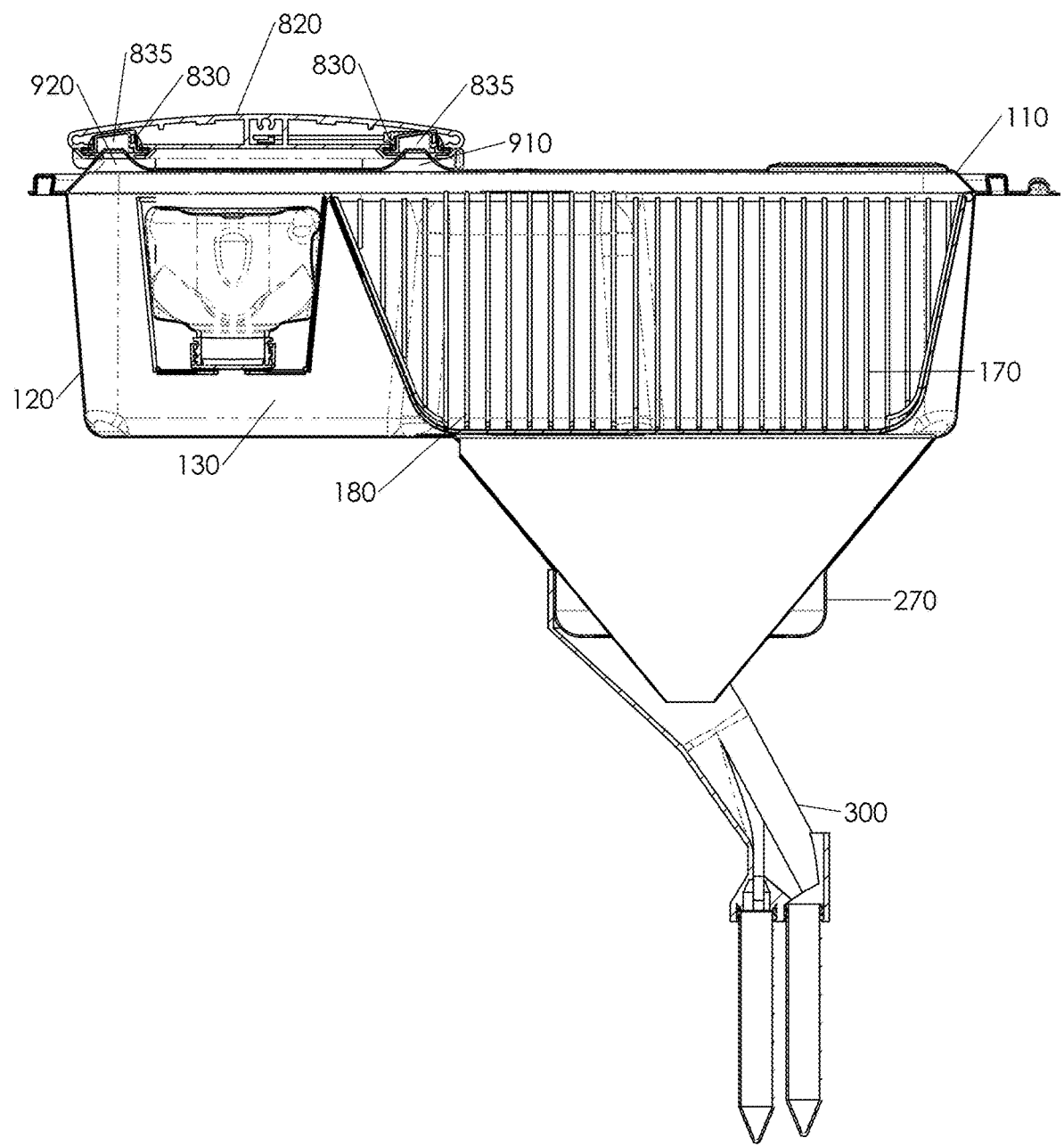
FIG. 5 is a sectional view with an axial orientation through the center of the separator showing an animal waste collecting animal containment cage engaged with a rack.
Figure 6A:
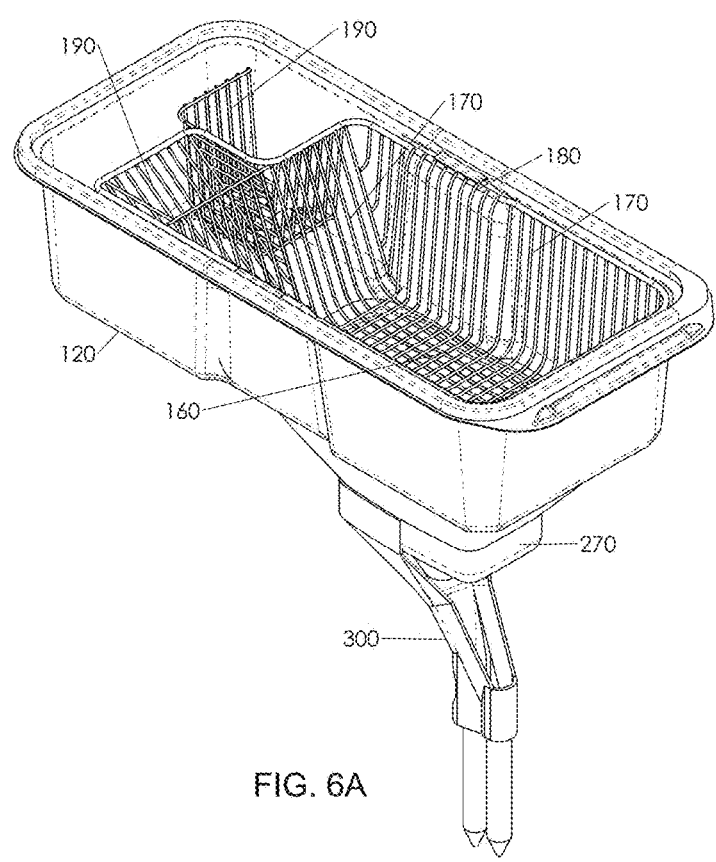
FIGS. 6A and 6B are views of an animal waste collecting animal containment cage without a lid.
Figure 6B:
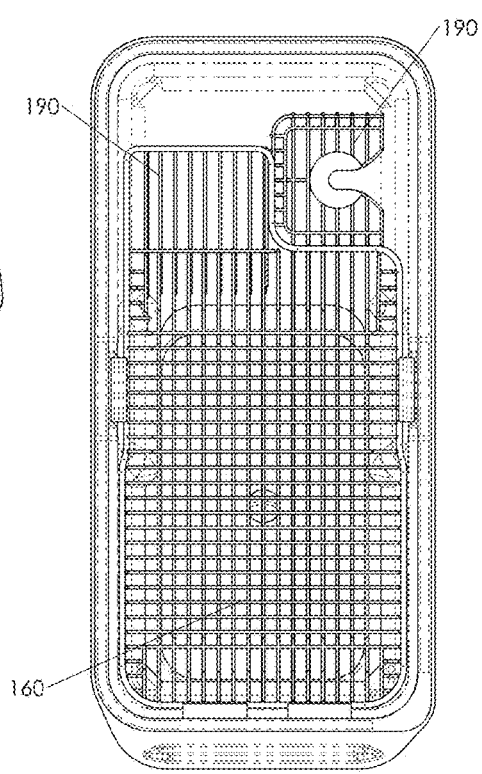

In certain embodiments, the cage bottom has an opening (e.g., 150 in FIG. 3; 1500 in FIGS. 21B and 39A). The opening can be located in any section of a cage bottom, as long as the other components for collection and separation of urine and feces that are attached to a cage (i.e., animal waste collector member, animal waste separator member and containers) can be accommodated when a cage is engaged with a rack. In some embodiments, the cage base bottom opening is located in a section of the cage that does not engage with a rack. The opening can be of any size. In certain embodiments the opening occupies one-quarter, one-half or three-quarters of the surface area of a cage base bottom. In some embodiments, the opening occupies at least one half of the surface area of a cage base bottom. In some embodiments the opening does not extend to the edges of a cage bottom where the cage bottom transitions into a cage wall resulting in a floor ledge or shelf (e.g., 1550 in FIG. 39A).

In some aspects a grating member is disposed over the bottom opening (e.g., 160 in FIG. 3; 1600 in FIGS. 21A, 24A, 24B and 37A). The gaps or sections of a grating can be any size that are sufficient to retain and support a particular size animal in a cage and also allow the passage of substantially all of the solid and liquid animal waste through the grating for subsequent collection and separation. A grating may be constructed from any suitable material. Non-limiting examples of materials used to construct a grating include metals and plastics. In certain embodiments, the grating is made of wire mesh or wire bars. In certain embodiments, the grating is treated with a material to prevent the grating from retaining urine and feces.

In certain embodiments, the interior of a cage include one or more grating side members that extend vertically from the grating (e.g., 170 in FIGS. 5 and 6) to confine an animal in a cage to the area overlying the cage base bottom opening. In some embodiments, a grating side member extends from a cage base bottom up to approximately the height of the side of a cage (cage wall). A grating side member can be made of any suitable material that can function to contain an animal and is often made of the same material as the grating, for example wire bar. In certain embodiments, grating side member or members are contiguous with the grating. In some embodiments, the grating side members span from the cage base bottom to approximately the height of four sides of the cage base and together with the grating form an animal confinement member that restricts the movement of an animal contained within the cage to a section of the cage comprising the cage base bottom opening. In some embodiments, access by an animal to other cage components, e.g. a feeding tray and a water bottle, is made possible, but is restricted by additional wire bar members (e.g., 190 in FIG. 6) or other components.

In certain embodiments, a grating side member extends less than the full height of the side of a cage, e.g., half the height of a side, a quarter of the height of a side or less.

In some embodiments, a floor grating member (e.g., 1600 in FIGS. 21A, 24A, 24B, 36A, 36B, 37A and 37B) disposed over the bottom opening of a cage base. In certain embodiments, a floor grating member rests on the rim of a collector member (e.g., 2920 in FIGS. 25A and 25B) that is positioned in the interior of a cage base and contacts an insert member that is inserted in the collector member. In some embodiments, a floor grating member comprises side grating members spanning from edges of the floor grating member to a portion of the height of a cage base side on three sides of a cage base (e.g., 1700 in FIGS. 24A, 36A and 37A) and a back grating member (e.g., 1650 in FIGS. 24A, 36A and 37A) that spans from an edge of the floor grating member that does contact a cage base side to approximately the height of the sides of the cage base. A floor grating member, side grating members and a back grating member together form an animal confinement member (e.g., 1800 in FIGS. 24A, 37A and 37B). In some embodiments, an animal confinement member in the interior of a cage base rests on the rim of a collector member (e.g., 2920 in FIGS. 25A and 25B) that is positioned in the interior of a cage base and contacts an insert member that is inserted in the collector member. In some embodiments, an animal contained within a cage is confined by the animal confinement member to a section of the cage comprising the cage base bottom opening. In some embodiments, a back grating member can have a sipper tube aperture (e.g., 1730 in FIGS. 24A, 36A and 37A). In certain embodiments, the grating is made of wire mesh or wire bars (floor wire bar member, side wire bar members, and back wire bar member).

In certain, embodiments, there can be an additional grating or wire bar member that is a separate structure from but contacts the animal confinement member. In some embodiments, the additional wire bar member is a combined food and water holder (e.g., 1910 in FIGS. 24A, 36A, 38A and 38B) that restricts access by an animal to food and water to a limited area of the section of a cage where an animal is confined (section of a cage comprising the cage base bottom opening). A combined food and water holder (1910) can have a food section (e.g. 1915 in FIGS. 24B, 36A) and a water section (e.g. 1920 in FIGS. 24B, 36A and 38A) that can hold a water bottle (1710). In some embodiments, a water section has a water bottle aperture (e.g., 1740 in FIGS. 24A, 36B, 38A and 38B) that can connect to a sipper tube (e.g., 1720 in FIG. 23) which can be positioned within a sipper tube aperture (1730) to enable an animal in the animal confinement section of a cage to access water. In some embodiments, a combined food and water holder (1910) can have wire bar hooks (e.g., 1950 in FIGS. 24A, 24B, 36A, 36B, 38A and 38B), that can be inserted into recesses in the rim of a cage base (e.g., 1525 in FIGS. 21A, 21B, 39A and 39B) so that a combined food and water holder (1910) is attached to a cage base. In certain embodiments, a combined food and water holder (1910) can have wire bar hooks for an animal confinement member (e.g., 1970 in FIGS. 24A, 24B, 36A, 36B, 38A and 38B) and wire bar snaps for an animal confinement member (e.g., 1975 in FIGS. 24A, 36A, 36B, 38A and 38B) so that an animal confinement member is attached to a combined food and water holder by a top surface and sides of a back grating member of a confinement member. In some embodiments, the wire bar hooks 1950 of the combined food and water holder inserted into recesses in the rim of a cage base 1525 can serve to attach and support an animal confinement member attached to a combined food and water holder (e.g. all wire bar features), which can hang down from the rim of a cage base into a cage base interior.

In some embodiments, a food and water overflow receptacle is positioned under a food section and under a water section (e.g., 1930 in FIGS. 24B, 35A and 35B). A food and water overflow receptacle can collect food dislodged by an animal and can collect water dislodged by an animal so that they are not included in the collection of urine and feces. In some embodiments, an overflow receptacle comprises an overflow receptacle bottom surface (e.g., 1932 in FIG. 35A), overflow receptacle sides (e.g., 1934 in FIG. 35A), an overflow receptacle lip (e.g., 1933 in FIG. 35A), and one or more grips (e.g., 1931 in FIG. 35A).

Animal Waste Collector Member

In some embodiments, an animal waste collector member (e.g., 200 in FIGS. 1 and 7) is disposed beneath a cage bottom opening. Urine and feces pass through the grating member in the cage bottom into the internal region of the collection member. In certain embodiments, the collector member comprises a proximal end (e.g., 210 in FIG. 7), a distal end (e.g., 215 in FIG. 7), a proximal opening (e.g., 220 in FIG. 7), a distal opening (e.g., 230 in FIG. 7), and one or more sidewalls (e.g., 240) comprising an interior surface (e.g., 250) and an exterior surface (e.g., 260), at least a portion of, and at least one of, the one or more sidewalls tapers from the proximal opening to the distal opening of the collector member. In some embodiments, the sidewall or sidewalls taper at angle between 40 degrees to 90 degrees relative to a horizontal plane. In certain embodiments the angle can be 40, 45, 50, 55, 60, 65, 70, 75, 80, 85 or 90 degrees. In some embodiments, the angle is approximately 55 degrees.

In some embodiments, an animal waste collector member (e.g., 2000 in FIGS. 19, 20, 24A, 25A-C and 39A) or a conical collector member (e.g., 2950 in FIG. 26) is disposed beneath a cage bottom opening. Urine and feces pass through the floor grating member in the cage bottom into the internal region of the collection member.

In some embodiments, sidewalls of a collector member are open panels (e.g., 2450 in FIG. 25C). In some embodiments, a collector member has a rim at the proximal terminus (e.g., 2920 in FIGS. 25A and 25B).

In certain embodiments, the proximal opening, the distal opening and one or more of the sidewalls of the animal waste collector member are disposed as a frustum. The collector member can be any suitable shape that at least in part, slopes downward vertically beneath the bottom opening to collect urine and feces from a cage and to allow or facilitate its movement to a separator member. In certain embodiments, the proximal opening of the collector member can be aligned with the cage base bottom opening to collect the urine and feces that pass through the grate and that exits the cage. The proximal opening of the collector member is dimensioned to be equal to or slightly greater than the dimensions of the opening in the cage bottom such that all or most of animal waste material that passes through the grating falls into or on the collector member. In some embodiments, the inner surface of the collector member is imperforate and may be treated to minimize the retention of urine and/or feces. In some embodiment, treatment can be with a hydrophobic material, for example: Teflon, wax, silicone or any superhydrophobic coating.

In certain embodiments, the proximal opening of the collector member is positioned within the interior of the cage base. In certain embodiments, the collector member is connected to a cage base as it is inserted through the interior of the cage base and into the cage base bottom opening (see FIG.39A).

In some embodiments, the waste collector member is integrally connected to the cage at the cage bottom (e.g., molded into the bottom of the cage so that the cage and collector are one piece).

Nested Cage Components

A cage component can be inserted into another like cage component and several components can be stacked, which is referred to herein as "nesting." Nesting cage components significantly reduces the volume of multiple cage components as compared to the same number of un-nested members, which is advantageous for shipping, storage before housing an animal, and storage after housing an animal, for example. Any convenient number of like components can be nested, including, but not limited to, 10 or more, 20 or more, 30 or more, 40 or more, 50 or more, 60 or more, 70 or more, 80 or more, 90 or more or 100 or more like components. The degree or efficiency of nesting sometimes can be expressed in terms of a percentage, which is the height or volume of the nested component within another like component containing it, relative to the overall height or volume of the nested component. Thus, the term "80% nested" indicates 80% of the volume or height of a nested cage member, for example, is contained within the member in which it is inserted. When stacked, cage bases provided herein often are 75% or more nested, sometimes 80% or more or 85% or more nested, and sometimes about 90% to about 95% nested.

A cage component sometimes comprises a nesting separation member that facilitates separation of nested cage components or substantially reduces or prevents compression of nested cage components. Compression or overnesting of components can lead to nested components adhering to one another and interfere with freely separating nested units from one another. In certain embodiments, the nesting separation member is a curved member or indent member located at or near a flange member. In some embodiments, a cage component sometimes comprises an indent or boss that butts (e.g., interferes with) a corresponding indent or boss of an adjacent nested cage base. Edges and/or corners of such bosses or indents sometimes are defined by a radius of 0.03 inches or less. Such an indent or boss can facilitate separation of the nested cage components from one another, and can prevent or substantially reduce compression and sticking of the nested units to one another.

Thus, in certain embodiments provided are nested sets of cage bases comprising cage bases having a bottom and a wall or walls, where the cage bases are about 75% nested or more. The wall, a subset of the walls or all walls often taper inwards towards the bottom. Two or more or all walls of cage bases in the nested set of cage bases often are at a non-perpendicular angle with respect to the cage base bottom to promote nesting efficiency (e.g., an angle of greater than 90 degrees with respect to the cage base bottom). The cage bases sometimes are about 80% nested or more and can be 85% nested or more or about 90% to about 95% nested. In certain embodiments, cage bases with an attached collector member or attached conical collection member are provided as a nested set. The cage bases with an attached collector member or attached conical collection member are about 75% nested or more. The cage bases with attached collector member or attached conical collection member sometimes are about 80% nested or more and can be 85% nested or more or about 90% to about 95% nested. Also provided are nested sets of cage covers comprising covers that are about 70% nested or more. The cage covers sometimes are about 80% nested or more, and can be 85% nested or more or about 90% to about 95% nested.

In certain embodiments, collector members, conical collector members, insert members, animal confinement members, food and water wire bar holders and food and water overflow receptacles can each be nested as described above.

Insert Member

In certain embodiments, the cage collector member includes an insert member (e.g., 298 in FIG. 7C; 2980 in FIG. 25C) to collect urine and feces excreted by the animal contained in the cage and to direct the urine and feces to the animal waste separator member. In some embodiments, the insert member (e.g., 600 in FIGS. 7A and 7B) is in contact with the collector member (e.g., 200) and the insert member comprises a proximal opening (e.g., 610 in FIG. 7A), a distal opening (e.g., 620 in FIGS. 7A-C, FIG. 9B and FIG. 10B) and one or more sidewalls (e.g., 630 in FIG. 7A) comprising an interior surface (e.g., 640 in FIG. 7A) and an exterior surface (e.g., 650 in FIG. 7A). In some embodiments, at least a portion of, and at least one of the one or more sidewalls tapers from the proximal opening to the distal opening of the insert member. In some embodiments, at least one of the one or more sidewalls of the insert member is longer than the one or more sidewalls of the collector member, a portion of which exterior surface of the one or more sidewalls of the insert member in a proximal region of the insert member is in contact with the interior surface of the one or more sidewalls of the collector member, and a portion of the exterior surface of the one or more sidewalls of the insert member in a distal region of the insert member is not in contact with the interior surface of the one or more sidewalls of the collector member (see FIG. 7C).

In some embodiments, the insert member is paper. In some aspects, the insert member is wax paper. In some embodiments, interior surface of the insert member is chemically treated. In some embodiments, a hydrophobic material is applied to the interior surface of the insert member. In some embodiment, treatment can be with plastic/coated plastic, Teflon, wax, silicone or any superhydrophobic coating.

In some embodiments, an insert member is a suitable plastic or polymer (e.g., polypropylene (PP), high-density polyethylene (HDPE), low-density polyethylene (LDPE), polyethylene teraphthalate (PET), polyvinyl chloride (PVC), polyethylenefluoroethylene (PEFE), polystyrene (PS), polycarbonate (PC), polystyrene (e.g., high-density polystyrene), acrylnitrile butadiene styrene copolymers, plyethylene furanoate (PEF), the like or combinations thereof).

Figures 7A, 7B, 7C:
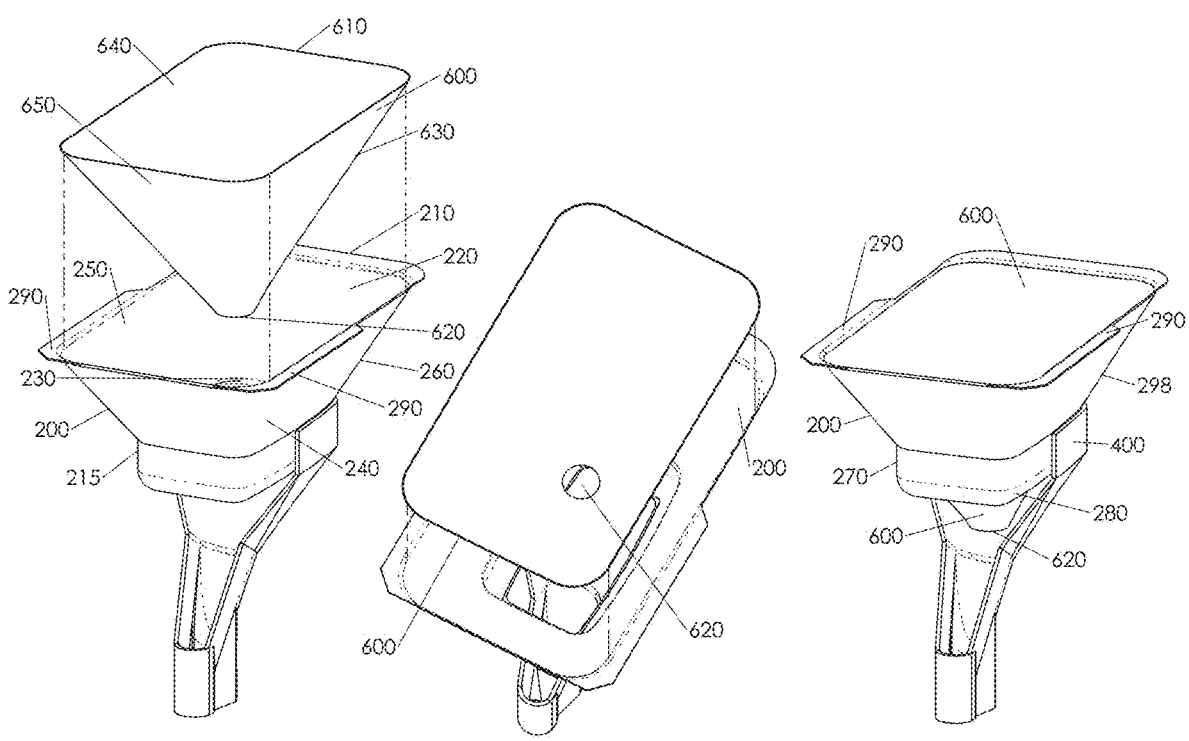
FIGS. 7A, 7B and 7C are views of a collector member, insert member and separator member.

In certain embodiments, an animal waste collector member when used with an insert member can be a separate structure from the cage and is attached to the bottom portion of the interior of a cage by connectors such as side flanges of the collector member which overhang in the interior of a cage (e.g., 290 in FIGS. 7A and 7C). In some embodiments, the waste collector member when used with an insert member is integrally connected to the cage at the cage bottom (e.g., molded into the bottom of the cage so that the cage and collector are one piece).

In certain embodiments, an animal waste collector member used with an insert member can be a separate structure from a cage base (see FIG. 39A). In some embodiments, a collector member can be connected or attached to the bottom portion of the interior of a cage base (see FIG. 39B) by ribs (e.g., 2900 in FIGS. 25A and 34) and support tabs (e.g., 2910 in FIGS. 25A, 34 and 39A) located on the exterior surface of the collector member proximal end. In some embodiments, ribs 2900 are positioned to rest on the upper surface of the cage base bottom floor ledge or shelf (e.g., 1550 in FIG. 39A) and support tabs 2910 are positioned to rest on the portion of the cage base bottom surface that is not part of the floor ledge or shelf (e.g., 1400 in FIGS. 39A and 39B). In certain embodiments, the connector member sits on a cage base bottom floor ledge 1550 and other solid surface area of the cage bottom 1400 by way of ribs and support tabs.

In some embodiments, a collector member is constructed to have a conical distal end (e.g., 297 in FIG. 8; 2970 in FIG. 33A) and is referred to as conical collector member (e.g., 295 in FIGS. 8 and 15A; 2950 in FIGS. 26 and 33A). A conical collector member does not require an insert member to collect urine and feces excreted by the animal contained in the cage and to direct the urine and feces to the animal waste separator member. In some embodiments, the conical collector member is integrally connected to the cage at the cage bottom (molded into bottom). In certain embodiments, the conical collector member can be a separate structure that can be attached or connected to a cage bottom.

In some embodiments, the inner surface of the conical collector member is imperforate and may be treated to minimize the retention of urine and/or feces. In some embodiment, treatment can be with a hydrophobic material, for example: Teflon, wax, silicone or any superhydrophobic coating.

A conical collector member may be constructed of similar material as described for a collector member.

In some embodiments, the interior surface of the collector member, the interior surface of the insert member or the interior surface of the conical collector member can be coated with a binding agent for an analyte of interest (antigen, antibody, drug, metabolite, organism or portion thereof etc.). Examples of binding agents, include, without limitation, antibodies, antigens, receptors, proteins, nucleic acids, carbohydrates, lipids, magnetic beads. Detection of an analyte of interest may be by the use of a label, including, without limitation, a fluorophore, radioisotope, colorimetric agent, light emitting agent, chemiluminescent agent, light scattering agent, florescent shift (FRET), Elisa assay and the like, may be used as a label. In some embodiments, the interior surface of the collector member, the interior surface of the insert member or the interior surface of the conical collector member can be coated with a chemical indicator, for example an indicator to detect pH levels, glucose level, protein, amino acids, DNA, etc.

In some embodiments, a collector member comprises a collector extension member (e.g., 270 in FIGS. 1, 2 and 5) integrated with the distal portion of the collector member comprising one or more connector walls that in some embodiments can be rectangular in shape. The collector member can have an open bottom or a bottom with an opening. In some embodiments the collector extension member comprises an extension transition at its distal end (e.g., 280 in FIGS. 1, 7C and 10).

In some embodiments, a collector member (2000) comprises a collector extension member (e.g., 2700 in FIGS. 19, 20, 24A, 25A, 25C, 33B and 34) that transitions from the collector member distal opening (e.g., 2300 in FIGS. 39A and 39B). In certain embodiments, a collector extension member (2700) comprises a support flange (e.g., 2710 in FIGS. 28B, 33B and 34) for a separator member attachment flange (e.g., 3610 in FIGS. 31 and 34) to rest upon.

Sidewall taper and the surfaces of the insert member and conical collection member facilitate efficient movement of the feces and urine to the separator member, while minimizing retention.

Animal Waste Separator Member

In some embodiments, urine and feces that are collected by the collector member (with or without an insert) or the conical collector member are separated by an animal waste separator member (e.g., 300 in FIGS. 1, 2, 5, 6, 8 and 11-16). The separator member is in effective connection with the collector member or conical collector member to receive feces and urine that are to be separated and individually collected in separate containers.

In certain embodiments, the separator member comprises a proximal opening (e.g., 310 in FIGS. 12A and 14), a distal opening (e.g., 320 in FIG. 13B), a front (e.g., 330 in FIGS. 8, 110, 12A and 13A), sides (e.g., 340 in FIGS. 8 11B, 110 and 12B), a back (e.g., 350 in FIG. 11A and 14A), a bottom (e.g., 360 in FIGS. 12B and 14A), a proximal chute member connected to the sides (e.g., 370 in FIGS. 11C, 11D, 12A, 13A, 13B 14B and 16), a distal chute member connected to the sides (e.g., 380 in FIGS. 11D, 12A, 13B, 14B and 16), a first container connector connected to the bottom (e.g., 500 in FIGS. 12B, 14A, 15A and 15B), and a second container connector connected to the bottom (e.g., 540 in FIGS. 12B, 14A, 15A and 15B).

In certain embodiments, a separator member is attached to a collector member by a first separator connector (e.g., 400 in FIGS. 7C, 15B and 16). In some embodiments, a first separator connector is attached to the collector extension member of a collector member (e.g., 270 in FIGS. 1, 5, 7C, 15B and 16). Attachment can be by any means such as clamps, hooks, glue, magnets, rubber bands or any mechanical attachment. In some embodiments, the collector extension member comprises an extension transition (e.g., 280 in FIGS. 1, 7C, and 16). In some embodiments, a separator member is attached to a conical collector member by a second separator connector (e.g., 430 in FIGS. 8 and 15A).

In certain embodiments, the proximal chute member (e.g., 370 in FIGS. 11C, 11D, 12A, 13A, 13B 14B and 16), comprises a proximal terminus (e.g., 371 in FIGS. 13A and 14A), a distal terminus in association with the back of the separator member (e.g., 372 in FIG. 14B), and an anterior surface (e.g., 373 in FIGS. 13B and 16). In some embodiments, the proximal chute member comprises a proximal chute first sloped surface (e.g., 375 in FIG. 13B) and a proximal chute second sloped surface (e.g., 377 in FIG. 13B) that extend axially from the proximal terminus towards the distal terminus. In some embodiments, the proximal chute first sloped surface angle C (e.g., 376 in FIG. 13B) is about 35 degrees to about 65 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 or 65 degrees). In some embodiments, the proximal chute first sloped surface angle C (e.g., 376 in FIG. 13B) is about 35 degrees to about 75 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 degrees). In some embodiments angle C is about 12.6 degrees (42.4 degrees when measured from the same plane as angles A and B). In some embodiments, the proximal chute second sloped surface angle B (e.g., 378 in FIG. 13B) is about 35 degrees to about 65 degrees (35, 36, 37, 38, 39, 40, 41, 42, 43, 44, 45, 46, 47, 48, 49, 50, 51, 52, 53, 54, 55, 56, 57, 58, 59, 60, 61, 62, 63, 64 or 65 degrees). In some embodiments, the proximal chute second sloped surface angle B (e.g., 378 in FIG. 13B) is about 35 degrees to about 75 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 degrees). In some embodiments, angle B is about 55 degrees. In some embodiments, the anterior surface of the proximal chute member comprises a curved surface.

In certain embodiments, the distal opening of a conical collector member or the distal opening of the collector member insert is disposed in proximity to the proximal chute member anterior surface, but not in contact, the proximal chute anterior surface distance F (e.g., 395 in FIG. 16) and is aligned with the anterior surface in the region of the landing or target zone (e.g., 374 in FIGS. 13A and 13B). In certain embodiments, the proximal chute anterior surface distance F can be from about 0.2 inches to 3.0 inches (e.g. 0.2, 0.3, 0.4, 0.5, 0.6, 0.7, 0.8, 0.9, 1.0, 1.1, 1.1, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 inches). In some embodiments, the proximal chute anterior surface distance F is about 0.5 inches to 1.7 inches. The proximal chute anterior surface distance F and the landing zone region of the proximal chute are chosen so that urine and feces from the collector member contacts the anterior surface of the proximal chute member in a manner that facilitates separation.

In certain embodiments, the separator member comprises a distal chute member (e.g., 380, in FIGS. 11D, 12A, 13A, 14A and 16). In some embodiments, the distal chute member comprises a proximal terminus (e.g., 381 in FIGS. 11D and 12A), a distal terminus (e.g., 382 in FIGS.11D and 12A), an anterior surface (e.g., 383 in FIGS.11D and 12A), and a posterior surface (e.g., 384 in FIG. 13B). In some embodiments, the distal chute member is not connected to the proximal chute member and is not connected to the back of the separator member. In some embodiments, the distal chute comprises a substantially flat surface having transition walls (e.g., 385 in FIGS. 11D, 12A and 14B) between the anterior surface of the distal chute and interior side walls of the separator member (e.g., 365 in FIGS. 11D, 12A and 14B). The transition walls aid in directing feces into a container.

In some embodiments, the distal chute member comprises a third sloped surface extending axially from the proximal terminus towards the distal terminus of the distal chute (e.g., 386 in FIG. 13B).

In some embodiments, the distal chute member third sloped surface angle A (e.g., 387 in FIG. 13B) has an angle different than the angle of the first sloped surface of the proximal chute and the second sloped surface of the proximal chute. In some embodiments, the distal chute member third sloped surface angle A (e.g., 387 in FIG. 13B) has an angle that is the same as the angle of the first sloped surface of the proximal chute and/or the second sloped surface of the proximal chute.

In certain embodiments, the third sloped surface angle is about 35 degrees to about 65 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 or 65 degrees). In certain embodiments, the third sloped surface angle is about 35 degrees to about 75 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 degrees). In some embodiments angle A is about 41 degrees.

In certain embodiments, the proximal terminus of the distal chute member (381) is offset vertically from the distal terminus of the proximal chute member (372). The offset is shown as D (e.g., 391 in FIG. 13B). In some embodiments, the offset (D) can be from about 0.25 inches to about 1.0 inches (e.g., 0.25, 0.30, 0.35, 0.40, 0.45, 0.50, 0.55, 0.60, 0.65, 0.70, 0.75, 0.80, 0.85, 0.90, 0.95 or 1.00 inches). In certain embodiments, D is about 0.54 inches. In some embodiments, the vertical offset is defined by a back wall of animal waste separator member that is located between the proximal and distal chutes (e.g., 420 in FIG. 13B).

In certain embodiments, the proximal terminus of the distal chute member is offset horizontally from the distal terminus of the proximal chute member and results in a gap (e.g., 390 in FIGS. 11D, 12A and 13B). In some embodiments, the offset (E) can be from about to about 0.15 inches to about 0.25 inches (e.g., 0.15, 0.16, 0.17, 0.18, 0.19, 0.20, 0.21, 0.22, 0.23, 0.24 or 0.25 inches). In some embodiments, the offset (E) can be from about to about 0.10 inches to about 0.25 inches (e.g., 0.10, 0.11, 0.12, 0.13, 0.14, 0.15, 0.16, 0.17, 0.18, 0.19, 0.20, 0.21, 0.22, 0.23, 0.24 or 0.25 inches). In some embodiments, E is about 0.20 inches.

In some embodiments, urine and feces that are collected by a collector member with an insert or a conical collector member (no insert) are separated by an animal waste separator member (e.g., 3000 in FIGS. 19, 20, 23, 24A, 26 and 29-34). The separator member is in effective connection with the collector member or conical collector member to receive feces and urine that are to be separated and individually collected in separate containers.

In certain embodiments, the separator member comprises a proximal opening (e.g., 3100 in FIGS. 30A and 32B), a distal opening (e.g., 3200 in FIG. 32A), a front (e.g., 3300 in FIG. 31A), sides (e.g., 3400 in FIG. 29B), a back (e.g., 3500 in FIG. 29A), a bottom (e.g., 3600 in FIG. 32A), a proximal chute member connected to the sides (e.g., 3700 in FIGS. 29D and 30A), a distal chute member connected to the sides (e.g., 3800 in FIGS. 29D and 30A), a first container connector connected to the bottom (e.g., 5000 in FIGS. 30B and 33A), and a second container connector connected to the bottom (e.g., 5400 in FIGS. 30B and 33A).

In certain embodiments, the proximal chute member (e.g., 3700 in FIGS. 29D and 30A), comprises a proximal terminus (e.g., 3710 in FIG. 31B), a distal terminus in association with the back of the separator member (e.g., 3720 in FIG. 31B), and an anterior surface (e.g., 3730 in FIG. 31B). In some embodiments, the proximal chute member comprises a proximal chute sloped surface (e.g., 3750 in FIG. 31B). In some embodiments, the proximal chute member comprises a sloped surface extending axially from the proximal terminus towards the distal terminus of the proximal chute. In some embodiments, the proximal chute sloped surface angle B (e.g., 3780 in FIG. 31B) is about 35 degrees to about 65 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 or 65 degrees). In some embodiments, the proximal chute sloped surface angle B (e.g., 3780 in FIG. 31B) is about 35 degrees to about 75 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 degrees). In some embodiments, angle B is about 55 degrees. In some embodiments, the anterior surface of the proximal chute member comprises a curved surface.

In certain embodiments, the distal opening of a conical collector member or the distal opening of the collector member insert is disposed in proximity to the proximal chute member anterior surface, but not in contact, the proximal chute anterior surface distance F (e.g., 3950 in FIG. 34) and is aligned with the anterior surface in the region of the landing or target zone (e.g., 3740 in FIG. 31B). In certain embodiments, the proximal chute anterior surface distance F can be from about 0.01 inches to about 3.0 inches (e.g., 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 inches). In some embodiments, the proximal chute anterior surface distance F is about 0.13 inches. The proximal chute anterior surface distance F and the landing zone region of the proximal chute are chosen so that urine and feces from the collector member contacts the anterior surface of the proximal chute member in a manner that facilitates separation.

In certain embodiments, the separator member comprises a distal chute member (e.g., 3800 in FIGS. 29D, 30A and 31B). In some embodiments, the distal chute member comprises a proximal terminus (e.g., 3810 in FIG. 34), a distal terminus (e.g., 3820 in FIG. 34), an anterior surface (e.g., 3830 in FIG. 31B), and a posterior surface (e.g., 3840 in FIG. 31B). In some embodiments, the distal chute member is not connected to the proximal chute member and is not connected to the back of the separator member. In some embodiments, the distal chute comprises a substantially flat surface having transition walls (e.g., 3850 in FIGS. 29D and 30A) between the anterior surface of the distal chute and interior side walls of the separator member (e.g., 3650 in FIGS. 29D and 30A). The transition walls aid in directing feces into a container.

In some embodiments, the distal chute member comprises a sloped surface extending axially from the proximal terminus towards the distal terminus of the distal chute (e.g., 3860 in FIG. 31B). In some embodiments, the distal chute member sloped surface angle A (e.g., 3870 in FIG. 31B) has an angle different than the angle of the sloped surface of the proximal chute. In some embodiments, the distal chute member sloped surface angle A (e.g., 3870 in FIG. 31B) has an angle that is the same as the angle of the sloped surface of the proximal chute. In certain embodiments, the distal chute sloped surface angle is about 35 degrees to about 65 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 or 65 degrees). In certain embodiments, the distal chute sloped surface angle is about 35 degrees to about 75 degrees (e.g., 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 degrees). In some embodiments angle A is about 39.3 degrees.

In certain embodiments, the proximal terminus of the distal chute member (3810) is offset vertically from the distal terminus of the proximal chute member (3720). The offset is shown as D (e.g., 3910 in FIG. 31B). In some embodiments, the offset (D) can be from about 0.25 inches to about 1.0 inches (e.g., 0.25, 0.30, 0.35, 0.40, 0.45, 0.50, 0.55, 0.60, 0.65, 0.70, 0.75, 0.80, 0.85, 0.90, 0.95 or 1.00 inches). In certain embodiments, D is about 0.62 inches. In some embodiments, the vertical offset is defined by a back wall of animal waste separator member that is located between the proximal and distal chutes (e.g., 4200 in FIG. 31B).

In certain embodiments, the proximal terminus of the distal chute member is offset horizontally from the distal terminus of the proximal chute member and results in a gap (e.g., 3900 in FIGS. 29D, 30A and 31B). In some embodiments, the offset (E) can be from about 0.15 inches to about 0.25 inches (e.g., 0.15, 0.16, 0.17, 0.18, 0.19, 0.20, 0.21, 0.22, 0.23, 0.24 or 0.25 inches). In some embodiments, the offset (E) can be from about 0.10 inches to about 0.25 inches (e.g., 0.10, 0.11, 0.12, 0.13, 0.14, 0.15, 0.16, 0.17, 0.18, 0.19, 0.20, 0.21, 0.22, 0.23, 0.24 or 0.25 inches). In some embodiments, E is about 0.20 inches.

In some embodiments, the separator member is open, i.e., at least a portion of the internal surfaces are exposed (see FIGS. 14A and 14B). In some embodiments, the separator member is closed and internal surfaces of the separator are not exposed. In some embodiments, the separator is closed by attaching an additional wall member (e.g., 410 in FIG.

16) that extends from the front of the separator member to the collector extension member.

In certain embodiments, a separator member is a contained system having a closed configuration (e.g., 3000 in FIGS. 19, 26, 32B, 33A, 33B and 34). In some embodiments, a separator member that is a contained system has a separator cap (e.g., 3520 in FIGS. 31B and 32B) located across from the anterior surface of the proximal chute (e.g., 3730 in FIG. 31B).

In some embodiments, a separator member has a separator extension member (e.g., 4000 in FIGS. 25B, 26, 32A and 32B) transitioning from the proximal terminus of a proximal chute. A separator extension member often has an attachment flange (e.g., 3610 in FIGS. 31B, 32A, 32B and 34) having an exterior bottom contact surface (e.g., 3620 in FIG. 32A). In certain embodiments, a bottom contact surface of an attachment flange 3620 is in contact with an interior surface of a support flange 2710 of a collector extension member 2700 (see FIG. 34), such that a separator member is attached to a collector member. In some embodiments, a bottom contact surface of an attachment flange sits on the top surface of a support flange.

In some embodiments, the inner surfaces of the separator member, especially the proximal and distal chutes are imperforate and may be treated to minimize the retention of urine and/or feces. In some embodiment, treatment can be with a hydrophobic material, for example: Teflon, wax, silicone or any superhydrophobic coating.

In certain embodiments, a distal chute member is in effective connection with a first container connector (e.g., 500 in FIGS. 12B, 14A, 15A and 15B) and a proximal chute member is in effective connection with a second container connector (e.g., 540 in FIGS. 12B, 14A, 15A and 15B). The interior back wall surface of the separator (e.g., 355 in FIG. 14B) provides a vertical surface for urine to flow down from the distal end of the proximal chute into the second container connector.

In certain embodiments, a first container connector comprises a first bore surface (e.g., 510 in FIG. 14A) terminating at the bottom of the separator member (e.g., 360 in FIG. 14A) at a first bore (e.g., 505 in FIGS. 11D, 12A, 13B and 14B). The first bore surface comprises a first connection member (e.g., 520 in FIGS. 12B and 14A) for connecting with a container. In some embodiments, a connection member comprises a threaded surface. In some embodiments, the first container connector comprises an under hang (e.g., 530 in FIG. 13B).

In certain embodiments, a second container connector comprises a second bore surface (e.g., 550 in FIG. 14A) terminating at the bottom of the separator member (e.g., 360 in FIG. 14A) at a second bore (e.g., 545 in FIGS. 11D and 13B). The second bore surface comprises a second connection member (e.g., 560 in FIGS. 12B and 14A) for connecting with a container. In some embodiments, a connection member comprises a threaded surface. In certain embodiments a second container connector comprises a funnel flange (e.g., 570 in FIGS. 11D, 12A, 12B and 13B), a funnel aperture (e.g., 580 in FIGS. 13B). A funnel flange is internal to the second connection member and fits into a container to facilitate the flow of urine into the container. In some embodiments, a second container connector comprises a chamber (e.g., 590 in FIG. 13B) comprising a wall or walls. In some embodiments, an anterior wall (e.g., 592 in FIG. 13B) and a posterior wall (e.g., 593 in FIG. 13B).

Other non-limiting embodiments, include a distal chute member in effective connection with a first container connector (e.g., 5000 in FIGS. 30B, 32A, 33A and 3B) and a proximal chute member is in effective connection with a second container connector (e.g., 5400 in FIGS. 30B, 32A, 33A and 33B). The interior back wall surface of the separator (e.g., 3550 in FIG. 31B) provides a vertical surface for urine to flow down from the distal end of the proximal chute into the second container connector.

In certain embodiments, a first container connector comprises a first bore (e.g., 5050 in FIGS. 29D, 30B and 31B) in contact with a distal terminus of a distal chute. A first bore can have a first bore surface (e.g., 5100 in FIG. 32A) terminating at the bottom of the separator member (e.g., 3600 in FIG. 32A). The first bore surface comprises a threaded first bore surface (e.g., 5200 in FIGS. 31B and 32A) for connecting with a container.

In certain embodiments, a second container connector comprises a second bore (e.g., 5450 in FIGS. 29D, 30B and 31B) in contact with a distal end of an interior back wall surface between chutes (e.g., 3550 in FIG.31B). A second bore can have a second bore surface (e.g., 5500 in FIG. 32A) terminating at the bottom of the separator member (e.g., 3600 in FIG. 32A). The second bore surface comprises a threaded second bore surface (e.g., 5600 in FIGS. 31B and 32A) for connecting with a container. In certain embodiments a second container connector comprises a funnel flange (e.g., 5700 in FIGS. 30A, 30B, 31B and 34) and a funnel aperture (e.g., 5800 in FIGS. 31B). Often a funnel flange fits into a container and can facilitate the flow of urine into the container. In some embodiments, a second container connector comprises a chamber (e.g., 5900 in FIG. 31B) comprising a wall or walls. In some embodiments, an anterior wall (e.g., 5920 in FIG. 31B) and a posterior wall (e.g., 5930 in FIG. 31B).

In certain embodiments, each part of an animal waste collecting animal containment cage is for single-use and the entire animal waste collecting animal containment cage is disposed after a single use. There is no washing or sterilizing it or re-using it for another urine and/or feces collection and separation. In some embodiments, an insert member can be replaced, one or more times during the course of use of the cage with a single animal or multiple animals. A single use can be one assay, several assays, one experiment, several experiments or a study over a period of time. In some embodiments, a grating and/or grating side members which are metal, can be washed, sterilized and re-used in a new cage for collection. In some embodiments, an animal confinement member and a food and water holder when made of metal (e.g., wire bar), can be washed, sterilized and re-used in a new cage for collection.

The animal waste collecting animal containment cages described herein, as they are single use, provide uniform and consistent surfaces across all cages that may be used in a particular study, for both uncoated surfaces and surfaces that are coated with hydrophobic coatings. The surfaces in the collector/separator described herein that contact urine and feces do not vary from cage to cage and accordingly result in greater consistency and repeatability in the collection and separation of urine and feces.

The animal waste collecting animal containment cages provided herein have minimal parts that function without requiring motion to collect urine and feces and achieve separation of urine and feces. Urine and feces from the collection member contact the anterior surface of the proximal chute in the defined target region. Urine is thought to adhere to and flow down the anterior surface of the proximal chute member, onto the interior surface of a back wall of the separator through the funnel flange and into a container. In distinction, feces after contacting the proximal chute follows a different path down the separator. Feces is directed by the proximal chute toward the distal chute, passes over a gap (the back wall of the gap is where urine flows) and is directed into its own separate container. The features of the animal waste collecting animal containment cages, including the chosen surfaces for the collector and separator members, coated or not coated, the particular angles of the proximal and distal chutes and the taper of the collector, the vertical and horizontal offsets of the chutes, the defined target location for contact with the proximal chute and the distance F to the proximal chute, along with other features described herein are thought to contribute to the efficient and quantitative collection and separation of urine and feces.

Containers

In certain embodiments, containers are attached to the animal waste collecting animal containment cage at the distal end of the separator member at the connectors disposed on a bore surface to collect the separated feces and urine. In some embodiments, a first container (e.g., 700 in FIGS. 2, 5 and 17; 7000 in FIGS. 20 and 23) is releasably attached to a first connection member disposed on a first bore surface and a second container (e.g., 750, in FIGS. 2, 5 and 17; 7500 in FIGS. 20 and 23) is releasably attached to the second connection member disposed on a second bore surface. In some embodiments, a first container has a threaded circular orifice that can mate with a threaded first connection member and a second container has a threaded circular orifice that mates with a threaded second connection member. In some embodiment the containers containing animal waste can be removed by unscrewing and capped. In certain embodiments, the releasable attachment of containers to connectors of a separator can be by method other than by threading, including, but not limited to, clamping, coupling, docking and sealing. In some embodiments, a first container is for collection of feces and a second container is for collection of urine.

Containers can be any suitable container that can hold urine and feces. In certain aspects, the containers are those used for collection and storage of biomedical specimens. In some embodiments, the containers are plastic. In some embodiments the containers are plastic tube and can have screw caps.

Racks

In some embodiments, an animal waste collecting animal containment cage is disposed within a rack (e.g. 800 in FIGS. 17 and 18). A rack or cage rack as referred to herein can mean a cage system. Cage racks or cage systems may be referred to herein as "a rack", "cage mounting platforms", "cage mounting systems" and/or "rodent containment cage racks". A cage rack or cage system may be permanent (e.g., built into a structure, e.g., non-mobile), free standing, movable and/or portable. An example of a rack 800 is shown in FIG. 17. A rack sometimes is a ventilated rack configured to ventilate cages in association with the rack. A rack can ventilate cages by directing air from (i) a central air handling unit for a building or portion of a building in which the rack resides, (ii) one or more blowers mounted on the rack or are in proximity with a rack, and (iii) a combination of (i) and (ii), for example.

In certain embodiments, an animal waste collecting animal containment cage (1000) is disposed within a rack (e.g. 800 in FIGS. 17 and 18).

A rack often comprises one or more cages. One or more cages may be stored or housed on, or in, a cage rack or cage system in any suitable configuration. In some embodiments, a rack comprises one or more animal waste collecting animal containment cages (see FIG. 17). In some embodiments, a rack comprises both animal waste collecting animal containment cages and standard cages (cages not designed to collect and separate urine and feces) (see FIG. 18).

In some embodiments a cage often resides on a shelf or rail connected to a cage rack. A cage rack sometimes comprises one or more cage mount assemblies (e.g. 820 in FIGS. 17 and 18) on a support member (e.g., 815 in FIGS. 17 and 18; 8150 in FIG. 23) useful for storing one or more cages in or on a cage rack. In certain embodiments, a cage mount assembly comprises a rail guide (e.g. 825 in FIGS. 17 and 18) configured to receive, sometimes slideably receive, a corresponding flange on or in a cage. In some embodiments, a rack comprises a cage mount assembly and an animal waste collecting animal containment cage is engaged with the cage mount assembly.

In certain embodiments rack support member comprises cage connection assemblies (e.g. 830 in FIG. 5) for docking and integration of a cage into a rack ventilation system. In some embodiments, a cage connection assembly comprises a cage protrusion connector component (e.g. 835 in FIG. 5; 8350 in FIG. 23) configured to mate with cage protrusions (e.g. 910 and 920 in FIGS. 4 and 5; 9100 and 9200 in FIGS. 22 and 23) located on a cage lid (see FIGS. 4 and 5 and FIGS. 22 and 23). Cage connection assemblies are effectively connected to the ducts and/or plenums of a rack ventilation system. In some embodiments, an animal waste collecting animal containment cage comprises cage protrusions, the rack comprises cage connector assemblies and each cage protrusion is engaged with a cage connector assembly.

A cage rack often comprises one or more blowers (e.g., 810 in FIGS. 17 and 18), fans, turbines configured to provide air to, and/or remove air from cages housed within a rack. Sometimes a rack comprises two or more blowers configured for air supply and air exhaust. In a cage rack system comprising a ventilation control system, air is generally introduced into cages by a suitable arrangement of one or more blowers, plenums and/or ducts. Each cage in a rack system often comprises a vent or port configured for air intake and another vent or port configured for air exhaust. In some embodiments of a rack ventilation system a blower supplies positive air pressure to one or more cages through an air intake vent or port located on each cage. In some embodiments a rack comprises an intake blower that directs air through one or more ducts or plenums into one or more cages through an intake port or vent located on each cage. In such embodiments, sometimes air exits a cage and/or the cage ventilation system through another vent or port located on the cage. In some embodiments an exhaust blower is effectively connected to an exhaust port or vent on one or more cages where the exhaust blower provides a negative pressure. Sometimes air is drawn into a cage from a duct or plenum. Sometimes air is drawn into a cage from the open air of a room, building or enclosure or from outside an enclosure (e.g., from the environment). In some embodiments a rack comprises an intake blower that directs air through one or more ducts or plenums and into one or more cages through an intake port or vent. In such embodiments, the air is then directed out of the cage through an exhaust port or vent, into one or more ducts or plenums, and into an exhaust blower where the air is expelled from the system. In such embodiments, the air generally flows in a circuit from an air supply portion of a rack through the cages to an air exhaust portion of a rack.

In some embodiments, an animal waste collecting animal containment cage is engaged with a rack to receive positive air pressure and negative air pressure from the rack. In some embodiments, an animal waste collecting animal containment cage is engaged with a rack but does not receive positive air pressure and negative air pressure from the rack.

In some embodiments, an animal containment system sometimes operates in a positive pressure mode, meaning the pressure in the cage is higher than the outside environment. An advantage of this mode is no or negligible outside contamination can leak into the cage and harm an animal resident.

In some embodiments, an animal containment system sometimes operates in a negative pressure mode, meaning the pressure in the cage is lower than the outside environment pressure. A negative pressure mode may be desirable and can be employed in an elevated biosafety level environment. Elevated biosafety level environments include environments in which one or more risk components potentially harmful or harmful to personnel, such as pathogens, toxins or controlled substances, are utilized. Elevated biosafety level environments can include Biosafety Level (BSL) 2, 3 or 4 environments. Biosafety Level 1 is suitable for work involving well-characterized agents not known to cause disease in healthy adult humans, and of minimal potential hazard to laboratory personnel and the environment. Biosafety Level 2 is similar to Level 1 and is suitable for work involving agents of moderate potential hazard to personnel and the environment. Biosafety Level 3 is applicable to clinical, diagnostic, teaching, research, or production facilities in which work is done with indigenous or exotic agents which may cause serious or potentially lethal disease as a result of exposure by the inhalation route. Biosafety Level 4 is required for work with dangerous and exotic agents which pose a high individual risk of aerosol-transmitted laboratory infections and life-threatening disease. In certain embodiments an animal waste collecting animal containment cage is suitable for use in a BSL2+ facility.

Stands

In some embodiments, an animal waste collecting animal containment cage is not associated with a rack. In certain embodiments, an animal waste collecting animal containment cage is associated with a stand (e.g., 8400 in FIG. 40). In certain embodiments, an animal waste collecting animal containment cage is supported by a stand. In certain embodiments, an animal waste collecting animal containment cage cover rests on an animal waste collecting animal containment cage stand support member (e.g., 8500 in FIG. 40). Stands of appropriate dimensions to accommodate one or more animal waste collecting animal containment cages can be constructed using any suitable material.

Methods of Use

Animal waste collecting animal containment cages provided herein are useful for collecting and separating feces and/or urine excreted by laboratory animals.

Provided herein is a method for collecting and separating urine and/or feces from an animal or animals comprising placing an animal or animals in an animal waste collecting animal containment cage as described above and obtaining urine in a first container and/or feces in a second container.

Methods of Manufacture

Components of an animal waste collecting animal containment cage (e.g., cage lids, cage bases, collector members and separator members) often are manufactured by any convenient process, sometimes in an injection molding, thermoforming or vacuum forming process, for example.

Cage bases and lids and other cage components may be manufactured from one or more materials suitable for housing an animal. A material may be rigid, and often is a semi-rigid or flexible. A material may be translucent or transparent material. A material sometimes comprises additives that alter the transparency or opaqueness to various types of electromagnetic radiation. Non-limiting examples of materials that may be utilized for manufacture of a cage, a cage component or part thereof includes a suitable plastic or polymer (e.g., polypropylene (PP), high-density polyethylene (HDPE), low-density polyethylene (LDPE), polyethylene teraphthalate (PET), polyvinyl chloride (PVC), polyethylenefluoroethylene (PEFE), polystyrene (PS), polycarbonate (PC), polystyrene (e.g., high-density polystyrene), acrylnitrile butadiene styrene copolymers, plyethylene furanoate (PEF), the like or combinations thereof), a suitable metal or alloy, a suitable wood, the like or combinations thereof. In certain embodiments, a cage base, lid and other components comprises a biodegradable or recyclable material.

An animal waste collector member may be manufactured from one or more materials suitable for collection of urine and feces. In certain embodiments, the materials are non-porous, so as to retain a minimal amount of urine or feces. Typically, an insert member placed in a collector member represents the surface directly in contact with feces and urine, a waste collector member need not be manufactured from materials suitable for collection of urine and feces. An animal waste conical collector member, as it contacts urine and/or feces usually is manufactured from one or more materials suitable for collection of urine and feces. In certain embodiments, the materials are non-porous, so as to retain a minimal amount of urine or feces. Non-limiting examples of materials that may be utilized for manufacture of an animal waste collector member and an animal waste conical collector member include a suitable plastic or polymer (e.g., polypropylene (PP), high-density polyethylene (HDPE), low-density polyethylene (LDPE), polyethylene teraphthalate (PET), polyvinyl chloride (PVC), polyethylenefluoroethylene (PEFE), polystyrene (PS), polycarbonate (PC), polystyrene (e.g., high-density polystyrene), acrylnitrile butadiene styrene copolymers, plyethylene furanoate (PEF), the like or combinations thereof). In certain embodiment, the collector member is constructed of a plastic, a polymer or combination thereof and even if untreated do not retain a significant amount of urine or feces.

An animal waste separator member may be manufactured from one or more materials suitable for collection of urine and feces. In certain embodiments, the materials are non-porous, so as to retain a minimal amount of urine or feces. Non-limiting examples of materials that may be utilized for manufacture of an animal waste separator member include a suitable plastic or polymer (e.g., polypropylene (PP), high-density polyethylene (HDPE), low-density polyethylene (LDPE), polyethylene teraphthalate (PET), polyvinyl chloride (PVC), polyethylenefluoroethylene (PEFE), polystyrene (PS), polycarbonate (PC), polystyrene (e.g., high-density polystyrene), acrylnitrile butadiene styrene copolymers, plyethylene furanoate (PEF), the like or combinations thereof. In certain embodiment, the separator member is constructed of a plastic, a polymer or combination thereof and even if untreated do not retain a significant amount of urine or feces.

Components of an animal waste collecting animal containment cage (e.g., cage lids, cage bases, collector members and separator members) often are manufactured as separate units which are assembled for use.

In certain embodiments, certain components of an animal waste collecting animal containment cage (1000) are assembled in a particular order. A collector member 2000 can be inserted into the interior of a cage base and partially through a cage base bottom opening 1500 such that ribs 2900 and support tabs 2910 of the collector member rest on the interior surface of the cage base bottom surrounding the cage base bottom opening, i.e., the floor ledge or shelf 1550. A separator member 3000 can then be inserted through the collector member proximal opening such that the attachment flanges 3610 of the separator extension member 4000 rest on the support flanges 2710 of the collector extension member 2700. An insert member 6000 can be seated on the interior surface of the collector member 2500. An animal confinement member 1800 and food and water holder 1910 (attached to each other) can be attached to a cage base via wire bar hooks 1950 to hang into the cage base interior with the confinement member floor grating resting on the insert member and positioned over the cage base bottom opening. Food and water overflow receptacle containers can be inserted under the food and water holder.

Examples of Embodiments

Provided hereafter are non-limiting examples of certain embodiments of the technology.

A1. An animal waste collecting animal containment cage, comprising:
  a cage lid,
  a cage base affixed to the cage lid,
    which cage base comprises one or more sides, a cage base bottom connected to
    the one or more sides, and a grating member,
    which cage base bottom comprises an opening, and
    which grating member comprises a member disposed over the cage base bottom opening;
  an animal waste collector member connected to the cage,
    which collector member comprises, a proximal end, a distal end, a proximal opening, a distal opening, and one or more sidewalls comprising an interior surface and an exterior surface,
    at least a portion of, and at least one of, which one or more sidewalls tapers from the proximal opening to the distal opening of the collector member, and
    which proximal opening of the collector member is aligned with the cage base bottom opening; and
  an animal waste separator member connected to the collector member,
    which separator member separates urine from feces;
    which separator member comprises a proximal opening, a distal opening, a front, sides, a back, a bottom, a proximal chute member connected to the sides, a distal chute member connected to the sides, a first container connector connected to the bottom, and a second container connector connected to the bottom;
    which proximal chute member comprises a proximal terminus, a distal terminus in association with the back of the separator member, and an anterior surface;
    which distal chute member comprises a proximal terminus, a distal terminus, an anterior surface, and a posterior surface;
    which distal chute member is not connected to the proximal chute member and is not connected to the back;
    which proximal terminus of the distal chute member is offset vertically and offset horizontally from the distal terminus of the proximal chute member;
    which first container connector is in effective connection with the distal chute member and comprises a first bore surface terminating at the bottom of the separator member;
    which second container connector is in effective connection with the proximal chute member and comprises a second bore surface terminating at the bottom of the separator member, and
    the first container connector is anterior to the second container connector.

A2. The containment cage of embodiment A1, wherein the grating member comprises wire bars.

A2.1. The containment cage of embodiment A2, wherein the grating member is a floor grating member.

A3. The containment cage of embodiments A1 or A2, wherein the grating member comprises wire bar grating side members spanning from the cage base bottom to approximately the height of the one or more sides of the cage base.

A3.1. The containment cage of embodiments A1 or A2, wherein the grating member comprises wire bar grating side members spanning from the cage base bottom to a portion of the height of the one or more sides of the cage base.

A3.2. The containment cage of embodiment A3, wherein the grating side members span from the cage base bottom to approximately the height of four sides of the cage base and together with the grating form an animal confinement member.

A3.3. The containment cage of embodiment A2.1, wherein the floor grating member comprises side grating members spanning from the cage base bottom to a portion of the height of three sides of the cage base, a back grating member spanning from the cage base bottom to approximately the height of the sides of the cage base and the side grating members, back grating member and floor grating member form an animal confinement member.

A3.4. The containment cage of embodiments A3.2 or A3.3, wherein an animal contained within the cage is confined by the animal confinement member to a section of the cage comprising the cage base bottom opening.

A3.5 The containment cage of any one of embodiments A2 to A3.4, comprising an additional wire bar member.

A3.6. The containment cage of embodiment A3.5, wherein the additional wire bar member is a food wire bar member.

A3.7. The containment cage of embodiment A3.5, wherein the additional wire bar member is a water wire bar member.

A3.8. The containment cage of embodiments A3.5, wherein the additional wire bar members are a food wire bar member and a water wire bar member.

A3.9. The containment cage of embodiment A3.8, wherein the food wire bar member and water wire bar member are attached and form a food and water holder.

A3.9.1 The containment cage of embodiment A3.9, wherein the food and water holder are attached to an animal confinement member.

A3.10. The containment cage of embodiments A3.9 or A3.9.1, comprising an overflow receptacle.

A3.11. The containment cage of embodiment A3.10, comprising an overflow receptacle under the food wire bar member and an overflow receptacle under the water wire bar member.

A3.12. The containment cage of any one of embodiments A1 to A3.11, wherein two parallel sides of a base have a greater length than two comparable parallel sides of a base of a standard cage.

A3.13. The containment cage of any one of embodiments A1 to A3.12, wherein the animal waste collector member is connected to the cage.

A3.14. The containment cage of any one of embodiments A1 to A3.12, wherein the animal waste collector member comprises side flanges that are in contact with the interior of a cage bottom.

A3.15. The containment cage of any one of embodiments A1 to A3.12, wherein the animal waste collector member comprises ribs and support tabs that are in contact with the interior portion of a cage bottom floor surrounding the cage base bottom opening.

A3.16. The containment cage of embodiment A3.15, wherein the ribs and support tabs are in contact with a floor ledge or shelf on the cage bottom floor.

A3.17. The containment cage of any one of embodiments A1 to A3.12, wherein the animal waste collector member is an integral part of the cage base bottom.

A4. The containment cage of any one of embodiments A1 to A3.17, wherein the proximal opening, the distal opening and one or more of the sidewalls of the animal waste collector member are disposed as a frustum.

A5. The containment cage of any one of embodiments A1 to A4, wherein one or more sidewalls of the collector member taper at an angle between 40 and 90 degrees relative to a horizontal axis.

A6. The containment cage of embodiment A5, wherein the sidewalls taper at an angle of about 55 degrees.

A7. The containment cage of any one of embodiments A1 to A6, wherein the collector member interior surface comprises a coating.

A8. The containment cage of embodiment A7, wherein the coating is a hydrophobic coating.

A9. The containment cage of any one of embodiments A1 to A8, comprising an insert member in contact with the collector member, wherein the insert member comprises a proximal opening, a distal opening, and one or more sidewalls comprising an interior surface and an exterior surface, and at least a portion of, and at least one of, which one or more sidewalls tapers from the proximal opening to the distal opening of the insert member.

A10. The containment cage of embodiment A9, wherein at least one of the one or more sidewalls of the insert member is longer than the one or more sidewalls of the collector member, a portion of which exterior surface of the one or more sidewalls of the insert member in a proximal region of the insert member is in contact with the interior surface of the one or more sidewalls of the collector member, and a portion of which exterior surface of the one or more sidewalls of the insert member in a distal region of the insert member is not in contact with the interior surface of the one or more sidewalls of the collector member.

A10.1. The containment cage of embodiments A9 or A10, which distal opening of the insert member is disposed in proximity to the proximal chute member and aligned with the anterior surface of the proximal chute member.

A10.2. The containment cage of embodiment A10.1, wherein alignment with the anterior surface of the proximal chute member is alignment with a landing zone region on the anterior surface of the proximal chute region.

A10.3. The containment cage of embodiments A10.1 or A10.2, wherein proximity of the distal end of the insert member to the proximal chute member anterior surface is about 0.01 inches to about 3.0 inches.

A10.4. The containment cage of embodiment A10.3, wherein proximity of the distal end of the insert member to the proximal chute member anterior surface is about 0.13 inches.

A11. The containment cage of any one of embodiments A9 to A10.4, wherein the insert member is paper.

A12. The containment cage of embodiment A11, wherein the paper is wax paper.

A13. The containment cage of any one of embodiments A9 to A12, wherein the insert member is chemically treated.

A13.1. The containment cage of embodiment A13, wherein the chemical treatment comprises attaching to the insert member a reagent that binds or reacts with a molecule of interest.

A13.2. The containment cage of any one of embodiments A1 to A8, wherein the collector member has a distal end that is conical and is a conical collector member.

A13.3. The containment cage of embodiment A13.2, wherein the animal waste conical collector member is connected to the cage.

A13.4. The containment cage of embodiment A13.2, wherein the animal waste conical collector member is an integral part of the cage base bottom.

A14. The containment cage of any one of embodiments A13.2 to A13.4, wherein the distal opening of the conical collector member is disposed in proximity to the proximal chute member anterior surface and aligned with the anterior surface of the proximal chute member.

A14.1. The containment cage of embodiment A14, wherein alignment with the anterior surface of the proximal chute member is alignment with a landing zone region on the anterior surface of the proximal chute region.

A14.2. The containment cage of embodiments A14 or A14.1, wherein proximity of the distal end of the conical collector member to the proximal chute member anterior surface is about 0.01 inches to about 3.0 inches.

A14.3. The containment cage of embodiment A14.2, wherein proximity of the distal end of the conical collector member to the proximal chute member anterior surface is about 0.13 inches.

A15. The containment cage of any one of embodiments A1 to A13.1, wherein the collector member comprises a collector extension member at the distal end.

A15.1. The containment cage of embodiment A15, wherein the separator member is connected to the collector extension member.

A15.2. The containment cage of embodiment A15, wherein the separator member is connected to the interior of the collector extension member.

A15.3. The containment cage of any one of embodiments A13.2 to A14.3, wherein the separator member is connected to the conical collector member.

A16. The containment cage of any one of embodiments A1 to A15.3, wherein proximal chute member comprises a first and second sloped surface that extend axially from the proximal terminus towards the distal terminus, which distal chute comprises a third sloped surface that extends axially from the proximal terminus towards the distal terminus, and which first and second sloped surfaces are at an angle different than the angle of the third sloped surface.

A16.1. The containment cage of any one of embodiments A1 to A15.3, wherein proximal chute member comprises a first and second sloped surface that extend axially from the proximal terminus towards the distal terminus, which distal chute comprises a third sloped surface that extends axially from the proximal terminus towards the distal terminus, and which first and/or second sloped surfaces are at an angle which is the same as the angle of the third sloped surface.

A17. The containment cage of embodiment A16 or A16.1, wherein the first sloped surface, the second sloped surface and the third sloped surface are at an angle of about 35 degrees to about 65 degrees.

A17.1. The containment cage of embodiment A16 or A16.1, wherein the first sloped surface, the second sloped surface and the third sloped surface are at an angle of about 35 degrees to about 75 degrees.

A17.2. The containment cage of any one of embodiments A16 to A17.1, wherein the first sloped surface is at an angle of about 42 degrees.

A17.3. The containment cage of any one of embodiments A16 to A17.1, wherein the second sloped surface is at an angle of about 55 degrees.

A17.4. The containment cage of any one of embodiments A16 to A17.1, wherein the third sloped surface is at an angle of about 41 degrees.

A17.5. The containment cage of any one of embodiments A16 to A17.1, wherein the third sloped surface is at an angle of about 39.3 degrees.

A17.6. The containment cage of any one of embodiments A1 to A17.5, wherein the anterior surface of the proximal chute member comprises a curved surface.

A18. The containment cage of any one of embodiments A1 to A15.3, wherein proximal chute member comprises a first sloped surface that extends axially from the proximal terminus towards the distal terminus, which distal chute comprises a second sloped surface that extends axially from the proximal terminus towards the distal terminus, and which first sloped surface is at an angle different than the angle of the second sloped surface.

A18.1. The containment cage of any one of embodiments A1 to A15.3, wherein proximal chute member comprises a first sloped surface that extends axially from the proximal terminus towards the distal terminus, which distal chute comprises a second sloped surface that extends axially from the proximal terminus towards the distal terminus, and which first sloped surface is at an angle that is the same as the angle of the second sloped surface.

A18.2. The containment cage of embodiment A18 or A18.1, wherein the first sloped surface and the second sloped surface are at an angle of about 35 degrees to about 65 degrees.

A18.3. The containment cage of embodiment A18 or A18.1, wherein the first sloped surface and the second sloped surface are at an angle of about 35 degrees to about 75 degrees.

A18.4. The containment cage of any one of embodiments A18 to A18.3, wherein the first sloped surface is at an angle of about 55 degrees.

A18.5. The containment cage of any one of embodiments A18 to A18.3, wherein the second sloped surface is at an angle of about 39.3 degrees.

A18.6. The containment cage of any one of embodiments A18 to A18.5, wherein the anterior surface of the proximal chute member comprises a curved surface.

A19. The containment cage of any one of embodiments A1 to A18.6, wherein the proximal terminus of the distal chute member is offset vertically from the distal terminus of the proximal chute member from about 0.25 inches to about 1.00 inches.

A19.1. The containment cage of embodiments A19, wherein the proximal terminus of the distal chute member is offset vertically from the distal terminus of the proximal chute member about 0.62 inches.

A20. The containment cage of any one of embodiments A1 to A19.1, wherein the proximal terminus of the distal chute member is offset horizontally from the distal terminus of the proximal chute member to result in a gap of about 0.15 inches to about 0.25 inches.

A20.1. The containment cage of any one of embodiments A1 to A19.1, wherein the proximal terminus of the distal chute member is offset horizontally from the distal terminus of the proximal chute member to result in a gap of about 0.10 inches to about 0.25 inches.

A20.2. The containment cage of embodiment A20 or A20.1, wherein the gap is about 0.20 inches.

A21. The containment cage of any one of embodiments A1 to A20.2, wherein the distal chute comprises sidewalls connected to the anterior surface and an interior surface of each of the sides of the separator member.

A22. The containment cage of any one of embodiments A1 to A21, wherein the proximal chute member and the distal chute member comprise chemically treated surfaces.

A22.1. The containment cage of any one of embodiments A1 to A22, wherein a distal terminus of the proximal chute is in effective connection with an interior back wall surface of the separator member positioned between the proximal and distal chutes.

A22.2. The containment cage of embodiment A22.1, wherein the interior back wall surface is configured to facilitate the flow of urine.

A23. The containment cage of any one of embodiments A1 to A22.2, wherein the separator member is closed and comprises an additional wall member connected to the connector member extension.

A23.1. The containment cage of any one of embodiments A1 to A22.2, wherein the separator member is a closed unit comprising a cap and the separator member attaches to the interior of the connector member extension.

A23.2. The containment cage of any one of embodiments A1 to A23.1, wherein the separator member comprises a separator member extension member and the separator member extension member attaches to the interior of the connector member extension.

A24. The containment cage of any one of embodiments A1 to A23.2, wherein a first container is releasably attached to the first container connector and a second container is releasably attached to the second container connector.

A24.1 The containment cage of any one of embodiments A1 to A24, wherein the second container connector comprises a funnel flange and a funnel aperture.

A25. The containment cage of embodiment A24 or A24.1, wherein the first container is for collection of feces and the second container is for collection of urine.

A26. The containment cage of any one of embodiments A24 to A25, wherein the first container and the second container comprise plastic tubes.

A27. The containment cage of any one of embodiments A1 to A26, wherein the containment cage is disposable.

A27.1. The containment cage of embodiment A27, wherein the containment cage is for single use.

A28. The containment cage of any one of embodiments A1 to A27.1, wherein the cage is disposed within a rack.

A29. The containment cage of embodiment A28, wherein the rack comprises a cage mount assembly and the cage is engaged with the cage mount assembly.

A30. The containment cage of embodiment A29, wherein the cage comprises cage protrusions, the rack comprises cage connector assemblies and each cage protrusion is engaged with a cage connector assembly.

A30.1. The containment cage of embodiment A30, wherein the cage protrusions do not have orifices.

A30.2. The containment cage of embodiment A30, wherein the cage protrusions have orifices.

A31. The containment cage of any one of embodiments A28 to A39 and A30.2, wherein the rack provides positive air pressure and/or negative air pressure to the cage.

A32. The containment cage of any one of embodiments A28 to A30.1, wherein the rack does not provide positive air pressure and/or negative air pressure to the cage.

A33. The containment cage of any one of embodiments A28 to A32, wherein standard cages for animal housing are disposed within the rack comprising a containment cage.

A34. The containment cage of any one of embodiments A1 to A33, wherein the cage lid comprises a filter member.

A34.1. The containment cage of embodiment A31, where the rack provides positive air pressure to the cage.

A35. The containment cage of embodiment A31, where the rack provides negative air pressure to the cage.

A36. The containment cage of embodiment A35, wherein the cage is in a BSL2+facility.

A37. The containment cage of any one of embodiments A1 to A27.1, wherein the containment cage is not within a rack.

A37.1. The containment cage of embodiment A37, wherein the containment cage comprises a stand.

B1. A set of nested animal waste collecting animal containment cage bases.

B1.1. The set of nested animal waste collecting animal containment cage bases of embodiment B1, wherein the bases are attached to collector members.

B1.2. The set of nested animal waste collecting animal containment cage bases of embodiment B1, wherein the bases are attached to conical collector members.

B2. A set of nested animal waste collecting animal containment cage covers.

B3. A set of nested animal waste collecting animal containment cage collector members.

B4. A set of nested animal waste collecting animal containment cage conical collector members.

B5. A set of nested animal waste collecting animal containment cage insert members.

B6. A set of nested animal waste collecting animal containment cage confinement members.

B7. A set of nested animal waste collecting animal containment cage food and water holder members.

B8. A set of nested animal waste collecting animal containment cage food and water overflow receptacles.

C1. A method for collecting and separating urine and/or feces from an animal or animals comprising:
  placing an animal or animals in an animal waste collecting animal containment cage of any one of embodiments A1-A37.1; and
  obtaining urine in a first container and feces in a second container.

D1. A method for assembling an animal waste collecting animal containment cage of any one of embodiments A1-A27.1 comprising:
  inserting a collector member into the interior of a cage base and partially through a cage base bottom opening, whereby ribs and support tabs of the collector member rest on the floor ledge of the cage base bottom;
  inserting a separator member through the collector member proximal opening, whereby the attachment flanges of the separator extension member rest on the support flanges of the collector extension member,
  placing an insert member on the interior surface of the collector member;
  attaching an animal confinement member and food and water holder to the cage base; and
  optionally, inserting food and water overflow receptacle containers under the food and water holder.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. An animal waste collecting animal containment cage, comprising:
  a cage lid,
  a cage base affixed to the cage lid,
    which cage base comprises one or more sides, a cage base bottom connected to the one or more sides, and a grating member,
    which cage base bottom comprises an opening, and
    which grating member comprises a member disposed over the cage base bottom opening;
  an animal waste collector member connected to the cage, which collector member comprises, a proximal end, a distal end, a proximal opening, a distal opening, and one or more sidewalls comprising an interior surface and an exterior surface, at least a portion of, and at least one of, which one or more sidewalls tapers from the proximal opening to the distal opening of the collector member, and which proximal opening of the collector member is aligned with the cage base bottom opening; and an animal waste separator member connected to the collector member, which separator member separates urine from feces;

which separator member comprises a proximal opening, a distal opening, a front, sides, a back, a bottom, a proximal chute member connected to the sides, a distal chute member connected to the sides, a first container connector connected to the bottom, and a second container connector connected to the bottom;

which proximal chute member comprises a proximal terminus, a distal terminus in association with the back of the separator member, and an anterior surface;

which distal chute member comprises a proximal terminus, a distal terminus and an anterior surface;

which distal chute member is not connected to the proximal chute member and is not connected to the back;

which proximal terminus of the distal chute member is offset vertically and offset horizontally from the distal terminus of the proximal chute member; which first container connector is in effective connection with the distal chute member;

which second container connector is in effective connection with the proximal chute member, and the first container connector is anterior to the second container connector.

2. The containment cage of claim 1, wherein two parallel sides of the base have a greater length than two comparable parallel sides of a base of a standard cage.

3. The containment cage of claim 1, wherein the proximal opening, the distal opening and one or more of the sidewalls of the animal waste collector member are disposed as a frustum.

4. The containment cage of claim 1, wherein one or more sidewalls of the collector member taper at an angle between 40 and 90 degrees relative to a horizontal axis.

5. The containment cage of claim 1, wherein the collector member interior surface comprises a coating and the coating is a hydrophobic coating.

6. The containment cage of claim 1, wherein the collector member has a distal end that is conical and is a conical collector member.

7. The containment cage of claim 6, wherein the animal waste conical collector member is connected to the cage.

8. The containment cage of claim 6, wherein the distal opening of the conical collector member is disposed in proximity to the proximal chute member anterior surface and aligned with the anterior surface of the proximal chute member.

9. The containment cage of claim 8, wherein alignment with the anterior surface of the proximal chute member is alignment with a landing zone region on the anterior surface of the proximal chute region.

10. The containment cage of claim 9, wherein proximity of the distal end of the conical collector member to the proximal chute member anterior surface is about 0.01 inches to about 3.0 inches.

11. The containment cage of claim 10, wherein proximity of the distal end of the conical collector member to the proximal chute member anterior surface is about 0.13 inches.

12. The containment cage of claim 1, wherein the collector member comprises a collector extension member at the distal end and the separator member is connected to the collector extension member.

13. The containment cage of claim 1, wherein the proximal chute member comprises a first sloped surface that extends axially from the proximal terminus towards the distal terminus, the distal chute comprises a second sloped surface that extends axially from the proximal terminus towards the distal terminus, and which first sloped surface is at an angle that is the same as or different than the angle of the second sloped surface.

14. The containment cage of claim 13, wherein the first sloped surface and the second sloped surface are at an angle of about 35 degrees to about 75 degrees.

15. The containment cage of claim 1, wherein the anterior surface of the proximal chute member comprises a curved surface.

16. The containment cage of claim 1, wherein the proximal terminus of the distal chute member is offset vertically from the distal terminus of the proximal chute member from about 0.25 inches to about 1.00 inches.

17. The containment cage of claim 1, wherein the proximal terminus of the distal chute member is offset horizontally from the distal terminus of the proximal chute member to result in a gap of about 0.10 inches to about 0.25 inches.

18. The containment cage of claim 1, wherein the distal terminus of the proximal chute is in effective connection with an interior back wall surface of the separator member positioned between the proximal and distal chutes.

19. The containment cage of claim 1, wherein a first container for collection of feces is releasably attached to the first container connector and a second container for collection of urine is releasably attached to the second container connector.

20. A method for collecting and separating urine and/or feces from an animal or animals comprising:

placing an animal or animals in an animal waste collecting animal containment cage of claim 1; and obtaining feces in a first container and urine in a second container.

* * * * *